(12) United States Patent
Morizur et al.

(10) Patent No.: US 9,963,545 B2
(45) Date of Patent: May 8, 2018

(54) PROCESSES FOR ENHANCING FLAME RETARDANCE AND CHEMICAL RESISTANCE OF POLYMERS

(71) Applicant: SABIC Global Technologies B.V., Bergen op Zoom (NL)

(72) Inventors: Jean-Francois Morizur, Mount Vernon, IN (US); Paul Dean Sybert, Evansville, IN (US); Amanda Marie Flores, Evansville, IN (US); Peter Johnson, Evansville, IN (US); Andrew Frazee, Hattiesburg, MS (US); Thomas L. Evans, Mount Vernon, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 283 days.

(21) Appl. No.: 14/607,444

(22) Filed: Jan. 28, 2015

(65) Prior Publication Data

US 2015/0218309 A1    Aug. 6, 2015

Related U.S. Application Data

(62) Division of application No. 14/137,532, filed on Dec. 20, 2013, now Pat. No. 9,303,120.
(Continued)

(51) Int. Cl.
*C08G 64/14* (2006.01)
*C08J 3/28* (2006.01)
(Continued)

(52) U.S. Cl.
CPC ............. *C08G 64/14* (2013.01); *B05D 3/067* (2013.01); *B29C 35/08* (2013.01);
(Continued)

(58) Field of Classification Search
CPC .......... C08K 5/42; C08K 5/3475; C08K 5/52; C08K 5/5393; C08K 5/549; C08L 69/00;
(Continued)

(56) References Cited

U.S. PATENT DOCUMENTS 4,153,780 A    5/1979   Narita et al.
4,221,645 A    9/1980   Adelmann et al.
(Continued)

FOREIGN PATENT DOCUMENTS

CN    1454914 A    11/2003
CN    1685011 A    10/2005
(Continued)

OTHER PUBLICATIONS

Chinese Office Action of Chinese Application No. 201380066729.2 dated Mar. 9, 2016.
(Continued)

*Primary Examiner* — Lawrence Ferguson
(74) *Attorney, Agent, or Firm* — Cantor Colburn LLP

(57) ABSTRACT

Processes for increasing the chemical resistance of a surface of a formed article are disclosed. The formed article is produced from a polymeric composition comprising a photoactive additive containing photoactive groups derived from a monofunctional benzophenone. The surface of the formed article is then exposed to ultraviolet light to cause crosslinking of the photoactive additive and produce a crosslinked surface. The crosslinking enhances the chemical resistance of the surface. Various means for controlling the depth of the crosslinking are also discussed.

11 Claims, 21 Drawing Sheets

Related U.S. Application Data

(60) Provisional application No. 61/740,062, filed on Dec. 20, 2012, provisional application No. 61/793,072, filed on Mar. 15, 2013, provisional application No. 61/792,637, filed on Mar. 15, 2013, provisional application No. 61/901,595, filed on Nov. 8, 2013.

(51) Int. Cl.

| | |
|---|---|
| *B29C 35/08* | (2006.01) |
| *B29C 45/00* | (2006.01) |
| *C08G 64/04* | (2006.01) |
| *C08K 5/3475* | (2006.01) |
| *C08K 5/42* | (2006.01) |
| *C08K 5/5393* | (2006.01) |
| *C08K 5/549* | (2006.01) |
| *C08L 69/00* | (2006.01) |
| *C08G 64/24* | (2006.01) |
| *C08G 67/00* | (2006.01) |
| *B05D 3/06* | (2006.01) |
| *C08J 7/12* | (2006.01) |
| *C08K 5/52* | (2006.01) |
| *B29K 269/00* | (2006.01) |
| *B29K 69/00* | (2006.01) |
| *B29K 105/00* | (2006.01) |
| *B29K 105/24* | (2006.01) |

(52) U.S. Cl.
CPC ...... *B29C 35/0805* (2013.01); *B29C 45/0001* (2013.01); *C08G 64/045* (2013.01); *C08G 64/24* (2013.01); *C08G 67/00* (2013.01); *C08J 3/28* (2013.01); *C08J 7/123* (2013.01); *C08K 5/3475* (2013.01); *C08K 5/42* (2013.01); *C08K 5/52* (2013.01); *C08K 5/5393* (2013.01); *C08K 5/549* (2013.01); *C08L 69/00* (2013.01); *B29C 2035/0827* (2013.01); *B29K 2069/00* (2013.01); *B29K 2105/0026* (2013.01); *B29K 2105/24* (2013.01); *B29K 2269/00* (2013.01); *C08J 2369/00* (2013.01); *C08J 2469/00* (2013.01); *C08L 2201/02* (2013.01); *C08L 2205/02* (2013.01); *C08L 2205/025* (2013.01); *C08L 2312/06* (2013.01)

(58) Field of Classification Search
CPC ............. C08L 2201/02; C08L 2205/02; C08L 2205/025; C08L 2312/06; B29C 2035/0827; B29C 35/08; B29C 35/0805; B29C 45/0001; B29K 2069/00; B29K 2105/0026; B29K 2105/24; B29K 2269/00; C08G 64/045; C08G 64/14; C08G 64/24; C08G 67/00; C08J 2369/00; C08J 2469/00; C08J 3/28; C08J 7/123
See application file for complete search history.

(56) References Cited

U.S. PATENT DOCUMENTS

| | | |
|---|---|---|
| 4,333,809 A | 6/1982 | Schreckenberg et al. |
| 4,338,171 A | 7/1982 | Barie et al. |
| 4,367,186 A | 1/1983 | Adelmann et al. |
| 4,749,726 A | 6/1988 | Gupta et al. |
| 4,831,109 A | 5/1989 | Mitra et al. |
| 5,034,496 A | 6/1991 | Bales et al. |
| 5,916,942 A | 6/1999 | Scholl et al. |
| 6,224,949 B1 | 5/2001 | Wright et al. |
| 6,517,910 B2 | 2/2003 | Wright et al. |
| 6,624,379 B1 | 9/2003 | Azuma et al. |
| 7,875,698 B2 | 1/2011 | Vanmaele et al. |
| 2004/0030090 A1 | 2/2004 | Meyer et al. |
| 2004/0039145 A1* | 2/2004 | Silva .................. C08G 77/448 528/25 |
| 2005/0049369 A1 | 3/2005 | O'Neil et al. |
| 2006/0014850 A1 | 1/2006 | Vanmaele et al. |
| 2006/0074156 A1 | 4/2006 | Ebeling et al. |
| 2007/0027268 A1 | 2/2007 | Di et al. |
| 2007/0105994 A1 | 5/2007 | Li et al. |
| 2008/0081893 A1 | 4/2008 | Hoover et al. |
| 2008/0114103 A1 | 5/2008 | Hoeks et al. |
| 2010/0075125 A1 | 3/2010 | Maas et al. |
| 2011/0065848 A1 | 3/2011 | Jung et al. |
| 2012/0253002 A1 | 10/2012 | Ozaki et al. |
| 2014/0178665 A1 | 6/2014 | Morizur et al. |
| 2014/0179821 A1 | 6/2014 | Morizur et al. |
| 2014/0234629 A1 | 8/2014 | Sun et al. |
| 2014/0265053 A1 | 9/2014 | Morizur et al. |
| 2014/0275314 A1 | 9/2014 | Morizur et al. |
| 2014/0275321 A1 | 9/2014 | Morizur et al. |
| 2014/0275322 A1 | 9/2014 | Morizur et al. |
| 2014/0275324 A1 | 9/2014 | Morizur et al. |

FOREIGN PATENT DOCUMENTS

| | | |
|---|---|---|
| CN | 102159643 A | 8/2011 |
| DE | 24 01 630 | 8/1974 |
| DE | 2401630 A1 | 8/1974 |
| DE | 27 46 139 A1 | 4/1979 |
| DE | 27 46 141 A1 | 4/1979 |
| DE | 28 29 258 A1 | 1/1980 |
| DE | 29 30 787 A1 | 2/1981 |
| EP | 0001577 A1 | 5/1979 |
| EP | 0006579 | 1/1980 |
| EP | 0 068 014 B | 1/1983 |
| EP | 0 347 682 A | 12/1989 |
| EP | 1359176 A2 | 11/2003 |
| EP | 1093471 B1 | 12/2007 |
| JP | 08-238309 | 9/1996 |
| JP | 2002-226571 | 8/2002 |
| WO | WO 1996/033156 | 10/1996 |
| WO | WO 1998/022522 A | 5/1998 |
| WO | WO 2004/013229 A1 | 2/2004 |
| WO | WO 2014/032616 A1 | 3/2014 |

OTHER PUBLICATIONS

Chinese Office Action of Chinese Application No. 201480016134.0 dated Mar. 13, 2017.
International Search Report and Written Opinion dated Mar. 13, 2014, for corresponding PCT application No. PCT/US2013/077024.
International Search Report and Written Opinion dated Mar. 13, 2014, for corresponding PCT application No. PCT/US2013/077209.
International Search Report and Written Opinion dated Mar. 13, 2014, for corresponding PCT application No. PCT/US2013/077272.
International Search Report and Written Opinion dated Mar. 13, 2014, for corresponding PCT application No. PCT/US2013/076798.
International Search Report and Written Opinion dated Mar. 13, 2014, for corresponding PCT application No. PCT/US2013/076799.
International Search Report and Written Opinion dated Jul. 8, 2014, for corresponding PCT application No. PCT/US2014/028101.
International Search Report and Written Opinion dated Jul. 8, 2014, for corresponding PCT application No. PCT/US2014/028139.
International Search Report and Written Opinion dated Jul. 8, 2014, for corresponding PCT application No. PCT/US2014/028141.
International Search Report and Written Opinion dated Jul. 8, 2014, for corresponding PCT application No. PCT/US2014/026346.
International Search Report and Written Opinion dated Jul. 8, 2014, for corresponding PCT application No. PCT/US2014/026401.
International Search Report and Written Opinion dated Jul. 8, 2014, for corresponding PCT application No. PCT/US2014/028651.
International Search Report and Written Opinion dated Jul. 8, 2014, for corresponding PCT application No. PCT/US2014/028850.
International Search Report and Written Opinion dated Jul. 10, 2014, for corresponding PCT application No. PCT/US2014/29184.

(56) References Cited

OTHER PUBLICATIONS

Wang et al., Photocrosslinking of poly(ethylene terephthalate) copolymers containing photoreactive comonomers, Jul. 18, 2005, Polymer, 46, 6897-6909.

* cited by examiner

PROCESSES FOR ENHANCING FLAME RETARDANCE AND CHEMICAL RESISTANCE OF POLYMERS

This application is a divisional of U.S. patent application Ser. No. 14/137,532, filed Dec. 20, 2013, which claimed priority to U.S. Provisional Patent Application Ser. No. 61/740,062, filed Dec. 20, 2012; to U.S. Provisional Patent Application Ser. No. 61/793,072, filed Mar. 15, 2013; to U.S. Provisional Patent Application Ser. No. 61/792,637, filed Mar. 15, 2013; and to U.S. Provisional Patent Application Ser. No. 61/901,595, filed Nov. 8, 2013. The disclosure of each application is hereby fully incorporated by reference herein.

BACKGROUND

The present disclosure relates to additives that can be used to crosslink polymers, such as polycarbonate polymers, for improved properties. Also included are compositions including such additives, as well as articles (e.g. sheets, films, molded components, etc.) formed from such compositions. Further discussed herein are processes for increasing the chemical resistance of the surface of such formed articles.

Polycarbonates (PC) are synthetic engineering thermoplastic resins, and are a useful class of polymers having many beneficial properties. They are useful for forming a wide variety of products, such as by molding, extrusion, and thermoforming processes. Polycarbonate resins are both strong and transparent, and are used for a number of different commercial applications, including electronic engineering (E&E) parts, mechanical parts, etc. Because of their broad use, particularly in electronic applications and auto part applications, the desired properties of polycarbonates include high impact strength and toughness, heat resistance, weather and ozone resistance, and good ductility.

Polycarbonate polymers/resins, blends containing polycarbonate polymers, and articles formed therefrom exhibit flame retardance properties. However, such polymers drip when exposed to a flame, and this behavior worsens as the wall thickness decreases. This behavior greatly diminishes their use in transparent and opaque thin wall applications where a V0 or 5VA flame retardance rating is required. These polymers also have relatively poor chemical resistance and thus produce articles having similar chemical resistance. Consequently, it would be desirable to provide processes that can improve these properties.

BRIEF DESCRIPTION

The present disclosure relates to processes for increasing the chemical resistance of the surface of an article. The article is formed from a polymeric composition or blend which has improved crosslinking properties. The polymeric composition includes a photoactive additive which can be used to crosslink resins (e.g. polycarbonates) and improve their flame resistance and chemical resistance. The additives are formed by the reaction of at least a first photoactive moiety with a first linker moiety. The additive can be a compound, oligomer, or polymer. When exposed to ultraviolet light, crosslinking will occur between the photoactive additive and other polymeric base resins present in the polymeric composition, enhancing the chemical resistance of the resulting formed article.

Disclosed in various embodiments are methods for preparing an article that has a high probability of passing a UL94 V1 test, comprising: (a) designing a polymeric composition to be exposed to a designed dosage (D) of UV radiation, wherein the polymeric composition comprises: (i) a cross-linkable polycarbonate resin having endcaps derived from 4-monohydroxybenzophenone and a weight average molecular weight of 15,000 to 30,000, and (ii) optionally one or more polymeric base resins, and wherein the polymeric composition has a designed weight percentage of the endcaps derived from 4-monohydroxybenzophenone (HBP), a designed melt flow rate (MF) and a designed weight average molecular weight (MW); (b) preparing the cross-linkable polycarbonate resin by interfacial polymerization; (c) optionally blending the cross-linkable polycarbonate resin with the optional one or more polymeric base resins to form the polymeric composition; (d) forming an article from the polymeric composition; and (e) exposing the formed article to the designed UV dosage; wherein D, HBP, MF, and MW are selected based on an flame performance equation (Eqn 1) as detailed further herein, which defines the probability of a first time pass, i.e. p(FTP), in a UL94 V1 test at 1.2 mm thickness after UV exposure and after 7 days of aging at 70° C. The p(FTP) is 0.7 or greater; D is at least 12 J/cm$^2$ of UVA radiation; and MF is from 7 to 20 g/10 min measured at 300° C./1.2 kg/360 sec dwell.

In specific embodiments, the UV radiation is filtered to provide at least 12 J/cm$^2$ of UVA radiation and no detectable UVC radiation, as measured using an EIT PowerPuck. In other embodiments, the UV radiation is unfiltered and provides at least 12 J/cm$^2$ of UVA radiation and and at least 0.45 J/cm$^2$ of UVC radiation, as measured using an EIT PowerPuck.

Sometimes, D, HBP, MF, and MW are also selected based on a percentage retention of tensile elongation equation (Eqn 3) as detailed further herein, which defines the percentage retention of tensile elongation (ER) after exposure to acetone at a thickness of 3.2 mm; wherein the UV radiation is provided by a UV light source that provides at least 12 J/cm$^2$ of UVA radiation and 0.45 J/cm$^2$ UVC radiation, as measured using an EIT PowerPuck (e.g. an unfiltered D-bulb). ER is 85% or higher.

Sometimes, D and MF are also selected based on a Delta YI equation (Eqn 2) as detailed further herein, which defines the Delta YI after exposure to at least 12 J/cm$^2$ of UVA radiation and at least 0.45 J/cm$^2$ of UVC radiation at 3.2 mm thickness, measured before UV exposure and at least 48 hours after UV exposure; wherein the UV radiation is provided by a UV light source that provides at least 12 J/cm$^2$ of UVA radiation and 0.45 J/cm$^2$ UVC radiation, as measured using an EIT PowerPuck (e.g. an unfiltered D-bulb). The delta YI is 15 or less, and can also be 10 or less, or 8 or less.

Other times, D, HBP, MF, and MW are also selected based on a percentage retention of tensile elongation equation (Eqn 5) as detailed further herein, which defines the percentage retention of tensile elongation (ER) after exposure to acetone at a thickness of 3.2 mm; wherein the UV radiation is provided by a filtered UV light source that provides at least 12 J/cm$^2$ of UVA radiation and no detectable UVC radiation, as measured using an EIT PowerPuck. ER is 85% or higher.

Still in other variations, D and MF are also selected based on a Delta YI equation (Eqn 4) as detailed further herein, which defines the Delta YI after exposure to at least 12 J/cm$^2$ of UVA radiation and no detectable UVC radiation at 3.2 mm thickness, measured before UV exposure and at least 48 hours after UV exposure; wherein the UV radiation is provided by a filtered UV light source that provides at least 12 J/cm$^2$ of UVA radiation and no detectable UVC radiation, as measured using an EIT PowerPuck. The delta YI is 15 or less, and can also be 10 or less, or 8 or less.

In additional embodiments, MW can be from 15,000 to 30,000. Alternatively, HBP can be from 1.2 wt % to 4 wt %.

The polymeric composition may comprise a polymeric base resin, where the polymeric base resin is a polycarbonate resin that does not contain photoactive groups. The weight ratio of the cross-linkable polycarbonate resin to the polymeric base resin can be from about 50:50 to about 85:15. Also disclosed herein are polymeric compositions prepared by the methods described above.

Also disclosed in various embodiments are methods for preparing an article that has a low delta YI after exposure to unfiltered UV radiation, comprising: (a) designing a polymeric composition to be exposed to a designed dosage (D) of unfiltered UV radiation, wherein the polymeric composition comprises: (i) a cross-linkable polycarbonate resin having endcaps derived from 4-monohydroxybenzophenone and a weight average molecular weight of 15,000 to 30,000, and (ii) optionally one or more polymeric base resins, and wherein the polymeric composition has a designed weight percentage of the endcaps derived from 4-monohydroxybenzophenone (HBP), a designed melt flow rate (MF) and a designed weight average molecular weight (MW); (b) preparing the cross-linkable polycarbonate resin by interfacial polymerization; (c) optionally blending the cross-linkable polycarbonate resin with the optional one or more polymeric base resins to form the polymeric composition; (d) forming an article from the polymeric composition; and (e) exposing the formed article to the designed UV dosage; wherein D and MF are selected based on a Delta YI equation (Eqn 2) as detailed further herein. The delta YI is 15 or less.

In more specific embodiments, D, HBP, MF, and MW are also selected based on a retention of tensile elongation equation (Eqn 3) that defines the percentage retention of tensile elongation (ER), and ER is 85% or higher.

The delta YI can be 10 or less, or 8 or less. MF may be from 7 to 20 g/10 min measured at 300° C./1.2 kg/360 sec dwell. MW may be from 15,000 to 30,000. HBP can be from 1.2 wt % to 4 wt %.

The polymeric composition may comprise a polymeric base resin, where the polymeric base resin is a polycarbonate resin that does not contain photoactive groups. The weight ratio of the cross-linkable polycarbonate resin to the polymeric base resin can be from about 50:50 to about 85:15. Also disclosed herein are polymeric compositions prepared by the methods described above.

The present disclosure also describes various embodiments of methods for preparing an article that has a high percentage of retention of tensile elongation after exposure to acetone at a thickness of 3.2 mm, comprising: (a) designing a polymeric composition to be exposed to a designed dosage (D) of unfiltered UV radiation, wherein the polymeric composition comprises: (i) a cross-linkable polycarbonate resin having endcaps derived from 4-monohydroxybenzophenone and a weight average molecular weight of 15,000 to 30,000, and (ii) optionally one or more polymeric base resins, and wherein the polymeric composition has a designed weight percentage of the endcaps derived from 4-monohydroxybenzophenone (HBP), a designed melt flow rate (MF) and a designed weight average molecular weight (MW); (b) preparing the cross-linkable polycarbonate resin by interfacial polymerization; (c) optionally blending the cross-linkable polycarbonate resin with the optional one or more polymeric base resins to form the polymeric composition; (d) forming an article from the polymeric composition; and (e) exposing the formed article to the designed UV dosage; wherein D, HBP, MF, and MW are selected based on a percentage retention of tensile elongation equation (Eqn 3) that defines the percentage retention of tensile elongation (ER), and ER is 85% or higher. The unfiltered UV radiation provides at least 12 J/cm$^2$ of UVA radiation and at least 0.45 J/cm$^2$ of UVC radiation, and for example can be a D-bulb.

D and MF can also be selected based on a Delta YI equation (Eqn 2) as detailed further herein, where the delta YI is 15 or less, or 10 or less, or 8 or less.

MF may be from 7 to 20 g/10 min measured at 300° C./1.2 kg/360 sec dwell. MW may be from 15,000 to 30,000. HBP can be from 1.2 wt % to 4 wt %.

The polymeric composition may comprise a polymeric base resin, where the polymeric base resin is a polycarbonate resin that does not contain photoactive groups. The weight ratio of the cross-linkable polycarbonate resin to the polymeric base resin can be from about 50:50 to about 85:15. Also disclosed herein are polymeric compositions prepared by the methods described above.

Disclosed in various embodiments are methods for preparing an article that has a low delta YI after exposure to filtered UV radiation, comprising: (a) designing a polymeric composition to be exposed to a designed dosage (D) of filtered UV radiation, wherein the polymeric composition comprises: (i) a cross-linkable polycarbonate resin having endcaps derived from 4-monohydroxybenzophenone and a weight average molecular weight of 15,000 to 30,000, and (ii) optionally one or more polymeric base resins, and wherein the polymeric composition has a designed weight percentage of the endcaps derived from 4-monohydroxybenzophenone (HBP), a designed melt flow rate (MF) and a designed weight average molecular weight (MW); (b) preparing the cross-linkable polycarbonate resin by interfacial polymerization; (c) optionally blending the cross-linkable polycarbonate resin with the optional one or more polymeric base resins to form the polymeric composition; (d) forming an article from the polymeric composition; and (e) exposing the formed article to the designed UV dosage; wherein D and MF are selected based on a Delta YI equation (Eqn 4) as detailed further herein. the UV radiation is provided by a filtered UV light source that provides at least 12 J/cm$^2$ of UVA radiation and no detectable UVC radiation, as measured using an EIT PowerPuck. The delta YI is 15 or less, and can also be 10 or less, or 8 or less.

In more specific embodiments, D, HBP, MF, and MW are also selected based on a retention of tensile elongation equation (Eqn 5) that defines the percentage retention of tensile elongation (ER), and ER is 85% or higher.

MF may be from 7 to 20 g/10 min measured at 300° C./1.2 kg/360 sec dwell. MW may be from 15,000 to 30,000. HBP can be from 1.2 wt % to 4 wt %.

The polymeric composition may comprise a polymeric base resin, where the polymeric base resin is a polycarbonate resin that does not contain photoactive groups. The weight ratio of the cross-linkable polycarbonate resin to the polymeric base resin can be from about 50:50 to about 85:15. Also disclosed herein are polymeric compositions prepared by the methods described above.

Disclosed in various embodiments are methods for preparing an article that has a high percentage of retention of tensile elongation after exposure to acetone at a thickness of 3.2 mm, comprising: (a) designing a polymeric composition to be exposed to a designed dosage (D) of filtered UV radiation, wherein the polymeric composition comprises: (i) a cross-linkable polycarbonate resin having endcaps derived from 4-monohydroxybenzophenone and a weight average molecular weight of 15,000 to 30,000, and (ii) optionally one or more polymeric base resins, and wherein the polymeric composition has a designed weight percentage of the endcaps derived from 4-monohydroxybenzophenone (HBP), a designed melt flow rate (MF) and a designed weight average molecular weight (MW); (b) preparing the cross-linkable polycarbonate resin by interfacial polymerization; (c) optionally blending the cross-linkable polycarbonate resin with the optional one or more polymeric base resins to form the polymeric composition; (d) forming an article from the polymeric composition; and (e) exposing the formed article to the designed UV dosage; wherein D, HBP, MF, and MW are selected based on a percentage retention of tensile elongation equation (Eqn 5) that defines the percentage retention of tensile elongation (ER), and ER is 85% or higher. The UV radiation is provided by a filtered UV light source that provides at least 12 J/cm$^2$ of UVA radiation and no detectable UVC radiation, as measured using an EIT PowerPuck.

D and MF can also be selected based on a Delta YI equation (Eqn 4) as detailed further herein, where the delta YI is 15 or less, or 10 or less, or 8 or less.

MF may be from 7 to 20 g/10 min measured at 300° C./1.2 kg/360 sec dwell. MW may be from 15,000 to 30,000. HBP can be from 1.2 wt % to 4 wt %.

The polymeric composition may comprise a polymeric base resin, where the polymeric base resin is a polycarbonate resin that does not contain photoactive groups. The weight ratio of the cross-linkable polycarbonate resin to the polymeric base resin can be from about 50:50 to about 85:15. Also disclosed herein are polymeric compositions prepared by the methods described above.

Disclosed in various embodiments herein are processes for enhancing the chemical resistance of a surface of an article, comprising: forming the article with a polymeric composition comprising a photoactive additive; and exposing the surface of the formed article to a selected ultraviolet light range at an effective dosage to cause crosslinking of the photoactive additive and produce a crosslinked surface.

The crosslinked polymer may have a depth of at least 10 micrometers, or at least 35 micrometers, from the UV-exposed surface.

In some embodiments, the selected ultraviolet light range is from about 330 nm to about 380 nm, or is from about 280 nm to about 360 nm, or is from about 330 nm to about 360 nm.

Sometimes, the crosslinked surface has a delta YI after 48 hours of 4 or less, the YI being measured on a 1.6 mm bar after at least 48 hours at 23° C. in the dark.

In other embodiments, the total UV energy received by the surface from UVA, UVB, and UVC light is about 45 J/cm$^2$.

The polymeric composition may further comprise a polymeric base resin. In particular embodiments, the polymeric base resin has a weight average molecular weight of 21,000 or greater. The polymeric composition may comprise from 1 wt % to 99 wt % of the polymeric base resin and from 1 wt % to 99 wt % of the photoactive additive. More specifically, the polymeric base resin can be a polycarbonate.

The photoactive additive can be formed from the reaction of: a first photoactive moiety comprising a ketone group and only one functional group; and a first linker moiety comprising a plurality of linking groups, wherein each linking group reacts with the functional group of the first photoactive moiety; and a chain extender.

The photoactive additive may have a weight average molecular weight of 15,000 or greater.

In particular embodiments, the photoactive additive may be a cross-linkable polycarbonate resin having the structure of Formula (I) or Formula (II), as more fully described herein. The cross-linkable polycarbonate resin may have a weight-average molecular weight from 17,000 to 80,000 Daltons, as measured by GPC using a UV detector and polycarbonate standards. The cross-linkable polycarbonate resin can have a polydispersity index (PDI) of between 3.0 and 7.3 as measured by GPC using a UV detector and polycarbonate standards. The ratio of the polydispersity index (PDI) measured using a UV detector to the PDI measured using an RI detector may be 1.8 or less, when using a GPC method and polycarbonate molecular weight standards. In particular embodiments, the cross-linkable polycarbonate resin has a melt volume flow rate of about 2 to about 12 cc/10 min at 300° C./1.2 kg/360 sec dwell.

A plaque comprising the polymeric composition can have a transparency of 70% or greater at a thickness of 3.2 mm, measured according to ASTM-D1003-00. A plaque comprising the polymeric composition can have a haze value of less than 2% at a thickness of 2.54 mm, measured according to ASTM D1003-07.

The polymeric composition may further comprise a flame retardant. Sometimes, the flame retardant is potassium perfluorobutane sulfonate (Rimar salt), potassium diphenyl sulfone-3-sulfonate (KSS), or a combination thereof. In particular embodiments, the flame retardant is Rimar salt which is present in an amount of about 0.05 wt % to about 0.085 wt %, based on the total weight of the composition, and the plaque comprising the polymeric composition has a transparency of 70 to 90% at a thickness of 3.2 mm, measured according to ASTM-D1003-00. In particular embodiments, the polymeric composition further comprises a heat stabilizer and a mold release agent.

Also disclosed are articles formed from the processes described herein. Such articles may include a film, a sheet, a layer of a multilayer film, or a layer of a multilayer sheet. The article can be formed by injection molding, overmolding, co-injection molding, extrusion, multilayer extrusion, rotational molding, blow molding, or thermoforming.

Also disclosed herein are compositions, comprising: a cross-linkable polycarbonate resin having endcaps derived from a monohydroxybenzophenone and a weight average molecular weight (Mw) from 15,000 to 30,000 and a PDI from 3.0 to 4.0 as measured by GPC using a UV detector and polycarbonate standards; optionally one or more additional polycarbonate base resins different from the cross-linkable polycarbonate resin; and a flame retardant; wherein the composition comprises at least 45 wt % of the polycarbonate cross-linkable polycarbonate resin, wherein the monohydroxybenzophenone-derived endcap content of the composition is between 1.2 wt % and 4 wt %, wherein the composition has a melt flow rate (MFR) of 7 to 20 g/10 min measured at 300° C./1.2 kg/360 sec dwell, and wherein an article formed from the composition has a % T of 85% or greater at 3.2 mm thickness.

Also disclosed are molded articles formed from such compositions, wherein after irradiation with UV light, the article has (a) a % T of 75% or greater at 3.2 mm thickness, and (b) either (i) a gel layer of at least 8 microns thickness as measured by optical microscopy; or (ii) an increase in Mw of at least 30% as measured by GPC using a UV detector and polycarbonate standards.

The molded article can also have a pFTP(V1) of at least 0.95 at 1.2 mm thickness after aging for 7 days at 70° C. The molded article could also have a delta YI value of 12 or less at 3.2 mm thickness measured at least 48 hours after UV exposure. Sometimes, the molded article has a pFTP(V0) of at least 0.6 at 1.2 mm thickness.

In particular embodiments, the molded article has a % retention of 85% or greater at 3.2 mm thickness in a tensile elongation at break test using the ASTM D638 Type I method at 50 mm/min after exposure to acetone under 1% strain at 23° C. In addition, the molded article can have a delta YI of less than 12 at 3.2 mm thickness measured at least 48 hours after UV exposure, and/or can have a pFTP (V1) of at least 0.95 at 1.2 mm thickness after aging for 7 days at 70° C.

Other times, the molded article also has a % retention of 90% or greater at 3.2 mm thickness in a tensile elongation at break test using the ASTM D638 Type I method at 50 mm/min after exposure to acetone under 1% strain at 23° C. In addition, the molded article can have a delta YI of less than 12 at 3.2 mm thickness measured at least 48 hours after UV exposure, and/or a pFTP(V1) of at least 0.95 at 1.2 mm thickness after aging for 7 days at 70° C.

Additionally disclosed herein in different embodiments are methods for forming a cross-linked polycarbonate article, comprising: receiving a composition that comprises: a cross-linkable polycarbonate resin having endcaps derived from a monohydroxybenzophenone, a weight average molecular weight (Mw) from 15,000 to 30,000 and a PDI from 3.0 to 4.0 as measured by GPC using a UV detector and polycarbonate standards, and a monohydroxybenzophenone-derived endcap content from 3.0 to 4.5 wt %; optionally one or more additional polycarbonate base resins different from the cross-linkable polycarbonate resin; and a flame retardant; wherein the monohydroxybenzophenone-derived endcap content of the composition is between 1.2 wt % and 4 wt %, and wherein the composition has a melt flow rate (MFR) of 7 to 20 g/10 min measured at 300° C./1.2 kg/360 sec dwell; forming an article from the composition; and exposing the formed article to UV radiation from a UV radiation source for a time sufficient to form the cross-linked polycarbonate article; wherein the cross-linked polycarbonate article has a gel layer of at least 5 microns thickness as measured by optical microscopy, and wherein the molded article after exposure to UV radiation has a pFTP(V1) of at least 0.95 at 1.2 mm thickness after aging for 7 days at 70° C.

The UV radiation source can be a metal halide doped mercury lamp, an electrodeless D-bulb, an electrodeless H-bulb, an electrodeless V-bulb, a Xenon Arc lamp, or a UVA (320-390 nm) light emitting diode (LED). In specific embodiments, the UV radiation source is a metal halide doped mercury lamp or an electrodeless D-bulb.

Sometimes, the molded article is exposed to UV radiation from a metal halide doped mercury lamp providing at least 12 J/cm$^2$ of UVA as measured using an EIT PowerPuck. In other variations, the molded article is exposed to UV radiation from a metal halide doped mercury lamp providing at least 35.9 J/cm$^2$ of UVA as measured using an EIT PowerPuck. The molded article can be exposed to UV radiation from a metal halide doped mercury lamp providing at least 59.9 J/cm$^2$ of UVA as measured using an EIT PowerPuck. The article can be formed by injection molding.

In particular embodiments, the molded article is exposed to filtered UV radiation using a 280 nm long pass filter. In other embodiments, the molded article is exposed to filtered UV radiation using a 320 nm long pass filter.

Also disclosed are methods for preparing an injection-molded article having low yellowness and high chemical resistance, comprising: receiving a composition that comprises: a cross-linkable polycarbonate resin having endcaps derived from a monohydroxybenzophenone, a weight average molecular weight (Mw) from 15,000 to 30,000 and a PDI from 3.0 to 4.0 as measured by GPC using a UV detector and polycarbonate standards, and a monohydroxybenzophenone-derived endcap content from 3.0 to 4.5 wt %; optionally one or more additional polycarbonate base resins different from the cross-linkable polycarbonate resin; and optionally a flame retardant; wherein the composition has a melt flow rate (MFR) of 7 g/10 min or higher, measured at 300° C./1.2 kg/360 sec dwell; injection-molding the composition to a molded article; and exposing the molded article to a selected UV light range and a selected dosage of UV radiation to obtain the injection-molded article, wherein the injection molded article has a YI of 15 or less at 3.2 mm thickness and has a % retention of 85% or greater at 3.2 mm thickness in a tensile elongation at break test using the ASTM D638 Type I method at 50 mm/min after exposure to acetone under 15% strain at 23° C.

The injection molded article can have a pFTP(V1) of at least 0.70 at 1.2 mm thickness after aging for 7 days at 70° C. Alternatively, the injection molded article can have a YI of 8 or less. Sometimes, the composition has a melt flow rate (MFR) of 7 to 15 g/10 min.

In particular embodiments, the composition comprises Rimar salt flame retardant, and the injection molded article has a pFTP(V1) of at least 0.70 at 1.2 mm thickness after aging for 7 days at 70° C.

In other specific embodiments, the composition comprises Rimar salt flame retardant, and the injection molded article has a pFTP(V1) of at least 0.90 at 1.2 mm thickness after aging for 7 days at 70° C.

In yet other different embodiments, the composition comprises Rimar salt flame retardant, and the injection molded article has a pFTP(V0) of at least 0.60 at 1.2 mm thickness after aging for 7 days at 70° C.

Described herein in various embodiments are articles molded from a polycarbonate composition, wherein the polycarbonate composition comprises: a cross-linkable polycarbonate resin comprising from 2 to 4 wt % of endcaps derived from a monohydroxybenzophenone, and having a weight average molecular weight from 15,000 to 30,000 as measured by GPC using a UV detector and polycarbonate standards; optionally one or more additional polycarbonate base resins different from the cross-linkable polycarbonate resin; optionally a flame retardant; and optionally a colorant, a UV stabilizer, a thermal stabilizer, or a mold release agent; wherein the polycarbonate composition has a monohydroxybenzophenone-derived endcap content from 1.3 wt % to 3.8 wt %, and a melt flow rate (MFR) of 7 to 20 g/10 min measured at 300° C./1.2 kg/360 sec dwell, and wherein a molded part formed from the polycarbonate composition has a % T of 85% or greater at 3.2 mm thickness; and wherein a part molded from the polycarbonate composition and exposed to at least 35 J/cm$^2$ of UVA radiation has a delta YI of 8 or less at 3.2 mm thickness measured at least 48 hours after exposure, a % T of 75% or greater, a % retention of 85% or greater at 3.2 mm thickness in a tensile elongation at break test using the ASTM D638 Type I method at 50 mm/min after exposure to acetone under 1.0% strain at 23° C., and a pFTP(V1) of at least 0.90 at 1.2 mm thickness after aging for 7 days at 70° C. The polycarbonate composition has in more specific embodiments a melt flow rate (MFR) of 7 to 15 g/10 min.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
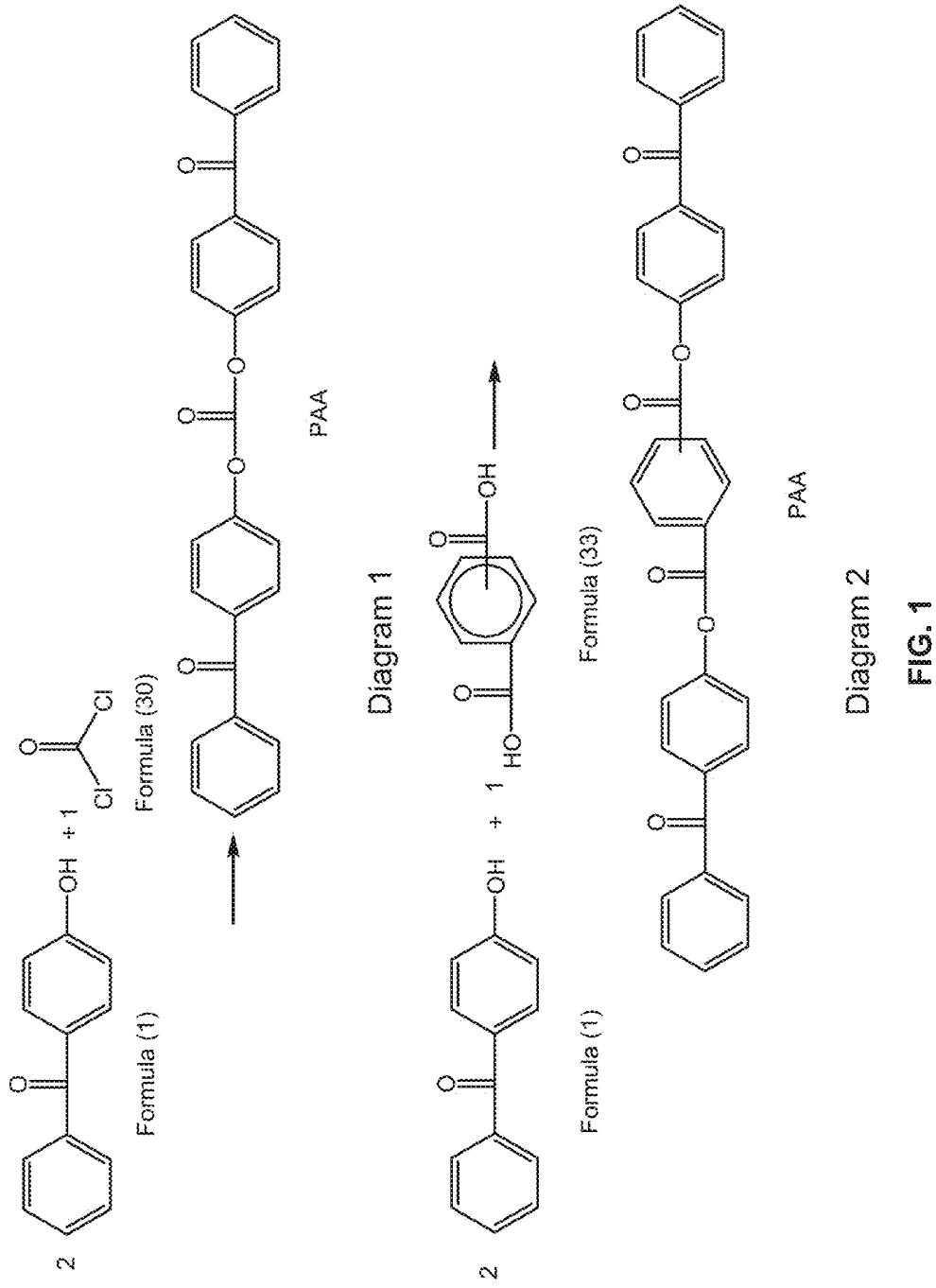
FIG. 1 illustrates the formation of a photoactive additive (compound) from a monofunctional photoactive moiety and a first linker moiety.

The present disclosure may be understood more readily by reference to the following detailed description of desired embodiments and the examples included therein. In the following specification and the claims which follow, reference will be made to a number of terms which shall be defined to have the following meanings.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that do not preclude the possibility of additional acts or structures.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to an linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "ester" refers to a radical of the formula —CO—O—, wherein the carbon atom and the oxygen atom are both covalently bonded to carbon atoms.

The term "carbonate" refers to a radical of the formula —O—CO—O—, wherein the oxygen atoms are both covalently bonded to carbon atoms. Note that a carbonate group is not an ester group, and an ester group is not a carbonate group.

The term "hydroxyl" refers to a radical of the formula —OH, wherein the oxygen atom is covalently bonded to a carbon atom.

The terms "carboxy" or "carboxyl" refers to a radical of the formula —COOH, wherein the carbon atom is covalently bonded to another carbon atom. It should be noted that for the purposes of this disclosure, a carboxyl group may be considered as having a hydroxyl group. However, it should be noted that a carboxyl group can participate in certain reactions differently from a hydroxyl group.

The term "anhydride" refers to a radical of the formula —CO—O—CO—, wherein the carbonyl carbon atoms are covalently bonded to other carbon atoms. An anhydride can be considered as being equivalent to two carboxyl groups.

The term "acid halide" refers to a radical of the formula —CO—X, wherein the carbon atom is covalently bonded to another carbon atom.

The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$.

The term "aryloxy" refers to an aryl radical which is attached to an oxygen atom, e.g. —O—$C_6H_5$.

The term "hydrocarbon" refers to a radical which is composed exclusively of carbon and hydrogen. Both alkyl and aryl groups are considered hydrocarbon groups.

The term "alkenyl" refers to a radical composed entirely of carbon atoms and hydrogen atoms which contains at least one carbon-carbon double bond that is not part of an aryl or heteroaryl structure. The alkenyl radical may be linear, branched, or cyclic. An exemplary alkenyl radical is vinyl (—CH=$CH_2$).

The term "alkenyloxy" refers to a alkenyl radical which is attached to an oxygen atom, e.g. —O—CH=$CH_2$.

The term "arylalkyl" refers to an aryl radical which is attached to an alkyl radical, with the aryl radical being appended to the parent molecular moiety through the alkyl radical, e.g. benzyl (—$CH_2$—$C_6H_5$).

The term "alkylaryl" refers to an alkyl radical which is attached to an aryl radical, with the alkyl radical being appended to the parent molecular moiety through the aryl radical, e.g. tolyl (—$C_6H_4$—$CH_3$).

The term "amino" refers to a radical of the formula R—$NH_2$, wherein R is a carbon atom. For purposes of this disclosure, the amino group is a primary amino group, i.e. contains two hydrogen atoms.

The term "ureido" refers to a radical of the formula —NH—CO—NH—, wherein the nitrogen atoms are both covalently bonded to carbon atoms.

The term "carbamate" refers to a radical of the formula —NH—CO—O—, wherein the nitrogen atom and the oxygen atom are both covalently bonded to carbon atoms.

The term "amide" refers to a radical of the formula —CO—NH—, wherein the nitrogen atom and the carbon atom are both covalently bonded to carbon atoms.

The term "copolymer" refers to a polymer derived from two or more structural unit or monomeric species, as opposed to a homopolymer, which is derived from only one structural unit or monomer.

The term "$C_3$-$C_6$ cycloalkyl" refers to cyclopropyl, cyclobutyl, cyclopentyl or cyclohexyl.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polymer, such as a polycarbonate, may depend primarily on the composition of the polymer. Polycarbonates that are formed from monomers having more rigid and less flexible chemical structures than Bisphenol-A generally have higher glass transition temperatures than Bisphenol-A polycarbonate, while polycarbonates that are formed from monomers having less rigid and more flexible chemical structures than Bisphenol-A generally have lower glass transition temperatures than Bisphenol-A polycarbonate. For example, a polycarbonate formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of, for example, polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature.

The term "halo" means that the substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) refers to the flow rate of a polymer in a melt phase as determined using the method of ASTM 1238-10. The MVR of a molten polymer is measured by determining the amount of polymer that flows through a capillary of a specific temperature over a specified time using standard weights at a fixed temperature. MVR is expressed in cubic centimeter per 10 minutes. The higher the MVR value of a polymer at a specific temperature, the greater the flow of that polymer at that specific temperature.

The term "Peak melt viscosity" refers to the highest melt viscosity value (in poise) achieved between 350° C. and 450° C. during rheological testing of a polycarbonate resin.

The term "Percent transmission" or "% transmission" refers to the ratio of transmitted light to incident light, and may be measured according to ASTM D 1003-07.

"Polycarbonate" as used herein refers to an oligomer or a polymer comprising residues of one or more monomers, joined by carbonate linkages.

The terms "UVA", "UVB", "UVC", and "UVV" as used herein were defined by the wavelengths of light measured with the radiometer (EIT PowerPuck) used in these studies, as defined by the manufacturer (EIT Inc., Sterling, Va.). Other wavelength ranges outside of the measurement ranges were considered and include the entire range of UV and near UV wavelengths (200 nm to 450 nm). The combination of these ranges were also considered and used.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule.

Compositions

The present disclosure relates to photoactive additives (PAA), and processes for using such additives to improve chemical resistance at the surface of an article. When the photoactive additive is added to one or more base resins and is then exposed to the appropriate wavelength of light, the resulting composition will have improved anti-drip and flame retardant properties, chemical resistance, transparency, and mechanical properties compared to the base resins alone or to the composition prior to the light exposure. For example, the chemical resistance, propensity to drip during burning, or the propensity to form a hole when exposed to a flame can be improved. Improved flame resistance performance characteristics may include flame out time (FOT) and time to drip (TTD). The compositions, blended or neat, can be used to provide thin-walled materials that are UL94 5VA compliant. The compositions can be used to provide thin-walled materials that are 5VA compliant and highly transparent. The compositions may also be used to produce articles that exhibit good chemical resistance, scratch resistance, tear resistance, impact strength, ductility, hydrolytic stability, and/or weatherability. Compositions comprising a cross-linked polycarbonate formed from the PAA are also contemplated, as well as articles/materials formed therefrom.

Generally, the photoactive additives (PAA) of the present disclosure include photoactive moieties that are covalently linked together through a first linker moiety and possibly a secondary linker moiety. The photoactive moieties contain a photoactive ketone group that, when exposed to the appropriate wavelength(s) of light, will form a stable covalent bond between the PAA and the polymeric resin. The PAA should be stable at conventional blending, forming, and processing temperatures (i.e. stable at 350° C. or above). The PAA also should not induce the degradation of the polymeric resin with which it is blended.

The term "photoactive moiety" refers to a moiety that, when exposed to light of the appropriate wavelength, cross-links with another molecule. Thus, for example, the bisphenol-A monomer in a bisphenol-A homopolymer would not be considered a photoactive moiety, even though photo-Fries rearrangement can occur upon exposure to light, because the atoms do not participate in crosslinking but merely in rearrangement of the polymer backbone.

The photoactive additive is formed from a reaction mixture containing at least a first photoactive moiety and a first linker moiety. The photoactive moiety comprises (i) a photoactive group and (ii) only one functional group. The linker moiety comprises a plurality of linking groups that can react with the functional group of the photoactive moiety. The reaction product is the photoactive additive (PAA). The molar ratio of the photoactive moiety to the linker moiety can be from 1:2 to 20:1. A second end-capping agent may also be included. As desired, a chain extender can also be included. The second end-capping agent and the chain extender do not have photoactive properties.

The term "ketone group" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The functional group of the photoactive moiety can be a hydroxyl group, an amino group, or a carboxyl group or equivalent thereof. In this regard, carboxyl, ester, acid halide, and anhydrides react in the same way, and are thus considered to be equivalent to each other. For clarity, these four groups are illustrated below:

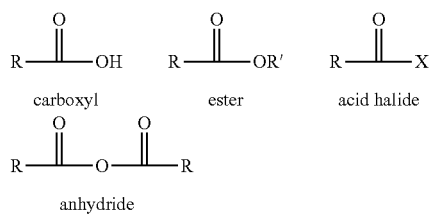

wherein R is the remainder of the photoactive moiety, R' is alkyl or aryl, and X is a halogen. It should be noted that the anhydride essentially contains two carboxyl groups.

The linking groups of the linker moiety react with the functional group of the photoactive moiety, and are generally also a hydroxyl group, an amino group, or a carboxyl group or equivalent thereof. In this regard, a hydroxyl group will react with a carboxyl group or its equivalents. An amino group will react with a carboxyl group or its equivalents. A carboxyl group or equivalent will react with a hydroxyl group or an amino group, but will not react with another carboxyl (because the anhydride is formed).

In some embodiments, the photoactive moiety can be a benzophenone moiety. Benzophenone is also known as diphenylketone or benzoyl benzene. A benzophenone moiety is shown below as Formula (0):

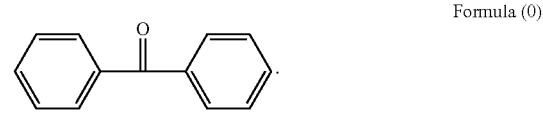

Formula (0)

In some embodiments, the photoactive moiety contains only one functional group. Examples of such photoactive moieties include those having the structure of one of Formulas (1)), (3), or (5)-(10):

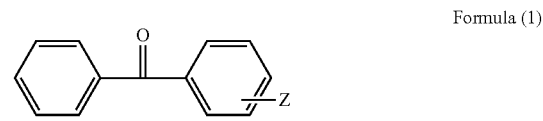 [SMILES: O=C(c1ccccc1)c1ccccc1]

Formula (1)

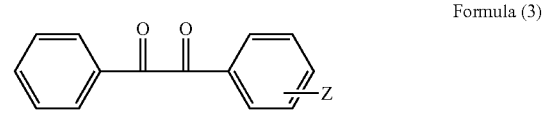

Formula (3)

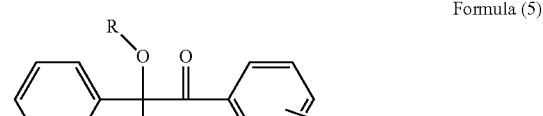

Formula (5)

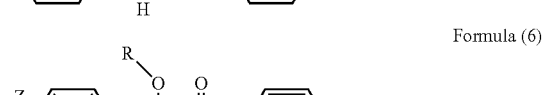

Formula (6)

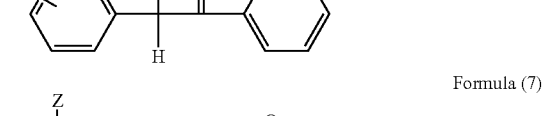

Formula (7)

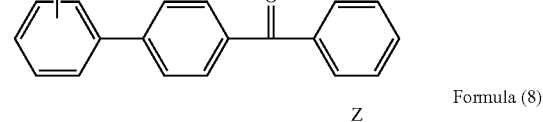

Formula (8)

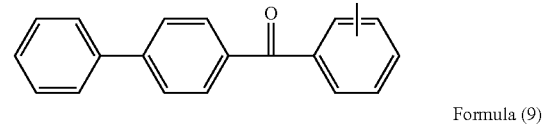

Formula (9)

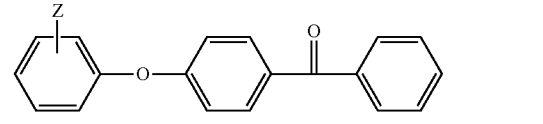

Formula (10)

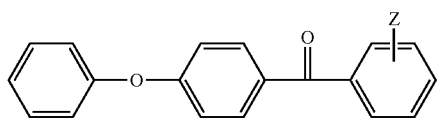

wherein Z is hydroxyl, amino, or —COY, wherein Y is hydroxyl, alkoxy, aryloxy, or halogen; and R is H, alkyl, or aryl.

The compound of Formula (1) is a (Z)benzophenone. The compound of Formula (3) is a 1-(Z)phenyl-2-phenylethane-1,2-dione. The compound of Formula (5) is a 1-((Z)phenyl)-2-hydrocarboxy-2-phenylethanone. The compound of Formula (6) is a 2-((Z)phenyl)-2-hydrocarboxy-1-phenylethanone. The compound of Formula (7) is a 4-((Z)phenyl)-benzophenone. The compound of Formula (8) is a 4-(Z)-4'-phenylbenzophenone. The compound of Formula (9) is a 4-[((Z))phenoxy]-benzophenone. The compound of Formula (10) is a 4-(Z)-4'-phenoxy-benzophenone. In this paragraph, (Z) represents the functional group.

In some other embodiments, the R and R' groups attached to the ketone group form a ring structure. In such embodiments, the aromatic rings can include both aryl rings or heteroaryl rings. Examples of such photoactive moieties include those having the structure of one of Formulas (13)-(14):

Formula (13)

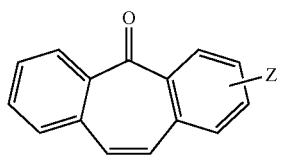

Formula (14)

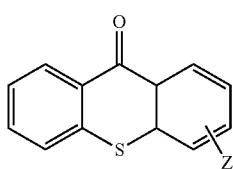

wherein Z is hydroxyl, amino, or —COY, wherein Y is hydroxyl, alkoxy, aryloxy, or halogen.

The compound of Formula (13) is a (Z)dibenzo[1,3-e:1',2'-f][7]annulen-11-one. The compound of Formula (14) is a (Z)thioxanthen-9-one. In this paragraph, (Z) represents the functional group.

The photoactive moiety is reacted with one or more linker moieties. At least one of the linker moieties comprises a plurality of linking groups that can react with the single functional group of the photoactive moiety. The linking groups can be joined to an aliphatic group or an aromatic group which serves as a "backbone" for the linker moiety. In particular embodiments, the linker moiety can have two, three, four, or even more linking groups.

Some examples of linker moieties which have two linking groups and can react with the photoactive moieties include those having the structure of one of Formulas (30)-(33):

Formula (30)

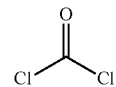

Formula (31)

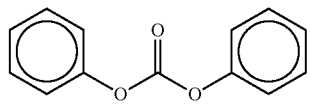

Formula (32)

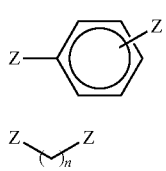

Formula (33)

wherein Z is hydroxyl, amino, or —COY, where Y is hydroxyl, halogen, alkoxy, or aryloxy; and where n is 1 to 20. It should be noted that Formula (32) encompasses isophthalic acid and terephthalic acid. The notation of Formula (33) indicates that the aliphatic backbone may have any conformation and that the Z groups may be attached to any carbon atom in the aliphatic backbone.

Some examples of linker moieties which have three linking groups and can react with the photoactive moieties include those having the structure of one of Formulas (34)-(36):

Formula (34)

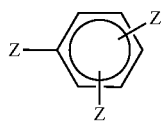

Formula (35)

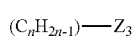

Formula (36)

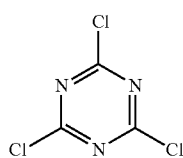

wherein Z is hydroxyl, amino, or —COY, where Y is hydroxyl, halogen, alkoxy, or aryloxy. The notation of Formula (35) indicates that the aliphatic backbone may have any conformation and that the Z groups may be attached to any carbon atom in the aliphatic backbone.

Some examples of linker moieties which have four linking groups and can react with the photoactive moieties include those having the structure of one of Formulas (37)-(40):

Formula (37)

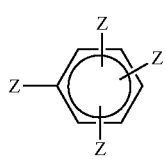

-continued

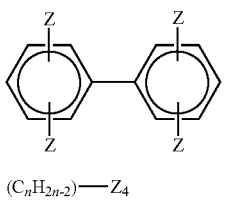
Formula (38)

$(C_nH_{2n-2})$—$Z_4$
Formula (39)

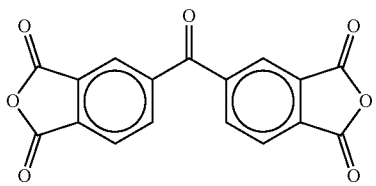
Formula (40)

wherein Z is hydroxyl, amino, or —COY, wherein Y is hydroxyl, alkoxy, aryloxy, or halogen; and where n is 1 to 20. The notation of Formula (39) indicates that the aliphatic backbone may have any conformation and that the Z groups may be attached to any carbon atom in the aliphatic backbone.

In some embodiments, linking groups can be provided by short oligomers, including oligomers containing glycidyl methacrylate monomers with styrene or methacrylate monomers, or epoxidized novolac resins. These oligomers can permit the desired the number of functional groups to be provided. Such oligomers are generalized by the structure of Formula (41):

Formula (41)

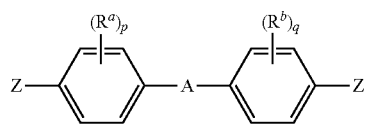

where E is hydrogen or an endcapping agent, p is the number of methacrylate monomers, q is the number of methacrylate monomers, r is the number of styrene monomers, and t is the number of epoxidized novolac (phenol-formaldehyde) monomers. Generally, p+q+r+t≤20. When the oligomer contains glycidyl methacrylate monomers with styrene or methacrylate monomers, generally t=0 and q≥1. Similarly, for novolac resins, p=q=r=0. The epoxy groups can be reacted with the phenolic group of the photoactive moiety.

As discussed above, the photoactive moiety has one functional group and the linker moiety has two or more linking groups. In embodiments that use only the photoactive moiety and the linker moiety in the reaction mixture, the resulting photoactive additive (PAA) will be a compound, each molecule having the same molecular weight. Again, the molar ratio of the photoactive moiety to the linker moiety can be from 1:2 to 20:1, though in these embodiments the molar ratio is usually 1:1 or greater. The two diagrams of FIG. 1 are illustrative of such photoactive additives. In the first diagram, two moles of 4-hydroxybenzophenone are reacted with one mole of phosgene to obtain the photoactive additive. In the second diagram, two moles of 4-hydroxybenzophenone are reacted with one mole of a diphthalic acid to obtain the photoactive additive. The product of the first diagram contains carbonate linkages, while the product of the second diagram contains ester linkages.

In particularly desired embodiments, the photoactive additive can be formed from a reaction mixture containing the photoactive moiety, the first linker moiety, and one or more chain extenders. The chain extender is a molecule that contains only two functional groups and is not photoactive when exposed to light. The chain extender can be used to provide a desired level of miscibility when the additive is mixed with the polymeric resin. In particular embodiments, the photoactive additive is a cross-linkable polycarbonate that includes a chain extender.

A first exemplary chain extender is a bisphenol of Formula (B):

(B)

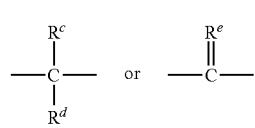

wherein Z is hydroxyl, amino, or —COY, wherein Y is hydroxyl, alkoxy, aryloxy, or halogen; $R^a$ and $R^b$ each represent a halogen atom or a monovalent hydrocarbon group and may be the same or different; p and q are each independently integers of 0 to 4; and A represents one of the groups of formula (B-1):

(B-1)

$$-\underset{R^d}{\overset{R^c}{\underset{|}{\overset{|}{C}}}}-  \quad \text{or} \quad -\overset{R^e}{\underset{\|}{C}}-$$

wherein $R^c$ and $R^d$ each independently represent a hydrogen atom or a monovalent linear or cyclic hydrocarbon group and $R^e$ is a divalent hydrocarbon group. For example, A can be a substituted or unsubstituted $C_3$-$C_{18}$ cycloalkylidene.

Specific examples of the types of bisphenol compounds that may be represented by Formula (B) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane.

A second exemplary chain extender is a bisphenol of Formula (C):

(C)

wherein Z is hydroxyl, amino, or —COY, wherein Y is hydroxyl, alkoxy, aryloxy, or halogen; each $R^k$ is independently a $C_{1-10}$ hydrocarbon group, and n is 0 to 4. The halogen is usually bromine. Examples of compounds that may be represented by Formula (C) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary chain extender is a bisphenolpolydiorganosiloxane of Formula (D-1) or (D-2):

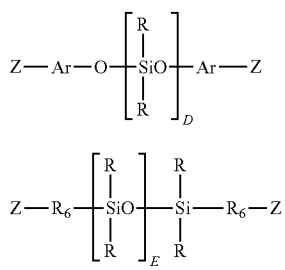

(D-1)

(D-2)

wherein Z is hydroxyl, amino, or —COY, wherein Y is hydroxyl, alkoxy, aryloxy, or halogen; each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, or from about 10 to about 200, more specifically about 10 to about 75.

Specific examples of Formulas (D-1) or (D-2) are illustrated below as Formulas (D-a) through (D-d):

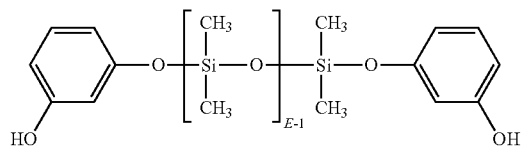

(D-a)

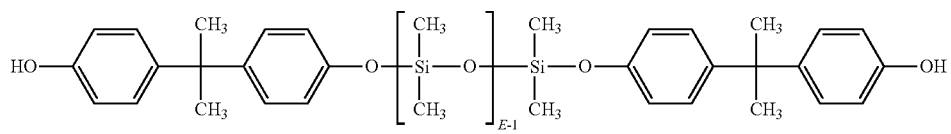

(D-b)

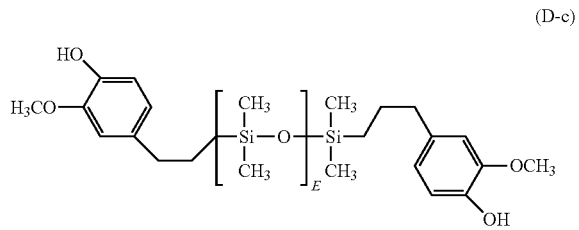

(D-c)

(D-d)

where E is an average value from 10 to 200.

A fourth exemplary chain extender is an aliphatic compound of Formula (E):

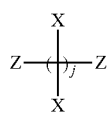

(E)

wherein Z is hydroxyl, amino, or —COY, wherein Y is hydroxyl, alkoxy, aryloxy, or halogen; each X is independently hydrogen, halogen, or alkyl; and j is an integer from 1 to 20. Examples of an aliphatic compound include ethylene glycol, propanediol, 2,2-dimethyl-propanediol, 1,6-hexanediol, and 1,12-dodecanediol.

A fifth exemplary chain extender is a dihydroxy compound of Formula (F), which may be useful for high heat applications:

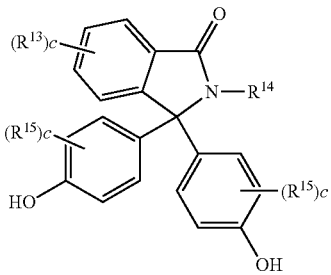

(F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (F) include 3,3-bis(4-hydroxyphenyl)-2-phenylisoindolin-1-one (PPPBP); 4,4'-(1-phenylethane-1,1-diyl)diphenol or 1,1-bis(4-hydroxyphenyl)-1-phenyl-ethane (bisphenol-AP); and 1,1-bis(4-hydroxyphenyl)-3,3,5-trimethylcyclohexane) (bisphenol TMC).

Other chain extenders that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (G) for high heat applications:

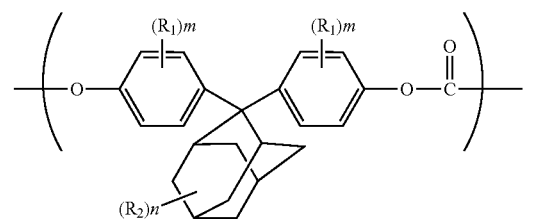

(G)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (H) for high heat applications:

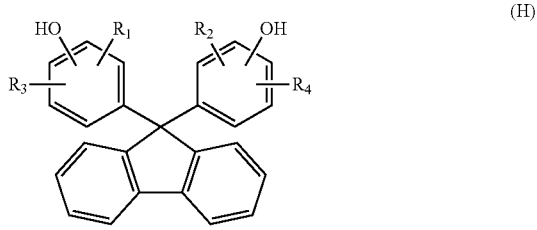

(H)

wherein $R_1$ to $R_4$ are each independently a hydrogen atom, a hydrocarbon group with 1 to 9 carbon atoms which may contain an aromatic group, or a halogen atom.

Another chain extender that could be used is an isosorbide. A monomer unit derived from isosorbide may be an isorbide-bisphenol unit of Formula (J):

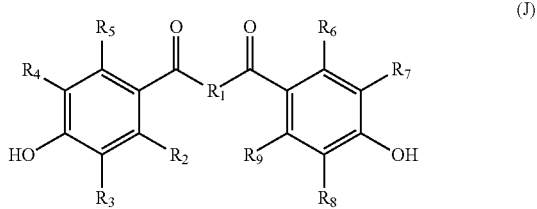

(J)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (J-a):

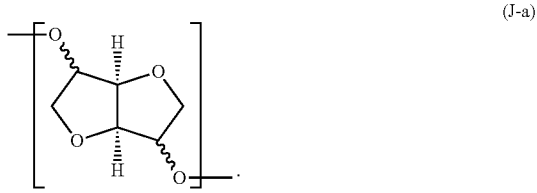

(J-a)

The isosorbide unit may be derived from an isosorbide, a mixture of isosorbide, a mixture of isomers of isosorbide, and/or from individual isomers of isosorbide. The stereochemistry for the isosorbide-based carbonate units of Formula (J) is not particularly limited. These diols may be prepared by the dehydration of the corresponding hexitols. Hexitols are produced commercially from the corresponding sugars (aldohexose). Aliphatic diols of formula (16) include 1,4:3,6-dianhydro-D glucitol, of formula (17); 1,4:3,6-dianhydro-D mannitol, of formula (18); and 1,4:3,6-dianhydro-L iditol, of formula (19), and any combination thereof. Isosorbides are available commercially from various chemical suppliers including Cargill, Roquette, and Shanxi. The isosorbide-bisphenol may have a pKa of between 8 and 11.

The cross-linkable polycarbonate of the present disclosure may be a polyester-polycarbonate copolymer. The molar ratio of ester units to carbonate units in the polyester-polycarbonate may vary broadly, for example 1:99 to 99:1, specifically 10:90 to 90:10, more specifically 25:75 to 75:25, optionally expanded depending on the desired properties of the final composition. The polyester units may be derived from a dicarboxylic acid, and may be, for example, a $C_2$-$C_{10}$ alkylene group, a $C_6$-$C_{20}$ alicyclic group, a $C_6$-$C_{20}$ alkyl aromatic group, a $C_6$-$C_{20}$ aromatic group, or a $C_6$-$C_{36}$ divalent organic group derived from a dihydroxy compound or chemical equivalent thereof.

The polyester units can be derived from aliphatic dicarboxylic acids having from 6 to about 36 carbon atoms, optionally from 6 to 20 carbon atoms. The $C_6$-$C_{20}$ linear aliphatic alpha-omega ($\alpha$-$\omega$) dicarboxylic acids may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids.

Saturated aliphatic alpha-omega dicarboxylic acids may be adipic acid, sebacic or dodecanedioic acid. Sebacic acid has a molecular mass of 202.25 Daltons, a density of 1.209 $g/cm^3$ (25° C.), and a melting point of 294.4° C. at 100 mmHg. Sebacic acid is extracted from castor bean oil found in naturally occurring castor beans.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

The polyester-polycarbonate may have a biocontent according to ASTM-D-6866 of at least 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight %, or at least 65 weight % of the composition derived therefrom. The polymer, or any composition derived therefrom, may have at least 5.0 weight percent of sebacic acid content.

In such embodiments, a second end-capping agent can also be used to terminate any chains (in addition to the photoactive moiety with only one functional group). The second end-capping agent (i.e. chain stopper) is a monohydroxy compound, a mono-acid compound, or a mono-ester compound. Exemplary endcapping agents include p-cumylphenol (PCP), resorcinol monobenzoate, p-tert-butylphenol, and p-methoxyphenol. The term "end-capping agent" is used herein to denote a compound that is not photoactive when exposed to light. For example, the end-capping agent does not contain a ketone group.

Figure 2:
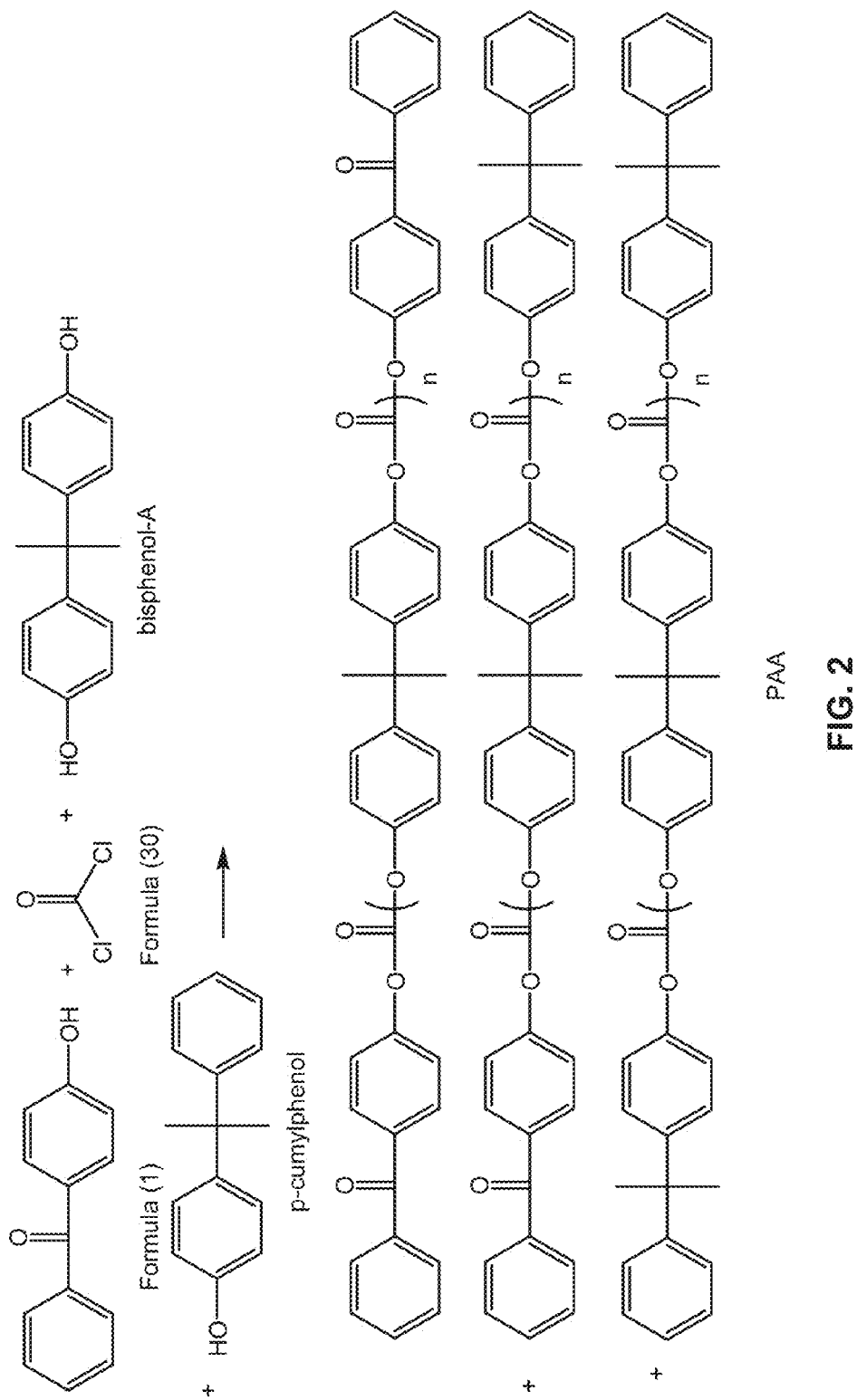
FIG. 2 illustrates the formation of a photoactive additive (oligomer/polymer) from a monofunctional photoactive moiety, a first linker moiety, a diol chain extender, and an endcapping agent.

The resulting photoactive additive (PAA) may be an oligomer or a polymer with a weight average molecular weight and a polydispersity index. The product resulting from the reaction in FIG. 2 is illustrative of such photoactive additives. Here, bisphenol-A is reacted with phosgene, 4-hydroxybenzophenone, and p-cumylphenol (endcap) to obtain the photoactive additive. Some chains will have two 4-hydroxybenzophenone endcaps, some will have only one 4-hydroxybenzophenone endcap, and some will have none, distributed in a statistical fashion.

Figure 3:
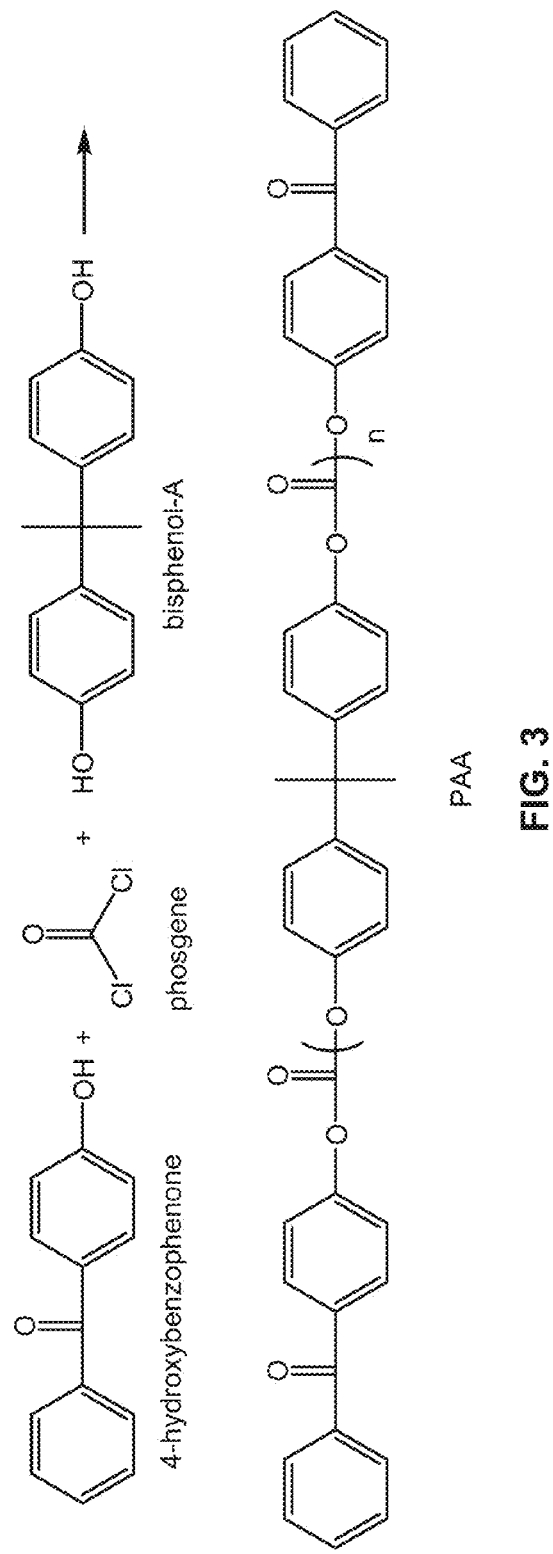
FIG. 3 illustrates the formation of a photoactive additive from a first photoactive moiety, a first linker moiety, and a diol chain extender.

Another example of a photoactive additive formed from a first photoactive moiety, a first linker moiety, and a chain extender is seen in FIG. 3. 4-hydroxybenzophenone (first photoactive moiety) is reacted with phosgene (first linker moiety) and bisphenol-A (chain extender) to obtain the photoactive additive. The resulting photoactive additive (PAA) may be an oligomer with a weight average molecular weight and a polydispersity index.

As previously explained, a first photoactive moiety is reacted with a first linker moiety to obtain the photoactive additive. In some embodiments, a secondary linker moiety is included in the reaction mixture. The secondary linker moiety has at least three functional groups, each of which can react with the linking groups of the first linker moiety, and acts as a branching agent. Generally, the functional groups of the secondary linker moiety are the same as those on the photoactive moiety. When the photoactive moiety has one functional group, the resulting photoactive additive (PAA) will be a compound, each molecule having the same molecular weight.

Some examples of secondary linker moieties which have three functional groups and can react with the first linker moiety include those having the structure of one of Formulas (43)-(46):

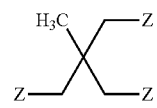

Formula (43)

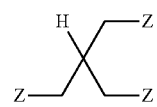

Formula (44)

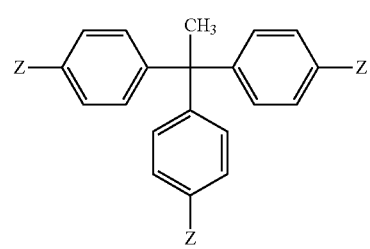

Formula (45)

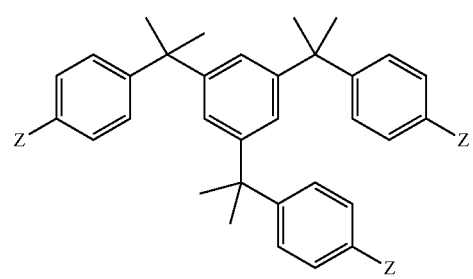

Formula (46)

wherein Z is hydroxyl, amino, or —COY, wherein Y is hydroxyl, alkoxy, aryloxy, or halogen.

Some examples of secondary linker moieties which have four functional groups and can react with the first linker moiety include those having the structure of one of Formulas (47)-(48):

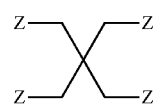

Formula (47)

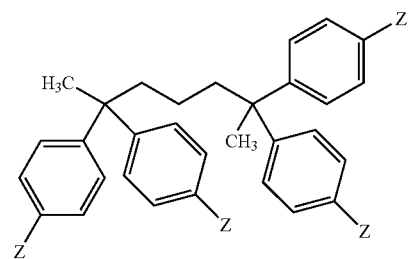

Formula (48)

wherein Z is hydroxyl, amino, or —COY, wherein Y is hydroxyl, alkoxy, aryloxy, or halogen.

In some embodiments, the secondary linker moiety can be an oligomer, made from an epoxidized novolac monomer. These oligomers can permit the desired number of functional groups to be provided. Such oligomers are generalized by the structure of Formula (49):

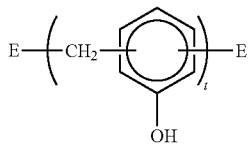

Formula (49)

wherein E is hydrogen or an endcapping agent; and t is an integer from 1 to 20.

Figure 4:
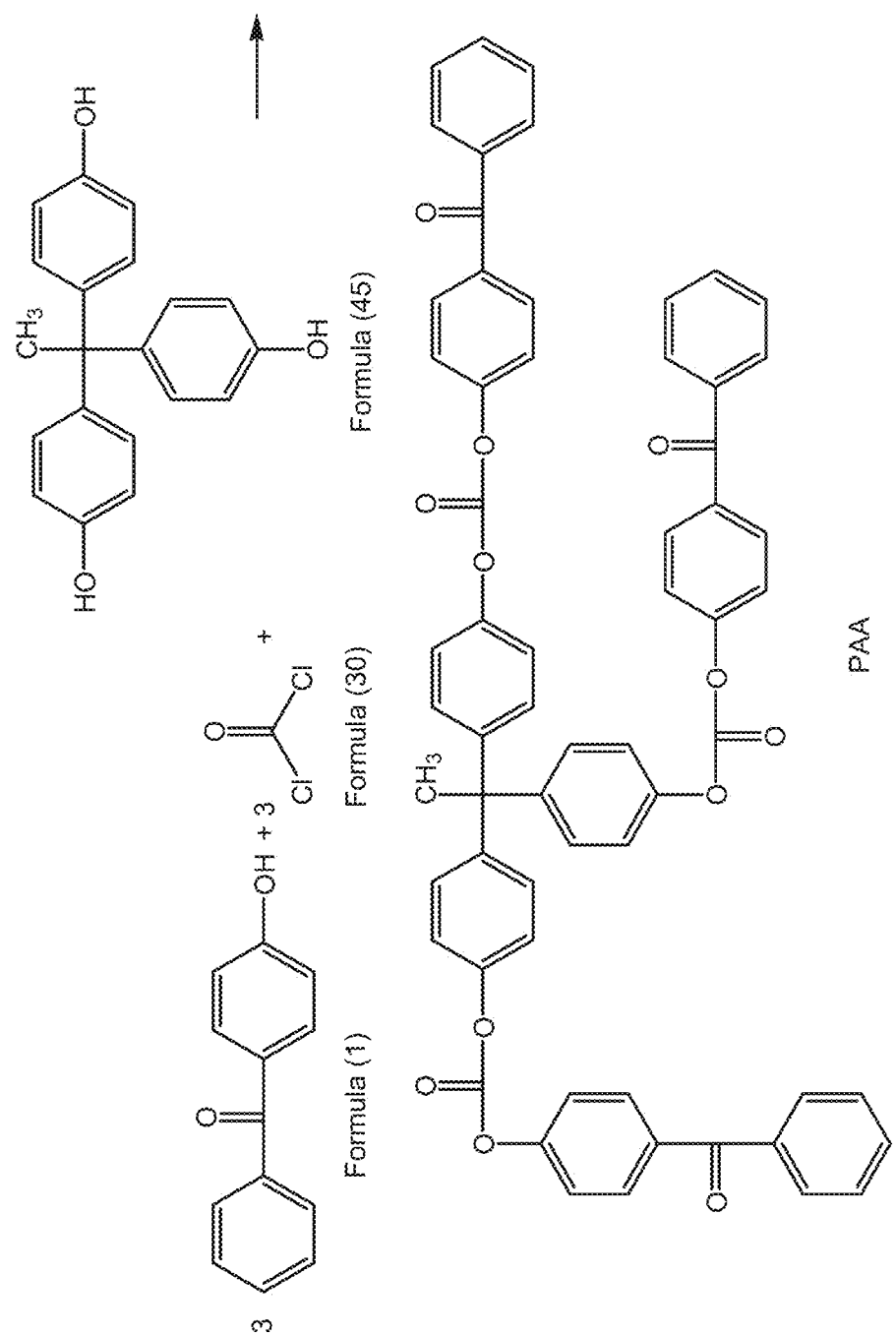
FIG. 4 illustrates the formation of a photoactive additive from a first photoactive moiety, a first linker moiety, and a secondary linker moiety.

An example of a photoactive additive formed from a first photoactive moiety, a first linker moiety, and a secondary linker moiety is seen in FIG. 4. Here, two moles of 4-hydroxybenzophenone are reacted with three moles of phosgene (first linker moiety) and one mole of tris(hydroxyphenyl)ethane (THPE, secondary linker moiety) to obtain the photoactive additive. Note that the secondary linker moiety reacts with the first linker moiety, not with the photoactive moiety.

Figure 5:
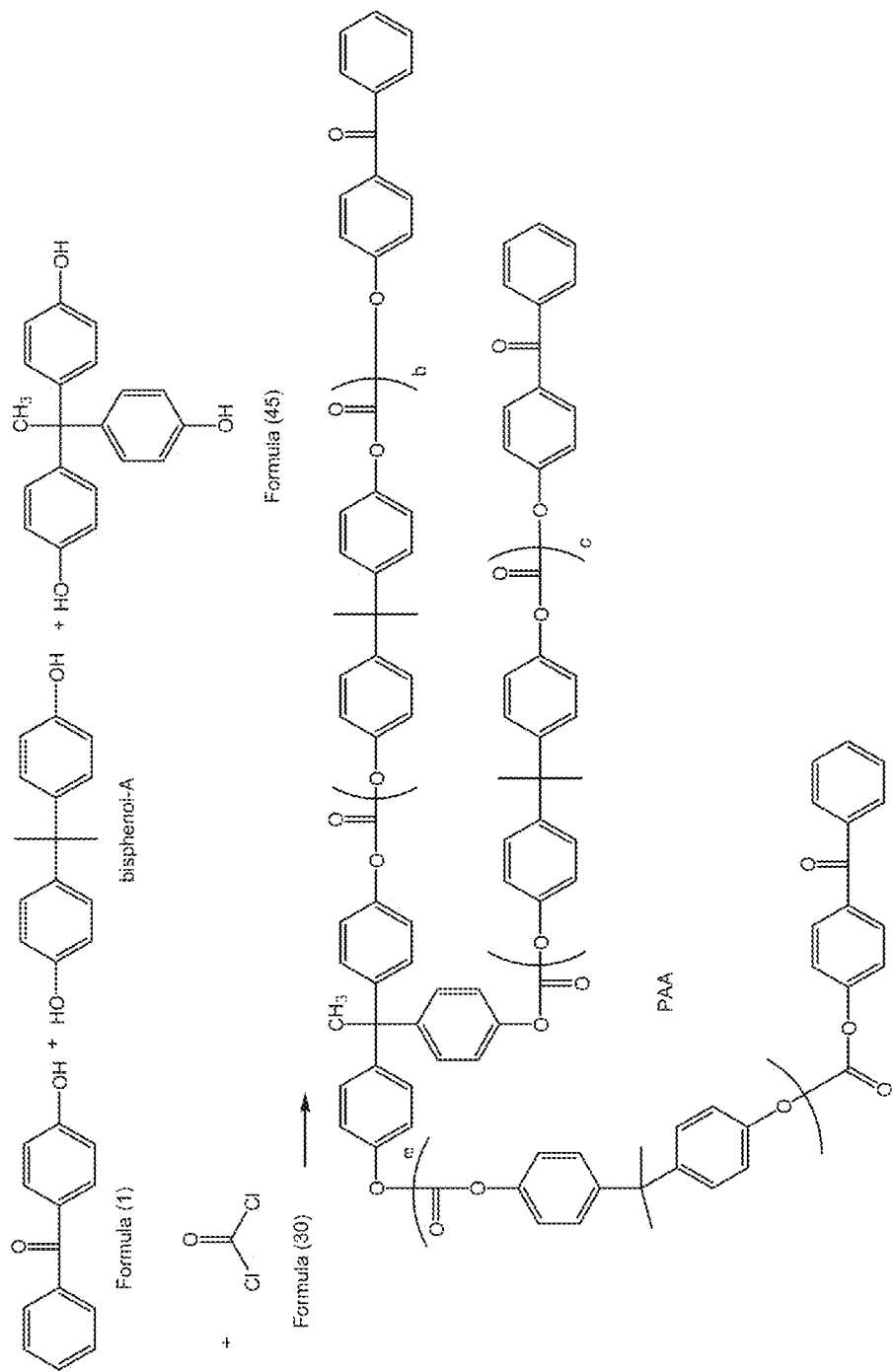
FIG. 5 illustrates the formation of a photoactive additive from a first photoactive moiety, a chain extender, a first linker moiety, and a secondary linker moiety.

Some photoactive additives of the present disclosure can be formed from the reaction of a first photoactive moiety, a chain extender, a first linker moiety, and a secondary linker moiety. Such a reaction is seen in FIG. 5. Here, 4-hydroxybenzophenone, bisphenol-A, phosgene, and THPE are reacted to obtain the photoactive additive. The resulting photoactive additive (PAA) may be an oligomer or a polymer with a weight average molecular weight and a polydispersity index.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. The Mw may be varied as desired. Polymers/oligomers with relatively higher Mw's generally retain their mechanical properties better, while polymers/oligomers with relatively lower Mw's generally have better flow properties. In some particular embodiments, the Mw of the photoactive additives is about 5,000 or less. During melt processing, such oligomers are more likely to rise to the surface of the article. Long chain aliphatic diols ($C_6$ or higher) can also be used for this purpose. This may increase the concentration of the additive at the surface, and thus increase the crosslinking density at the surface upon exposure to UV light as well.

The photoactive additives (PAA) can be prepared by suitable methods. It may be advantageous to pre-react any phenolic groups with phosgene to form chloroformates. The chloroformates can then be condensed with the other reactants with the aid of a condensation catalyst, such as triethylamine. This can result in a substantially pure product. Alternatively, a mixture of additives can be obtained by mixing all of the reactants together upfront and then reacting.

Figure 6:
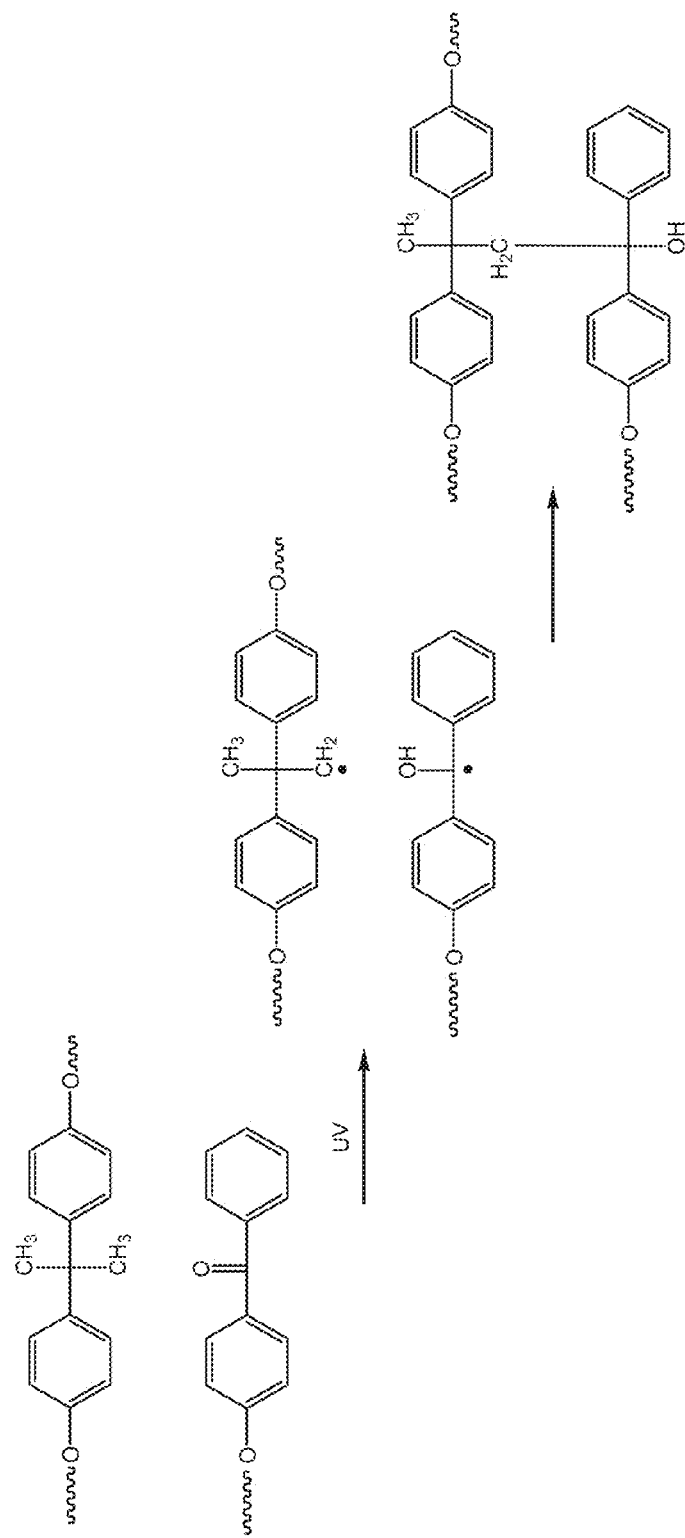
FIG. 6 illustrates the crosslinking mechanism of the photoactive additive.

The crosslinking mechanism of the additives is believed to be due to hydrogen abstraction by the ketone group from an alkyl group that acts as a hydrogen donor and subsequent coupling of the resulting radicals. This mechanism is illustrated in FIG. 6 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of hydrogen is critical for the reaction to occur.

In particular embodiments, the photoactive additives (PAAs) disclosed herein are cross-linkable polycarbonates comprising endcaps derived from a monofunctional benzophenone (i.e. of Formula (1)). In more specific embodiments, the monofunctional benzophenone is a monohydroxybenzophenone. These polycarbonates, prior to cross-linking, can be provided as thermally stable high melt-flow polymers, and can thus be used to fabricate a variety of thin-walled articles (e.g., 3 mm or less). These articles may subsequently be treated (e.g., with UV-radiation) to affect cross-linking, thereby providing thin-walled materials that meet desired performance requirements (e.g., 5VA performance, chemical resistance, transparency). The cross-linked materials, in addition to flame resistance and chemical resistance, may retain or exhibit superior mechanical properties (e.g., impact resistance, ductility) as compared to the composition prior to cross-linking.

The use of monohydroxybenzophenone derived endcaps provides several advantages over polycarbonates incorporating repeating units derived from dihydroxybenzophenone monomers. Specifically, the monohydroxybenzophenone endcap is more economical, as less monomer is typically used. In addition, incorporation of the monohydroxybenzophenone into the polycarbonate can be particularly controlled, as the monohydroxybenzophenone will only react as a chain stopper. Accordingly, use of monohydroxybenzophenone eliminates the need for careful monitoring of polymerization kinetics or how the monomer is incorporated, as compared with a corresponding dihydroxybenzophenone monomer.

The monohydroxybenzophenone endcaps of the cross-linkable polycarbonates provide a reactive functional group for cross-linking the polycarbonates. For example, treatment of a cross-linkable polycarbonate of the invention with a suitable dose of ultra-violet radiation, as further described herein, may initiate cross-linking reaction between the monohydroxybenzophenone carbonyl carbon and a carbon atom of another functional group (e.g., a methylene carbon atom, such as in bisphenol-A) in the same polymer or another polymer in the composition.

Suitable monohydroxybenzophenone chain-stoppers include, but are not limited to, 2-hydroxybenzophenone, 3-hydroxybenzophenone, 4-hydroxybenzophenone, 4-hydroxybenzoylbenzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In one preferred embodiment, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In another preferred embodiment, the monohydroxybenzophenone is 4-hydroxybenzophenone.

The cross-linkable polycarbonates (also referred to as "non-cross-linked polycarbonates") may comprise about 0.5 mol % to about 5 mol % endcap groups derived from a monohydroxybenzophenone, about 1 mol % to about 3 mol % endcap groups derived from a monohydroxybenzophenone, about 1.7 mol % to about 2.5 mol % endcap groups derived from a monohydroxybenzophenone, about 2 mol % to about 2.5 mol % endcap groups derived from a monohydroxybenzophenone, or about 2.5 mol % to about 3.0 mol % endcap groups derived from a monohydroxybenzophenone. The cross-linkable polycarbonates may have a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

As described above, other end-capping agents can be incorporated into the cross-linkable polycarbonates. Exemplary chain-stoppers include certain monophenolic compounds (i.e., phenyl compounds having a single free hydroxy group), monocarboxylic acid chlorides, monocarboxylic acids, and/or monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used.

Endgroups can be derived from the carbonyl source (i.e., the diaryl carbonate or carbonate precursor, or first linker moiety), from selection of monomer ratios, incomplete polymerization, chain scission, and the like, as well as any added endcapping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of bis(methyl salicyl) carbonate (BMSC) or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC.

The cross-linkable polycarbonates of the present disclosure include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate. For reference, the term "dipolymer" refers to copolymers derived specifically from two different monomers, and the term "terpolymer" refers to copolymers derived specifically from three different monomers The cross-linkable polycarbonate may thus comprise identical or different repeating units derived from one or more monomers (e.g. a second, third, fourth, fifth, sixth, etc., other monomer compound). The monomers of the cross-linkable polycarbonate may be randomly incorporated into the polycarbonate. For example, a cross-linkable polycarbonate copolymer of the present disclosure may be arranged in an alternating sequence following a statistical distribution, which is independent of the mole ratio of the structural units present in the polymer chain. A random cross-linkable polycarbonate copolymer may have a structure, which can be indicated by the presence of several block sequences (I—I) and (O—O) and alternate sequences (I—O) or (O—I), that follow a statistical distribution. In a random x:(1-x) copolymer, wherein x is the mole percent of a first monomer(s) and 1-x is the mole percent of the monomers, one can calculate the distribution of each monomer using peak area values determined by $^{13}C$ NMR, for example.

A cross-linkable polycarbonate copolymer of the present disclosure may have alternating I and O units (—I—O—I—O—I—O—I—O—), or I and O units arranged in a repeating sequence (e.g. a periodic copolymer having the formula: (I—O—I—O—O—I—I—I—I—O—O—O)n). The cross-linkable polycarbonate copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The cross-linkable polycarbonate copolymer may be a block copolymer that comprises two or more homopolymer subunits linked by covalent bonds (—I—I—I—I—I—O—O—O—O—O—). The union of the homopolymer subunits may require an intermediate non-repeating subunit, known as a junction block. Block copolymers with two or three distinct blocks are called diblock copolymers and triblock copolymers, respectively.

The cross-linkable polycarbonates of the present disclosure may include any suitable mole % of selected monomer units, with the proviso that the polycarbonates comprise a mol % (e.g., about 0.5 mol % to about 5 mol %) of endcap groups derived from a monohydroxybenzophenone. The polymers may comprise about 1% to about 99.5%, about 5% to about 95%, about 10% to about 90%, about 15% to about 85%, about 20% to about 80%, about 25% to about 75%, about 30% to about 70%, about 35% to about 65%, about 40% to about 60%, or about 45% to about 55% mole % of a selected monomer unit.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C. In certain embodiments, the polycarbonates have glass transition temperatures of 149.0° C., 149.1° C., 149.2° C., 149.3° C., 149.4° C., 149.5° C., 149.6° C., 149.7° C., 149.8° C., 149.9° C., 150.0° C., 150.1°

C., 150.2° C., 150.3° C., 150.4° C., 150.5° C., 150.6° C., 150.7° C., 150.8° C., 150.9° C., 151.0° C., 151.1° C., 151.2° C., 151.3° C., 151.4° C., 151.5° C., 151.6° C., 151.7° C., 151.8° C., 151.9° C., 152.0° C., 152.1° C., 152.2° C., 152.3° C., 152.4° C., 152.5° C., 152.6° C., 152.7° C., 152.8° C., 152.9° C., or 153.0° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV detector set at 264 nm. Samples may be prepared at a concentration of about 1 mg/ml, and eluted at a flow rate of about 1.0 ml/min.

The cross-linkable polycarbonates of the present disclosure may have a polydispersity index (PDI) of about 1.0 to about 10.0, about 2.0 to about 7.0, or about 3.0 to about 6.0, or about 3.0 to about 7.3, or about 2.4 to about 5.2. In certain embodiments, the polycarbonates have PDIs of about 2.50, about 3.00, about 3.50, about 4.00, about 4.50, about 5.00, about 5.50, about 6.00, about 6.50, about 7.00, or about 7.50.

It is noted that the molecular weight (both weight-average and number-average) of the photoactive additive/cross-linkable polycarbonate can be measured using two different kinds of detectors. More specifically, the molecular weight can be measured using an ultraviolet (UV) detector or using a refractive index (RI) detector, using GPC and calibrated to polycarbonate standards for both detectors. In this regard, the UV detector overweights the presence of low-molecular-weight chains due to the higher extinction coefficient of the monohydroxybenzophenone in the UV detector. This does not occur in the RI detector, and so the PDI as measured by the RI detector is always lower than the PDI as measured by the UV detector.

In embodiments, the ratio of the polydispersity index (PDI) measured using a UV detector to the PDI measured using an RI detector is 1.8 or less, when using a GPC method and polycarbonate molecular weight standards. The ratio may also be 1.5 or less, or 1.2 or less. The PDI ratio has a minimum value of 1.0. As described further herein, the process by which the cross-linkable polycarbonate is made can affect the PDI ratio between the UV detector and the RI detector.

The cross-linkable polycarbonates of the present disclosure may have a melt volume flow rate (often abbreviated MVR), which measures the rate of extrusion of a composition through an orifice at a prescribed temperature and load. In certain embodiments, the polycarbonates may have an MVR of 2 to 4 $cm^3/10$ min, 2 to 12 $cm^3/10$ min, 2 to 70 $cm^3/10$ min, 2 to 50 $cm^3/10$ min, 2 to 40 $cm^3/10$ min, 2 to 30 $cm^3/10$ min, 2 to 25 $cm^3/10$ min, 2 to 20 $cm^3/10$ min, 5 to 70 $cm^3/10$ min, 5 to 50 $cm^3/10$ min, 5 to 40 $cm^3/10$ min, 5 to 30 $cm^3/10$ min, 5 to 25 $cm^3/10$ min, 5 to 20 $cm^3/10$ min, 8 to 10 $cm^3/10$ min, 8 to 12 $cm^3/10$ min, 10 to 170 $cm^3/10$ min, 10 to 50 $cm^3/10$ min, 10 to 40 $cm^3/10$ min, 10 to 30 $cm^3/10$ min, 10 to 25 $cm^3/10$ min, or 10 to 20 $cm^3/10$ min, using the ASTM D1238 method, 1.2 kg load, 300° C. temperature, 360 second dwell. In certain embodiments, the polycarbonates may have an MVR measured using the ASTM D1238 method, 1.2 kg load, 300° C. temperature, 360 second dwell, of: 2.0 $cm^3/10$ min, 2.1 $cm^3/10$ min, 2.2 $cm^3/10$ min, 2.3 $cm^3/10$ min, 2.4 $cm^3/10$ min, 2.5 $cm^3/10$ min, 2.6 $cm^3/10$ min, 2.7 $cm^3/10$ min, 2.8 $cm^3/10$ min, 2.9 $cm^3/10$ min, 3.0 $cm^3/10$ min, 3.1 $cm^3/10$ min, 3.2 $cm^3/10$ min, 3.3 $cm^3/10$ min, 3.4 $cm^3/10$ min, 3.5 $cm^3/10$ min, 3.6 $cm^3/10$ min, 3.7 $cm^3/10$ min, 3.8 $cm^3/10$ min, 3.9 $cm^3/10$ min, 4.0 $cm^3/10$ min, 4.1 $cm^3/10$ min, 4.2 $cm^3/10$ min, 4.3 $cm^3/10$ min, 4.4 $cm^3/10$ min, 4.5 $cm^3/10$ min, 4.6 $cm^3/10$ min, 4.7 $cm^3/10$ min, 4.8 $cm^3/10$ min, 4.9 $cm^3/10$ min, 5.0 $cm^3/10$ min, 5.1 $cm^3/10$ min, 5.2 $cm^3/10$ min, 5.3 $cm^3/10$ min, 5.4 $cm^3/10$ min, 5.5 $cm^3/10$ min, 5.6 $cm^3/10$ min, 5.7 $cm^3/10$ min, 5.8 $cm^3/10$ min, 5.9 $cm^3/10$ min, 6.0 $cm^3/10$ min, 6.1 $cm^3/10$ min, 6.2 $cm^3/10$ min, 6.3 $cm^3/10$ min, 6.4 $cm^3/10$ min, 6.5 $cm^3/10$ min, 6.6 $cm^3/10$ min, 6.7 $cm^3/10$ min, 6.8 $cm^3/10$ min, 6.9 $cm^3/10$ min, 7.0 $cm^3/10$ min, 7.1 $cm^3/10$ min, 7.2 $cm^3/10$ min 7.3 $cm^3/10$ min, 7.4 $cm^3/10$ min, 7.5 $cm^3/10$ min, 7.6 $cm^3/10$ min, 7.7 $cm^3/10$ min, 7.8 $cm^3/10$ min, 7.9 $cm^3/10$ min, 8.0 $cm^3/10$ min, 8.1 $cm^3/10$ min, 8.2 $cm^3/10$ min, 8.3 $cm^3/10$ min, 8.4 $cm^3/10$ min, 8.5 $cm^3/10$ min, 8.6 $cm^3/10$ min, 8.7 $cm^3/10$ min, 8.8 $cm^3/10$ min, 8.9 $cm^3/10$ min, 9.0 $cm^3/10$ min, 9.1 $cm^3/10$ min, 9.2 $cm^3/10$ min, 9.3 $cm^3/10$ min, 9.4 $cm^3/10$ min, 9.5 $cm^3/10$ min, 9.6 $cm^3/10$ min, 9.7 $cm^3/10$ min, 9.8 $cm^3/10$ min, 9.9 $cm^3/10$ min, 10.0 $cm^3/10$ min, 10.1 $cm^3/10$ min, 10.2 $cm^3/10$ min, 10.3 $cm^3/10$ min, 10.4 $cm^3/10$ min, 10.5 $cm^3/10$ min, 10.6 $cm^3/10$ min, 10.7 $cm^3/10$ min, 10.8 $cm^3/10$ min, 10.9 $cm^3/10$ min, 11.0 $cm^3/10$ min, 11.1 $cm^3/10$ min, 11.2 $cm^3/10$ min, 11.3 $cm^3/10$ min, 11.4 $cm^3/10$ min, 11.5 $cm^3/10$ min, 11.6 $cm^3/10$ min, 11.7 $cm^3/10$ min, 11.8 $cm^3/10$ min, 11.9 $cm^3/10$ min, 12.0 $cm^3/10$ min, 12.1 $cm^3/10$ min, 12.2 $cm^3/10$ min, 12.3 $cm^3/10$ min, 12.4 $cm^3/10$ min, 12.5 $cm^3/10$ min, 12.6 $cm^3/10$ min, 12.7 $cm^3/10$ min, 12.8 $cm^3/10$ min, 12.9 $cm^3/10$ min, 13.0 $cm^3/10$ min, 13.1 $cm^3/10$ min, 13.2 $cm^3/10$ min, 13.3 $cm^3/10$ min, 13.4 $cm^3/10$ min, 13.5 $cm^3/10$ min, 13.6 $cm^3/10$ min, 13.7 $cm^3/10$ min, 13.8 $cm^3/10$ min, 13.9 $cm^3/10$ min, 14.0 $cm^3/10$ min, 14.1 $cm^3/10$ min, 14.2 $cm^3/10$ min, 14.3 $cm^3/10$ min, 14.4 $cm^3/10$ min, 14.5 $cm^3/10$ min, 14.6 $cm^3/10$ min, 14.7 $cm^3/10$ min, 14.8 $cm^3/10$ min, 14.9 $cm^3/10$ min, 15.0 $cm^3/10$ min, 15.1 $cm^3/10$ min, 15.2 $cm^3/10$ min, 15.3 $cm^3/10$ min, 15.4 $cm^3/10$ min, 15.5 $cm^3/10$ min, 15.6 $cm^3/10$ min, 15.7 $cm^3/10$ min, 15.8 $cm^3/10$ min, 15.9 $cm^3/10$ min, 16.0 $cm^3/10$ min, 16.1 $cm^3/10$ min, 16.2 $cm^3/10$ min, 16.3 $cm^3/10$ min, 16.4 $cm^3/10$ min, 16.5 $cm^3/10$ min, 16.6 $cm^3/10$ min, 16.7 $cm^3/10$ min, 16.8 $cm^3/10$ min, 16.9 $cm^3/10$ min, 17.0 $cm^3/10$ min, 17.1 $cm^3/10$ min, 17.2 $cm^3/10$ min, 17.3 $cm^3/10$ min, 17.4 $cm^3/10$ min, 17.5 $cm^3/10$ min, 17.6 $cm^3/10$ min, 17.7 $cm^3/10$ min, 17.8 $cm^3/10$ min, 17.9 $cm^3/10$ min, 18.0 $cm^3/10$ min, 18.1 $cm^3/10$ min, 18.2 $cm^3/10$ min, 18.3 $cm^3/10$ min, 18.4 $cm^3/10$ min, 18.5 $cm^3/10$ min, 18.6 $cm^3/10$ min 18.7 $cm^3/10$ min, 18.8 $cm^3/10$ min, 18.9 $cm^3/10$ min, 19.0 $cm^3/10$ min, 19.1 $cm^3/10$ min, 19.2 $cm^3/10$ min, 19.3 $cm^3/10$ min, 19.4 $cm^3/10$ min, 19.5 $cm^3/10$ min, 19.6 $cm^3/10$ min, 19.7 $cm^3/10$ min, 19.8 $cm^3/10$ min, 19.9 $cm^3/10$ min, 20.0 $cm^3/10$ min, 20.1 cm³/10 min, 20.2 cm³/10 min, 20.3 cm³/10 min, 20.4 cm³/10 min, 20.5 cm³/10 min, 20.6 cm³/10 min, 20.7 cm³/10 min, 20.8 cm³/10 min, 20.9 cm³/10 min, 21.0 cm³/10 min, 21.1 cm³/10 min, 21.2 cm³/10 min, 21.3 cm³/10 min, 21.4 cm³/10 min, 21.5 cm³/10 min, 21.6 cm³/10 min, 21.7 cm³/10 min, 21.8 cm³/10 min, 21.9 cm³/10 min, 22.0 cm³/10 min, 22.1 cm³/10 min, 22.2 cm³/10 min, 22.3 cm³/10 min, 22.4 cm³/10 min, 22.5 cm³/10 min, 22.6 cm³/10 min, 22.7 cm³/10 min, 22.8 cm³/10 min, 22.9 cm³/10 min, 23.0 cm³/10 min, 23.1 cm³/10 min, 23.2 cm³/10 min, 23.3 cm³/10 min, 23.4 cm³/10 min, 23.5 cm³/10 min, 23.6 cm³/10 min, 23.7 cm³/10 min, 23.8 cm³/10 min, 23.9 cm³/10 min, 24.0 cm³/10 min, 24.1 cm³/10 min, 24.2 cm³/10 min, 24.3 cm³/10 min, 24.4 cm³/10 min, 24.5 cm³/10 min, 24.6 cm³/10 min, 24.7 cm³/10 min, 24.8 cm³/10 min, 24.9 cm³/10 min, 25.0 cm³/10 min, 25.1 cm³/10 min, 25.2 cm³/10 min, 25.3 cm³/10 min, 25.4 cm³/10 min, 25.5 cm³/10 min, 25.6 cm³/10 min, 25.7 cm³/10 min, 25.8 cm³/10 min, 25.9 cm³/10 min, 26.0 cm³/10 min, 26.1 cm³/10 min, 26.2 cm³/10 min, 26.3 cm³/10 min, 26.4 cm³/10 min, 26.5 cm³/10 min, 26.6 cm³/10 min, 26.7 cm³/10 min, 26.8 cm³/10 min, 26.9 cm³/10 min, 27.0 cm³/10 min, 27.1 cm³/10 min, 27.2 cm³/10 min, 27.3 cm³/10 min, 27.4 cm³/10 min, 27.5 cm³/10 min, 27.6 cm³/10 min, 27.7 cm³/10 min, 27.8 cm³/10 min, 27.9 cm³/10 min, 28.0 cm³/10 min, 28.1 cm³/10 min, 28.2 cm³/10 min, 28.3 cm³/10 min, 28.4 cm³/10 min, 28.5 cm³/10 min, 28.6 cm³/10 min, 28.7 cm³/10 min, 28.8 cm³/10 min, 28.9 cm³/10 min, 29.0 cm³/10 min, 29.1 cm³/10 min, 29.2 cm³/10 min, 29.3 cm³/10 min, 29.4 cm³/10 min, 29.5 cm³/10 min, 29.6 cm³/10 min, 29.7 cm³/10 min, 29.8 cm³/10 min, 29.9 cm³/10 min, 30.0 cm³/10 min, 30.1 cm³/10 min, 30.2 cm³/10 min, 30.3 cm³/10 min, 30.4 cm³/10 min, 30.5 cm³/10 min, 30.6 cm³/10 min, 30.7 cm³/10 min, 30.8 cm³/10 min, 30.9 cm³/10 min, 31.0 cm³/10 min, 31.1 cm³/10 min, 31.2 cm³/10 min, 31.3 cm³/10 min, 31.4 cm³/10 min, 31.5 cm³/10 min, 31.6 cm³/10 min, 31.7 cm³/10 min, 31.8 cm³/10 min, 31.9 cm³/10 min, 32.0 cm³/10 min, 32.1 cm³/10 min, 32.2 cm³/10 min, 32.3 cm³/10 min, 32.4 cm³/10 min, 32.5 cm³/10 min, 32.6 cm³/10 min, 32.7 cm³/10 min, 32.8 cm³/10 min, 32.9 cm³/10 min, 33.0 cm³/10 min, 33.1 cm³/10 min, 33.2 cm³/10 min, 33.3 cm³/10 min, 33.4 cm³/10 min, 33.5 cm³/10 min, 33.6 cm³/10 min, 33.7 cm³/10 min, 33.8 cm³/10 min, 33.9 cm³/10 min, 34.0 cm³/10 min, 34.1 cm³/10 min, 34.2 cm³/10 min, 34.3 cm³/10 min, 34.4 cm³/10 min, 34.5 cm³/10 min, 34.6 cm³/10 min, 34.7 cm³/10 min, 34.8 cm³/10 min, 34.9 cm³/10 min, or 35.0 cm³/10 min.

The cross-linkable polycarbonates of the present disclosure may have a biocontent of 2 weight % to 90 weight %; 5 weight % to 25 weight %; 10 weight % to 30 weight %; 15 weight % to 35 weight %; 20 weight % to 40 weight %; 25 weight % to 45 weight %; 30 weight % to 50 weight %; 35 weight % to 55 weight %; 40 weight % to 60 weight %; 45 weight % to 65 weight %; 55 weight % to 70% weight %; 60 weight % to 75 weight %; 50 weight % to 80 weight %; or 50 weight % to 90 weight %. The biocontent may be measured according to ASTM D6866.

The cross-linkable polycarbonates of the present disclosure may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In an embodiment the cross-linkable polycarbonates of the present disclosure may have a flexural modulus of 2,200 to 2,500, preferably 2,250 to 2,450, more preferably 2,300 to 2,400 MPa. The flexural modulus is also measured by ASTM D790.

In another embodiment the cross-linkable polycarbonates of the present disclosure may have a flexural modulus of 2,300 to 2,600, preferably 2,400 to 2,600, more preferably 2,450 to 2,550 MPa.

The cross-linkable polycarbonates of the present disclosure may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the present disclosure may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioethers, aliphatic polyacetals, aliphatic polycarbonates, C—C linked polymers and polysiloxanes. The soft segments of aliphatic polyesters, aliphatic polyethers, aliphatic polythioethers, aliphatic polyacetals, aliphatic polycarbonates may be characterized as having Number Average MWs (Mns) of greater than 600.

In certain embodiments, the cross-linkable polycarbonates of the present disclosure do not include units derived from aromatic di-, tri-, or tetrahydroxyketones.

In certain embodiments, the cross-linkable polycarbonates of the present disclosure do not include units derived from dihydroxybenzophenone monomers, trihydroxybenzophenone monomers, tetrahydroxybenzophenone monomers, or other multiple-hydroxybenzophenone monomers. For example, the following monomer units may be excluded from use in the cross-linkable and cross-linked polycarbonates of the present disclosure: 4,4'-dihydroxybenzophenone, 2,4-dihydroxybenzophenone, and 4-(α,α-bis(4-hydroxyphenyl)ethyl-benzophenone.

In particular embodiments, the photoactive additive is a non-cross-linked (i.e. cross-linkable) polycarbonate having the structure of Formula (I):

wherein $R^1$ and $R^2$ are independently halogen, $C_{1-6}$ alkyl, $C_{3-8}$ cycloalkyl, aryl, or arylalkyl; x is an integer from 0 to 4; y is an integer from 0 to 5; n' is an integer from 29 to 65; and the repeating unit W is derived from:
(i) a monomer having the structure:

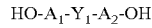

wherein each of $A_1$ and $A_2$ comprise a monocyclic divalent arylene group, and $Y_1$ is a bridging group having one or more atoms; or
(ii) a monomer having the structure:

each $R^k$ is independently halogen, a $C_{1-10}$ hydrocarbon group, or a halogen substituted $C_{1-10}$ hydrocarbon group; and n is 0 to 4. In more particular embodiments, the repeating unit W is derived from bisphenol-A.

In more specific embodiments, the non-cross-linked (i.e. cross-linkable) polycarbonate has the structure of Formula (II):

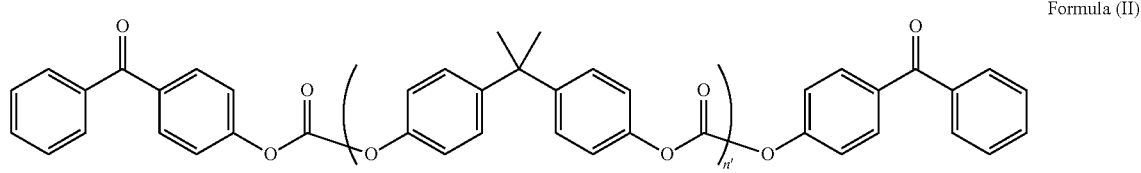

Formula (II)

wherein n' ranges from 29 to 65.

In particular embodiments, the photoactive cross-linkable polycarbonate contains about 0.5 mol % of endcaps derived from a monohydroxybenzophenone, and has a weight-average molecular weight (Mw) from 17,000 to 30,000 Daltons. In other specific embodiments, the photoactive cross-linkable polycarbonate contains about 2.5 mol % of endcaps derived from a monohydroxybenzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg/360 sec dwell, and can achieve UL94 V0 performance at a thickness of 2.0 mm.

An interfacial polycondensation polymerization process for bisphenol-A (BPA) based polycarbonates can be used to prepare the photoactive additives (PAAs) of the present disclosure. Although the reaction conditions for interfacial polymerization can vary, an exemplary process generally involves dissolving or dispersing one or more dihydric phenol reactants (e.g. bisphenol-A) in aqueous caustic soda or potash, adding the resulting mixture to a water-immiscible solvent medium, and contacting the reactants with a Formula (I)

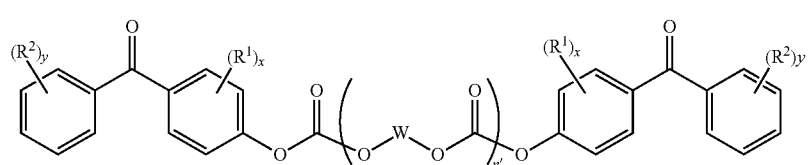

carbonate precursor (e.g. phosgene) in the presence of a catalyst (e.g. triethylamine, TEA) under controlled pH conditions, e.g., 8 to 11.

Four different interfacial processes are disclosed herein for producing some embodiments of the photoactive additive which contain carbonate linkages. Each process includes the following ingredients: a monohydroxy compound, a polyhydroxy compound, a carbonate precursor, a tertiary amine catalyst, water, and a water-immiscible organic solvent. The monohydroxy compound is the photoactive moiety. It should be noted that more than one of each ingredient can be used to produce the photoactive additive. For example, both bisphenol-A and trishydroxyphenylethane (THPE) would be considered polyhydroxy compounds (though one is a diol chain extender and the other is a branching agent). Some information on each ingredient is first provided below.

The monohydroxy compound is the photoactive moiety previously described. For example, the monohydroxy compound can have the structure of any one of Formulas (1), (3), or (5)-(10). The monohydroxy compound acts as an endcapping agent, and the previously described endcapping agents (e.g. p-cumyl phenol) could also be used. If desired, more than one monohydroxy compound can be used. In particular embodiments for producing a cross-linkable polycarbonate, the monohydroxy compound is a monohydroxybenzophenone of Formula (1).

The term "polyhydroxy compound" here refers to a compound having two or more hydroxyl groups. In contrast, the term "dihydroxy compound" refers to a compound having only two hydroxyl groups. The polyhydroxy compound can be a dihydroxy compound having the structure of any one of Formulas (B)-(H), which are chain extenders, and include monomers such as bisphenol-A. In addition, the secondary linker moieties of any one of Formulas (43)-(49) can be considered a polyhydroxy compound, and are useful as branching agents. If desired, more than one polyhydroxy compound can be used. See, for example, the reaction in FIG. 5. In the cross-linkable polycarbonates of the present disclosure, bisphenol-A is typically used.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (30)-(35).

A tertiary amine catalyst is used for polymerization. Exemplary tertiary amine catalysts that can be used are aliphatic tertiary amines such as triethylamine (TEA), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group.

The most commonly used water-immiscible solvents include methylene chloride, 1,2-dichloroethane, chlorobenzene, toluene, and the like.

In the first process, sometimes referred to as the "upfront" process, all of the hydroxy compounds, catalysts, water, and water-immiscible solvent are combined upfront in a vessel to form a reaction mixture. The reaction mixture is then exposed to the carbonate precursor, for example by phosgenation, to obtain the photoactive additive.

In the second process, also known as the "solution addition" process, the polyhydroxy compound(s), tertiary amine catalyst, water, and water-immiscible solvent are combined in a vessel to form a reaction mixture. The carbonate precursor is then added to this reaction mixture in the vessel over a first time period. During this time period, the monohydroxy compound is added in a controlled manner to the reaction mixture as well, also referred to as programmed addition. The addition of the monohydroxy compound occurs throughout the first time period, rather than as a bolus at one time point (as in the upfront process). The photoactive additive is thus obtained.

The third process is also referred to as a bis-chloroformate (BCF) process. Bischloroformate oligomers are prepared by reacting the carbonate precursor, specifically phosgene, with the polyhydroxy compound(s) in the absence of the tertiary amine catalyst. After the bischloroformate oligomers are generated, the monohydroxy compound is added to the chloroformate mixture. The reaction is allowed to proceed, and the tertiary amine catalyst is added to complete the reaction.

The fourth process uses a tubular reactor. In the tubular reactor, the monohydroxy compound is pre-reacted with the carbonate precursor (specifically phosgene) to form chloroformates. The water-immiscible solvent is used as a solvent in the tubular reactor. In a separate reactor, the polyhydroxy compound, tertiary amine catalyst, water, and water-immiscible solvent are combined to form a reaction mixture. The chloroformates in the tubular reactor are then fed into the reactor over a first time period along with additional carbonate precursor to complete the reaction.

The resulting photoactive additive (e.g. the cross-linkable polycarbonate) contains only a small amount of low-molecular-weight components. This can be measured in two different ways: the level of diarylcarbonates and the lows percentage can be measured. Diarylcarbonates are formed by the reaction of two monohydroxybenzophenones with phosgene, creating a small molecule that contains no chain extender (e.g. bisphenol-A). In embodiments, the resulting photoactive additive contains less than 1900 ppm of diarylcarbonates. In more specific embodiments, the photoactive additive contains less than 700 ppm, or about 100 ppm or less of diarylcarbonates. The lows percentage is the percentage by weight of oligomeric chains having a molecular weight of less than 1000. In embodiments, the lows percentage is 2.0 wt % or less, or 1.5 wt % or less, including from about 1.0 wt % to 1.5 wt %, or from about 1.0 wt % to 1.7 wt %, or from about 1.0 wt % to 2.0 wt %. Also of note is that the resulting photoactive additive does not contain any residual pyridine, because pyridine is not used in the manufacture of the photoactive additive.

The ratio of the polydispersity index (PDI) measured using a UV detector to the PDI measured using an RI detector may be 1.8 or less, when using a GPC method and polycarbonate molecular weight standards, or may be 1.5 or less, or 1.2 or less.

The photoactive additive (PAA) can be blended with one or more polymeric base resins by melt blending or solution blending to form a polymeric composition/blend. The PAA-containing blend can be then be formed into an article by a variety of known processes such as solution casting, profile extrusion, film and/or sheet extrusion, sheet-foam extrusion, injection molding, blow molding, thermoforming, and the like.

The article is then exposed to ultraviolet (UV) light at an appropriate wavelength and in an appropriate dosage that brings about the desired amount of crosslinking for the given application. Depending on the end use application and the desired properties, the UV exposure can be performed on one or more sides of the article.

The article where the enhanced properties are needed should be exposed with a substantially uniform dose of UV light. The exposure can be accomplished using standard methods known in the art. For example, the UV light can come from any source of UV light such as, but not limited to, those lamps powered by microwave, HID lamps, and mercury vapor lamps. In some other embodiments, the article is exposed by using natural sunlight. The exposure time will be dependent on the application and color of material. It can range from a few minutes to several days. Alternatively, the crosslinking can be accomplished by using a UV-emitting light source such as a mercury vapor, High-Intensity Discharge (HID), or various UV lamps. For example, commercial UV lamps are sold for UV curing from manufacturers such as Hereaus Noblelight and Fusion UV. Non-limiting examples of UV-emitting light bulbs include mercury bulbs (H bulbs), or metal halide doped mercury bulbs (D bulbs, H+ bulbs, and V bulbs). Other combinations of metal halides to create a UV light source are also contemplated. Exemplary bulbs could also be produced by assembling the lamp out of UV-absorbing materials and considered as a filtered UV source. A mercury arc lamp is not used for irradiation. An H bulb has strong output in the range of 200 nm to 320 nm. The D bulb has strong output in the 320 nm to 400 nm range. The V bulb has strong output in the 400 nm to 420 nm range.

It can be beneficial to control the temperature. Often increased temperature can increase the crosslinking, but if the temperature is excessive the article can become unacceptably discolored, warped, or distorted.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction. In particular embodiments, when a 1.6 mm bar is made and exposed to UV radiation, then placed for 48 hours at 23° C. in the dark, the crosslinked bar has a delta YI after 48 hours of 4 or less.

In particular embodiments, the article is exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

UV wavelengths can be separated into four different categories. UVA refers to wavelengths from 320 nm to 390 nm. UVB refers to wavelengths from 280 nm to 320 nm. UVC refers to wavelengths from 250 nm to 260 nm. UVV refers to wavelengths from 395 nm to 445 nm. In various embodiments, the total UV energy to which the surface of the formed article is exposed is calculated as the sum of the energy from UVA, UVB, and UVC light irradiated over a set period of time, and is about from about 40 J/cm$^2$ to about 50 J/cm$^2$, including about 45 J/cm$^2$.

A high quality crosslinked layer in an article is a layer which has the desired crosslinked layer thickness; desired cross-linked density (higher crosslink density may afford better chemical resistance, but may also lead to lower toughness); a lower level of color shift; a lower level of warp and article distortion; and/or a low level of resin degradation from harmful UV radiation. A high quality crosslinked layer and article is achieved by selecting UV light that induces crosslinking while minimizing the UV light wavelengths which induce degradation and color formation of the composition.

The exposed article will have a cross-linked outer surface and an inner surface that is either lightly cross-linked or not cross-linked. The outer surface can be cross-linked to such a degree that the outer surface is substantially insoluble in the common solvents for the starting resins. The percentage of the insolubles will be dependent on the part geometry and surface-to-volume ratio, but will generally be from 2% to 95%. For a ⅛" ASTM Izod bar exposed on one side, the percentage of insoluble will be from 1% to 75%. For most ⅛" articles exposed on one side, the insolubles will be from 2% to 10%.

The amount of PAA added to the blend can be used to fine-tune the final properties of the article. For example, articles requiring high chemical resistance and FR drip inhibition would need increased PAA content. In general, depending on the application, the overall molar percentage of the PAA should be from 0.5 mole % to 15 mole %, based on the weight of the polymeric resin. In more specific applications, the overall percentage is from 1 mole % to 10 mole %.

Second Polymer Resin

The PAAs can be blended with a polymeric base resin that is different from the photoactive additive, i.e. a second polymer resin, to form the polymeric compositions/blends of the present disclosure. More specifically, the second polymer resin does not contain photoactive groups. In embodiments, the weight ratio of the photoactive additive to the polymeric base resin is from 1:99 to 99:1, including from about 50:50 to about 85:15. The polymeric base resin has, in specific embodiments, a weight-average molecular weight of about 21,000 or greater, including from about 21,000 to about 40,000.

The PAAs are suitable for blending with polycarbonate homopolymers, polycarbonate copolymers, and polycarbonate blends. They are also suitable for blending with polyesters, polyarylates, polyestercarbonates, and polyetherimides.

The blends may comprise one or more distinct cross-linkable polycarbonates, as described herein, and/or one or more cross-linked polycarbonates, as described herein, as the photoactive additive. The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

The second polymer (Polymer B) may be any polymer different from the first polymer that is suitable for use in a blend composition. In certain embodiments, the second polymer may be a polycarbonate, a polyester, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the polymeric base resin may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the polymeric base resin may be a homopolycarbonate, a copolycarbonate, a polycarbonate-polysiloxane copolymer, a polyester-polycarbonate, or any combination thereof. In certain embodiments, the polymeric base resin is a p-cumyl phenol capped poly(isophthalate-terephthalate-resorcinol ester)-co-(bisphenol-A carbonate) copolymer. In certain embodiments, the polymeric base resin is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the polymeric base resin is a p-cumylphenol capped poly(19 mol % isophthalate-terephthalate-resorcinol ester)-co-(75 mol % bisphenol-A carbonate)-co-(6 mol resorcinol carbonate) copolymer (MW=29,000 Daltons). In another preferred embodiment, the polymeric base resin is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons).

In another preferred embodiment, the polymeric base resin is a polycarbonate polysiloxane copolymer. The polycarbonate-polysiloxane copolymer may be a siloxane block co-polycarbonate comprising from about 6 wt % siloxane (±10%) to about 20 wt % siloxane (±10%) and having a siloxane chain length of 10 to 200. In another preferred embodiment, the polymeric base resin is a PC-siloxane copolymer with 20% siloxane segments by weight. In another preferred embodiment, the polymeric base resin is a p-cumylphenol capped poly(65 mol % BPA carbonate)-co-(35 mol % 3,3-bis(4-hydroxyphenyl)-2-phenylisoindolin-1-one (PPPBP) carbonate) copolymer (MW=25,000 Daltons).

In another preferred embodiment, the polymeric base resin is a polyphosphonate polymer, a polyphosphonate copolymer, or a poly(polyphosphonate)-co-(BPA carbonate) copolymer.

In yet other embodiments, the polymeric base resin is selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a polyethylene terephthalate polymer; a bisphenol-A homopolymer; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; or a dimethyl bisphenol cyclohexane-co-bisphenol-A copolymer.

Other conventional additives can also be added to the polymeric composition (e.g. an impact modifier, UV stabilizer, colorant, flame retardant, heat stabilizer, plasticizer, lubricant, mold release agent, filler, reinforcing agent, antioxidant agent, antistatic agent, blowing agent, anti-drip agent, or radiation stabilizer).

In a preferred embodiment, the blend compositions disclosed herein comprise a flame-retardant/anti-drip agent, a flame retardant additive, and/or an impact modifier. The flame-retardant/anti-drip agent may be potassium perfluorobutane sulfonate (Rimar salt), potassium diphenyl sulfone-3-sulfonate (KSS), or a combination thereof.

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain embodiments, the flame retardant does not contain bromine or chlorine.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

In particular embodiments, the polymeric blend/composition includes the photoactive additive, an optional polymeric base resin, and a flame retardant which is Rimar salt and which is present in an amount of about 0.05 wt % to about 0.085 wt %, based on the total weight of the composition; and a plaque comprising the polymeric composition has a transparency of 70 to 90% at a thickness of 3.2 mm, measured according to ASTM-D1003-00.

In other particular embodiments, the polymeric blend/composition includes the photoactive additive, an optional polymeric base resin, a flame retardant; a heat stabilizer, and a mold release agent.

One advantage of using the PAAs with polymeric resins is that polymers with relatively higher Mw's generally retain their mechanical properties better, while polymers with relatively lower Mw's generally have better flow properties. The PAAs can be used to produce complex or thin molded articles that are difficult to mold using higher molecular weight polymers. Upon irradiation of the molded article, crosslinks can be formed that extend the molecular weight and improve physical properties such as impact strength, tensile strength, flame retardance, or chemical resistance.

The polymeric blend can improve the chemical resistance of the final molded article. It is contemplated that molded articles can be of any desired shape (e.g. film, sheet, etc.) and be used in many different applications, for example in the medical, automotive, and consumer electronics fields. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; ForPro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Articles

Compositions/blends disclosed herein, preferably prior to cross-linking, may be formed, shaped, molded, injection molded, or extruded into an article. The compositions/blends can be molded into useful shaped articles by a variety of means such as injection molding, overmolding, co-injection molding, extrusion, multilayer extrusion, rotational molding, blow molding and thermoforming to form articles. The formed articles may be subsequently subjected to cross-linking conditions (e.g., UV-radiation) to affect cross-linking of the polycarbonates comprising monohydroxybenzophenone derived endcap. Exemplary articles include a film, a sheet, a layer of a multilayer film, or a layer of a multilayer sheet.

Articles that may be formed from the compositions/blends include various components for cell phones and cell phone covers, components for computer housings (e.g. mouse covers), fibers, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with scratch resistance and impact resistance, fendors, gas pumps, films for televisions, such as ecofriendly films having no halogen content, solar application materials, glass lamination materials, fibers for glass-filled systems, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, turbine blades (e.g., wind turbines), and the like.

In certain embodiments, articles that may comprise the composition/blend include automotive bumpers, other automotive, construction and agricultural equipment exterior components, automobile mirror housings, an automobile grille, an automobile pillar, automobile wheel covers, automobile, construction and agricultural equipment instrument panels and trim, construction and agricultural grilles, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and fiber optics.

In certain embodiments, articles that may comprise the composition/blend include automotive bumpers, other automotive exterior components, automobile mirror housings, an automobile grille, an automobile pillar, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a construction or agricultural equipment grille, a marine or personal water craft part, an all terrain vehicle or all terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and turbine blades.

In certain embodiments, the article is one that requires or must include a material having a UL94 5VA rating performance. Articles that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the article is one that requires hydrothermal stability, such as a wind turbine blade, a steam sterilizable medical device, a food service tray, utensiles and equipment.

In certain embodiments, the article is one that requires a combination of transparency, flame resistance, and/or impact resistance. For example, in certain embodiments the article may be a safety shield, safety goggles, a gas/fuel pump housing, a display window or part, or the like.

The following examples are provided to illustrate the polymeric compositions/blends, articles, processes and properties of the present disclosure. The examples are merely illustrative and are not intended to limit the disclosure to the materials, conditions, or process parameters set forth therein.

EXAMPLES

All solvents and reagents used were analytical grade.
Molecular weight determinations were performed using gel permeation chromatography (GPC), using a cross-linked styrene-divinylbenzene column and calibrated to polycarbonate references using a UV detector set at 264 nm. Samples were prepared at a concentration of about 1 mg/ml, and eluted at a flow rate of about 1.0 ml/min.

Differential scanning calorimetry (DSC) employing a temperature sweep rate of 20° C./min was used to determine glass transition temperatures of polycarbonates.

(A) Preparation of Cross-Linkable Polycarbonates

Example 1

4-Hydroxybenzophenone Endcapped Polycarbonate "Benzophenone-BPA Copolymer—0.5 mol %—23 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.13 g, 0.7 mmol); (c) para-cumylphenol (0.7 g, 3.3 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.6 g, 2 g/min, 0.188 mol). During the addition of phosgene, base (30 wt-% NaOH) was simultaneously charged to the reactor to maintain the pH of the reaction between 9-10. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC) allowed for a determination of the molecular weight of the resulting polymer. The Mw of the polycarbonate was measured to be 22,877 Daltons (referenced to polycarbonate standards) and polydispersity index=3.11.

Example 2

4-Hydroxybenzophenone Endcapped Polycarbonate "Benzophenone-BPA Copolymer—2.5 mol %—30 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.65 g, 3.3 mmol); (c) para-cumylphenol (0.14 g, 0.7 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.74 g, 2 g/min, 0.189 mol). During the addition of phosgene, base (30 wt-% NaOH) was simultaneously charged to the reactor to maintain the pH of the reaction between 9-10. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC) allowed for a determination of the molecular weight of the resulting polymer. The Mw of the polycarbonate was measured to be 30,255 Daltons (referenced to polycarbonate standards) and polydispersity index=2.09.

Example 3

4-Hydroxybenzophenone Endcapped Polycarbonate "Benzophenone-BPA Copolymer—1.7 mol %—28 k"

The following were added into a 70 L continuous stirred-tank reactor (CSTR) equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (59 g, 0.297 mol); (c) para-cumylphenol (45 g, 0.212 mol); (d) triethylamine (42 mL, 0.415 mol); (e) methylene chloride (23.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 28,366 Daltons (referenced to polycarbonate standards) and polydispersity index=3.78.

Example 4

4-Hydroxybenzophenone Endcapped Polycarbonate "Benzophenone-BPA Copolymer—2.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.438 mol); (c) para-cumylphenol (28 g, 0.132 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,106 Daltons (referenced to polycarbonate standards) and polydispersity index=6.19.

Example 5

4-Hydroxybenzophenone Endcapped Polycarbonate "Benzophenone-BPA Copolymer—0.5 mol %—28 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (105 g, 0.494 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,482 Daltons (referenced to polycarbonate standards) and polydispersity index=3.40.

Example 6

4-Hydroxybenzophenone Endcapped Polycarbonate "Benzophenone-BPA Copolymer—0.5 mol %—24 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (120 g, 0.565 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 24,379 Daltons (referenced to polycarbonate standards) and polydispersity index=3.30.

Example 7

4-Hydroxybenzophenone Endcapped Polycarbonate "Benzophenone-BPA Copolymer—0.5 mol %—21 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.697 mol); (d) triethylamine (60 mL, 0.593 mol); (e) methylene chloride (24.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 21,171 Daltons (referenced to polycarbonate standards) and polydispersity index=3.22.

Example 8

4-Hydroxybenzophenone Endcapped Polycarbonate "Benzophenone-BPA Copolymer—2.5 mol %—26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.438 mol); (c) para-cumylphenol (35 g, 0.165 mol); (d) triethylamine (80 mL, 0.79 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,916 Daltons (referenced to polycarbonate standards) and polydispersity index=5.21.

Example 9

4-Hydroxybenzophenone Endcapped Polycarbonate "Benzophenone-BPA Copolymer—0.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (105 g, 0.49 mol); (d) triethylamine (60 mL, 0.59 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,055 Daltons (referenced to polycarbonate standards) and polydispersity index=3.19.

Example 10

4-Hydroxybenzophenone Endcapped Polycarbonate "Benzophenone-BPA Copolymer—0.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.698 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,256 Daltons (referenced to polycarbonate standards) and polydispersity index=3.23.

Example 11

4-Hydroxybenzophenone Endcapped Polycarbonate "Benzophenone-BPA Copolymer—2.5 mol %—26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (35 g, 0.165 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,999 Daltons (referenced to polycarbonate standards) and polydispersity index=6.98.

Example 12

4-Hydroxybenzophenone Endcapped Polycarbonate "Benzophenone-BPA Copolymer—2.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (28 g, 0.132 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,084 Daltons (referenced to polycarbonate standards) and polydispersity index=7.26.

Table 1 summarizes the constituents and the weight average molecular weights of the polycarbonates of Examples 1-12.

TABLE 1

| Component | Ex. 1 | Ex. 2 | Ex. 3 | Ex. 4 | Ex. 5 | Ex. 6 | Ex. 7 |
|---|---|---|---|---|---|---|---|
| BPA (kg) | 0.03 | 0.03 | 4 | 4 | 4 | 4 | 4 |
| HBP (g) | 0.13 | 0.65 | 59 | 87 | 18 | 18 | 18 |
| PCP (g) | 0.7 | 0.14 | 45 | 28 | 105 | 120 | 148 |
| Na glu (g) | — | — | 10 | 10 | 10 | 10 | 10 |
| NEt$_3$ (mL) | 0.18 g | 0.18 g | 42 | 60 | 60 | 60 | 60 |
| Phosgene (kg) | 18.6 g | 18.74 g | 2.5 | 2.5 | 2.5 | 2.5 | 2.5 |
| Water (L) | 0.3 | 0.3 | 10.8 | 10 | 10 | 10 | 10.8 |
| CH$_2$Cl$_2$ (L) | 0.5 | 0.5 | 23.4 | 23 | 23 | 23 | 24.4 |
| Mw, Daltons | 22,877 | 30,255 | 28,366 | 27,106 | 27,482 | 24,379 | 21,171 |
| PDI | — | — | 3.78 | 6.19 | 3.40 | 3.30 | 3.22 |
| mol % HBP endcap | 0.5% | 2.5% | 1.7% | 2.5% | 0.5% | 0.5% | 0.5% |

TABLE 1-continued

| Component | Ex. 8 | Ex. 9 | Ex. 10 | Ex. 11 | Ex. 12 |
|---|---|---|---|---|---|
| BPA (kg) | 4 | 4 | 4 | 4 | 4 |
| HBP (g) | 87 | 18 | 18 | 87 | 87 |
| PCP (g) | 35 | 105 | 148 | 35 | 28 |
| Na glu (g) | 10 | 10 | 10 | 10 | 10 |
| NEt$_3$ (mL) | 80 | 60 | 60 | 42 | 42 |
| Phosgene (kg) | 2.7 | 2.7 | 2.7 | 2.7 | 2.7 |
| Water (L) | 10 | 10 | 10 | 10 | 10 |
| CH$_2$Cl$_2$ (L) | 23 | 23 | 23 | 23 | 23 |
| Mw, Daltons | 25,916 | 27,055 | 27,256 | 25,999 | 27,084 |
| PDI | 5.21 | 3.19 | 3.23 | 6.98 | 7.26 |
| mol % HBP endcap | 2.5% | 0.5% | 0.5% | 2.5% | 2.5% |

BPA = bisphenol-A;
HBP = 4-hydroxybenzophenone;
PCP = p-cumylphenol;
Na glu = sodium gluconate;
NEt$_3$ = triethylamine;
CH$_2$Cl$_2$ = methylene chloride;
PDI = polydispersity index The 4-hydroxybenzophenone endcapped polycarbonates of Examples 1-12 were prepared as compositions optionally using one or more of the components shown in Table 2. Comparative Examples were also prepared using the components of Table 2. The referenced compositions were prepared by mixing together the selected constituents and preblending. Extrusion and molding was carried out under normal polycarbonate processing conditions.

TABLE 2

| Component | Description | Trade name, Source |
|---|---|---|
| 20:80 ITR-PC | Poly(19 mol % isophthalate-terephthalate-resorcinol ester)-co-(75 mol % bisphenol-A carbonate)-co-(6 mol % resorcinol carbonate) copolymer (Mw = 31,000, PC standards) | SABIC-IP |
| HF-PC or High-Flow PC | Bisphenol-A based polycarbonate resin (Mw = 22,000 Daltons, PC standards) | SABIC-IP |
| LF-PC or Low-Flow PC | Bisphenol-A based polycarbonate resin (Mw = 30,000 Daltons, PC standards) | SABIC-IP |
| KSS | Potassium diphenylsulphon-3-sulphonate | Arichem LLC |
| Rimar Salt | Potassium perfluorobutanesulfonate | Lanxess |
| PETS | pentaerythritol tetrastearate | Faci |
| UV stabilizer | 2-(2'-hydroxy-5'-t-octylphenyl) benzotriazole | CYASORB UV 5411, Cytec |
| Heat stabilizer | Tetrakis(2,4-di-tert-butylphenyl)-4,4'-biphenylenediphosphonite | PEPQ, Ciba Specialty Chemicals |
| Hydrolytic stabilizer | Cycloaliphatic Epoxy Resin, 3,4-epoxy cyclohexyl methyl-3,4-epoxy cyclohexyl carboxylate | ERL4221, Various |
| | Colorant 1 | |
| | Colorant 2 | |
| Phosphite Stabilizer | Tris (2,4-di-tert-butylphenyl) phosphite | Irgaphos 168 |
| | Hindered Phenol | |

(B) Cross-Linking Results

Compositions of the 4-hydroxybenzophenone endcapped polycarbonates of Examples 1-12 were cross-linked with ultra-violet (UV) radiation. The polycarbonate compositions were treated with ultra-violet radiation generated from a UV-lamp, or irradiative energy (including UV) received upon sun exposure.

(i) Cross-Linking of 4-Hydroxybenzophenone Endcapped Polycarbonates Using a UV-Lamp Ultra-violet radiation was used to cross-link the neat resin compositions of Examples 1 and 2. First, films of Examples 1 and 2 were formed by melt-pressing the corresponding powder at 550° F. The thickness of each film was about 0.5 mm. Each film was then irradiated with UV-radiation emitted from a 9 mm D bulb having output specifications of about 796.5 Watts from 201 nm to 600 nm, as shown in Table 3. The film was placed on a conveyor belt having a total cycle time of 90 seconds per pass through the UV system, with the irradiation time being 20 seconds, providing an energy of irradiation of 3,000 mJ/cm$^2$ measured using an EIT UV Power Puck™ aletro-optic radiometer.

TABLE 3

| Interval (nm) | Power (Watts) |
|---|---|
| 201-210 | 2.3 |
| 211-220 | 4.2 |
| 221-230 | 4.9 |
| 231-240 | 5.8 |
| 241-250 | 10.8 |
| 251-260 | 17.7 |
| 261-270 | 13.6 |
| 271-280 | 20.3 |
| 281-290 | 11.6 |
| 291-300 | 24.3 |
| 301-310 | 28.6 |
| 311-320 | 21.5 |
| 321-330 | 21.0 |
| 331-340 | 11.0 |
| 341-350 | 24.4 |
| 351-360 | 50.8 |
| 361-370 | 57.5 |
| 371-380 | 74.9 |
| 381-390 | 72.2 |
| 391-400 | 27.9 |
| 401-410 | 30.6 |

TABLE 3-continued

| Interval (nm) | Power (Watts) |
|---|---|
| 411-420 | 26.2 |
| 421-430 | 34.8 |
| 431-440 | 40.4 |
| 441-450 | 19.5 |
| 451-460 | 4.9 |
| 461-470 | 3.5 |
| 471-480 | 2.7 |
| 481-490 | 9.0 |
| 491-500 | 15.3 |
| 501-510 | 7.2 |
| 511-520 | 12.7 |
| 521-530 | 16.7 |
| 531-540 | 17.2 |
| 541-550 | 27.3 |
| 551-560 | 5.3 |
| 561-570 | 3.8 |
| 571-580 | 8.7 |
| 581-590 | 3.4 |
| 591-600 | 2.2 |

Table 4 demonstrates the progression of molecular weight as a function of irradiation time of Example 1 and Example 2. These data show that the molecular weight of each film increased dramatically as a function of UV dosage. The data shows also that the more 4-hydroxybenzophenone endcap present in the resin, the greater is the molecular weight increase, as Example 2 (2.5 mol % HBP endcap) showed a 144% increase in molecular weight after 5 passes under the UV-lamp, compared with a 30% increase in molecular weight for Example 1 (0.5 mol % HBP endcap) after 5 passes.

TABLE 4

|  | Unit | Example 1 | Example 2 |
|---|---|---|---|
| 4-Hydroxybenzophenone amount | mol-% | 0.5 | 2.5 |
| Untreated film MW | Daltons | 22,877 | 30,255 |
| 1 pass UV-treated film MW | Daltons | 25,784 | 53,346 |
| 5 pass UV-treated film MW | Daltons | 29,664 | 73,945 |
| MW increase after 5 passes | % | 30 | 144 |

Figure 17:
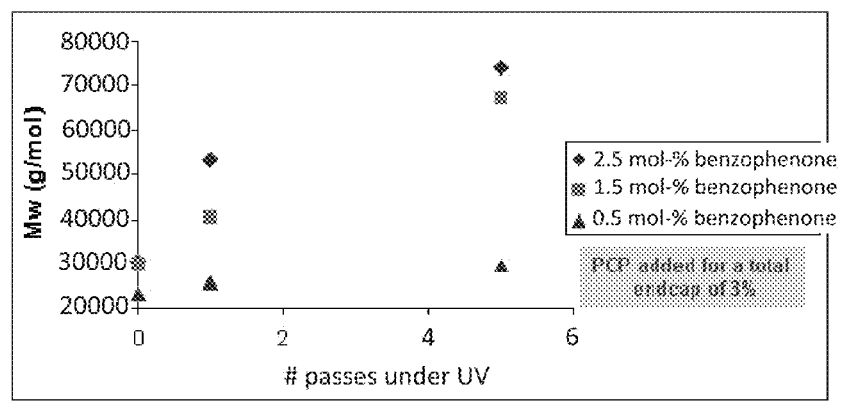
FIG. 17 depicts polycarbonate composition molecular weight as a function of UV-exposure.
Figure 18:
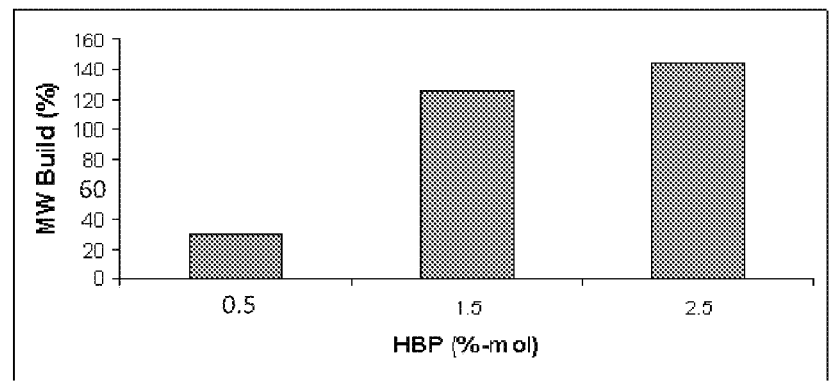
FIG. 18 depicts the molecular weight build (%) as a function of 4-hydroxybenzophenone endcap content in polycarbonate compositions treated with UV-radiation.

FIG. 17 and FIG. 18 also demonstrate the progression of molecular weight as a function of irradiation time for 4-hydroxybenzophenone endcapped polycarbonates of the invention. The figures show molecular weight progression upon cross-linking of 4-hydroxybenzophenone-BPA polycarbonates at 0.5 mol % hydroxybenzophenone endcap, 1.5 mol % hydroxybenzophenone endcap, and 2.5 mol % hydroxybenzophenone endcap. Each of the three polycarbonates included sufficient p-cumylphenol endcap to bring the total endcap mol % to 3 mol %.

Figure 19:
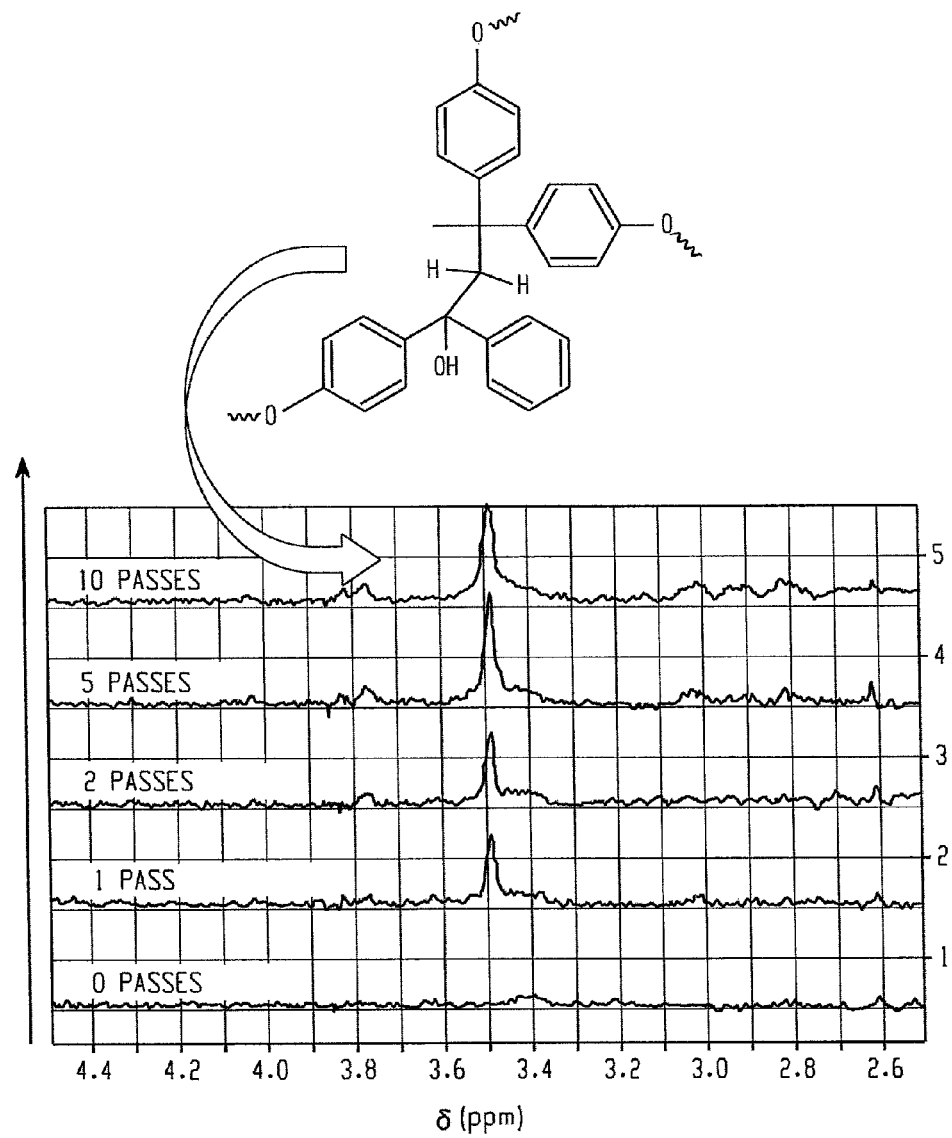
FIG. 19 depicts overlayed NMR spectra demonstrating peak intensity increase at 3.48 ppm showing progression of polycarbonate cross-linking.
Figure 20:
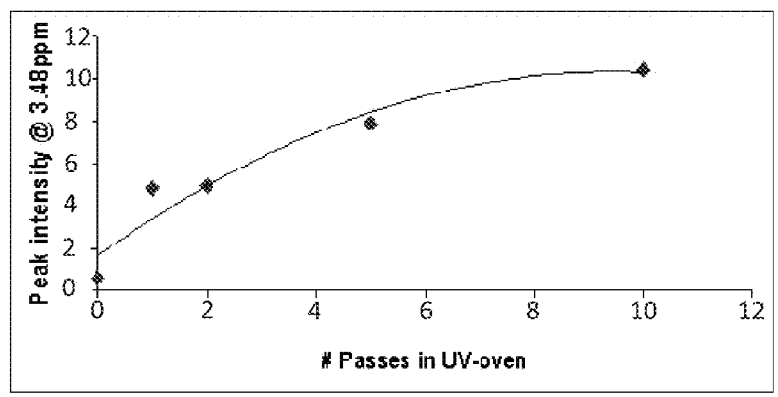
FIG. 20 depicts NMR peak intensity at 3.48 ppm as a function of UV-treatment of 4-hydroxybenzophenone endcapped polycarbonates.

The cross-linking reaction of Example 2 (benzophenone-BPA copolymer—2.5 mol %—30 k) was monitored by $^1$H-nuclear magnetic resonance spectroscopy (NMR), as shown in FIG. 19 and FIG. 20. Without being bound by theory, it is believed that cross-linking occurs between benzophenone carbonyl carbon atoms and methyl carbon atoms as found in repeating bisphenol-A units. The cross-linking reaction can be monitored by following the peak intensity increase at 3.48 ppm in the NMR spectrum of the composition, which peak corresponds to the methylene hydrogens at the newly formed carbon-carbon bond. FIG. 19 and FIG. 20 illustrate that with each pass under the UV-lamp, the peak intensity increased at 3.48 ppm, indicating progression of the cross-linking process.

(ii) Cross-Linking of 4-Hydroxybenzophenone Endcapped Polycarbonates Via Sun Exposure Sun exposure was used to cross-link the polycarbonates. Films were formed of the cross-linkable polycarbonates by melt-pressing the corresponding powder at 550° F. The thickness of each film was about 0.5 mm. Each film was then exposed to UV-radiation emitted from the sun over a period of 360 hours.

Figure 21:
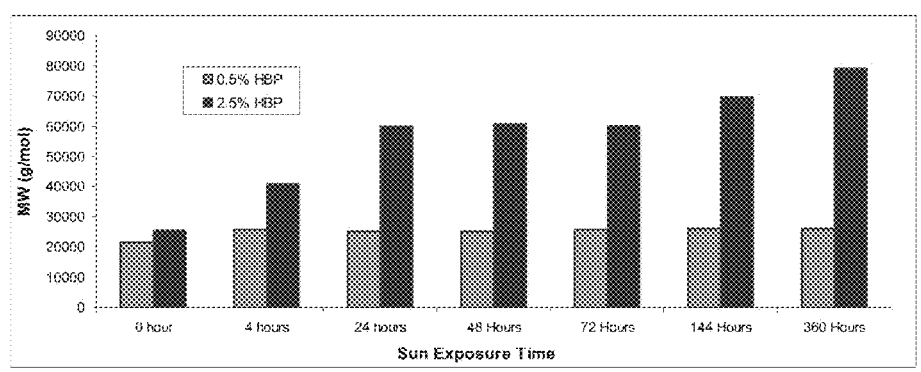
FIG. 21 depicts polycarbonate composition molecular weight as a function of sun exposure time.

Table 5, shown below, and FIG. 21 demonstrate that upon exposure to irradiative energy from the sun, the 4-hydroxybenzophenone endcapped polycarbonates underwent cross-linking and an increase in molecular weight. Accordingly, sun exposure can be used as a method of cross-linking the herein disclosed polycarbonates comprising monohydroxybenzophenone derived endcaps.

The % Gel data indicates the extent of crosslinking as function of the sun exposure time. The % Gel is measured by dividing the dry weight of the crosslinked portion of the exposed material by the total weight of the sample. The crosslinked portion corresponds to the insoluble part of the sample soaked in methylene chloride for 12 hours. This data shows that higher the amount of HBP, greater will be the amount of crosslinked material after sun exposure.

TABLE 5

| HBP (%) | Sun Exposure Time (Hours) | | | | | | | Delta | |
|---|---|---|---|---|---|---|---|---|---|
| | 0 MW | 4 MW | 24 MW | 48 MW | 72 MW | 144 MW | 360 MW | MW (%) | % Gel |
| 0.5 | 21620 | 25900 | 25098 | 25324 | 25703 | 26202 | 26013 | 16 | 0 |
| 0.5 | 26118 | 31130 | 33305 | 36826 | 32371 | 35363 | 34994 | 28 | 1 |
| 0.5 | 27549 | 31145 | 34172 | 36231 | 34756 | 36235 | 36517 | 24 | 1 |
| 2.5 | 25458 | 41086 | 59852 | 60745 | 60224 | 69605 | 78980 | 135 | 15 |
| 2.5 | 24245 | 46183 | 79350 | 65228 | 67150 | 45841 | 58211 | 227 | 27 |
| 2.5 | 26145 | 45112 | 64941 | 51008 | 63437 | 63819 | 34831 | 148 | 52 |

HBP = hydroxybenzophenone;
MW = Molecular Weight (C) Flame Resistance

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5VA and/or 5VB on the basis of the test results obtained for five samples of a given thickness. It is assumed that a material that meets a given standard at a given thickness can also meet the same standard at greater thicknesses (e.g. a material that obtains V0 performance at 1.5 mm thickness can also obtain V0 performance at 2.0 mm thickness, 2.5 mm, etc.). The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must not have any flaming or glowing combustion for more than 60 seconds after the five flame applications. Specimens must not drip flaming particles that ignite the cotton. Plaque specimens must not exhibit burnthrough (a hole).

V1: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton.

Compositions comprising cross-linked polycarbonates disclosed herein (neat and blended) were evaluated for UL 94 V0 and 5VA performance as compared to high-flow BPA-polycarbonate neat and blended compositions. The tested compositions and flame test results are provided in Tables 6-9, shown below.

(i) V0 Performance

Flammability testing was conducted on flame bars prepared from compositions labelled as Sample 1 (S1), Comparative Sample 2 (CS2), Sample 3 (S3), and Comparative Sample 4 (CS4), described in Table 6. S1 is a blend composition comprising the benzophenone-BPA copolymer of Example 8 and a p-cumylphenol capped poly(20 wt % isophthalate-terephthalate-resorcinol ester)-co-(80 wt % bisphenol-A carbonate) copolymer. CS2 is a blend composition comprising a high-flow BPA-polycarbonate and a p-cumylphenol capped poly(20 wt % isophthalate-terephthalate-resorcinol ester)-co-(80 wt % bisphenol-A carbonate) copolymer. S3 is a neat resin composition comprising the benzophenone-BPA copolymer of Example 8. CS4 is a neat resin composition comprising the high-flow BPA-polycarbonate.

TABLE 6

|  | Ingredient | Unit | Sample | | | |
|---|---|---|---|---|---|---|
|  |  |  | S1 | CS2 | S3 | CS4 |
| Example 8 | Benzophenone-BPA copolymer - 2.5 mol-% - 26k | pbw | 55 |  | 100 |  |
| 20:80 ITR-PC | p-cumylphenol capped poly(20 wt % isophthalate-terephthalate-resorcinol ester)-co-(80 wt % bisphenol-A carbonate) copolymer (Mw = 60,000, PS standards) | pbw | 45 | 45 |  |  |
| HF-PC | Bisphenol-A based polycarbonate resin (Mw = 22,000 Daltons, PS standards) | pbw |  | 55 |  | 100 |
| UV stabilizer | 2-(2'-hydroxy-5'-t-octylphenyl)benzotriazole | phr | 0.20 | 0.20 | 0.20 | 0.20 |
| PEPQ Powder | Phosphonous Acid Ester (CAS # 119345-01-6) | phr | 0.06 | 0.06 | 0.06 | 0.06 |
|  | Cycloaliphatic Epoxy Resin (3,4-epoxy cyclohexyl methyl-3,4-epoxy cyclohexyl carboxylate), ERL4221 | phr | 0.03 | 0.03 | 0.03 | 0.03 |
| KSS | Potassium diphenylsulphon-3-sulphonate | phr | 0.03 | 0.03 | 0.03 | 0.03 |
| PETS | pentaerythritol tetrastearate | phr | 0.30 | 0.30 | 0.30 | 0.30 |
|  | Colorant 1 | phr | 0.13 | 0.13 | 0.13 | 0.13 |
|  | Colorant 2 | phr | 0.13 | 0.13 | 0.13 | 0.13 |
| MVR | Melt Volume Flow Rate | cc/10 min | 9.5 | 15.9 | 8.1 | 25.9 |
| Abusive MVR | Abusive Melt Volume Flow Rate | cc/10 min | 11.4 | 21.7 | 8.5 | 27.7 |

Flammability testing was conducted using the standard Underwriters Laboratory UL 94 test method (7 day conditioning), except that 20 bars rather than the usual 5 bars were tested. Specimens are to be preconditioned either at room temperature for 48 hours or in an air-circulating oven for 168 hours at 70±1° C. and then cooled in a desiccator for at least 4 hours at room temperature, prior to testing. Once removed from the desiccator, specimens are tested within 30 minutes.

The data was also analyzed by calculating the average flame out time, standard deviation of the flame out time and the total number of drips, and by using statistical methods to convert that data to a prediction of the probability of first time pass, or "pFTP", that a particular sample formulation would achieve a "pass" rating in the conventional UL94 V0 or V1 testing of 5 bars. The probability of a first time pass on a first submission (pFTP) may be determined according to the formula:

$$pFTP = (P_{t1>mbt,n=0} \times P_{t2>mbt,n=0} \times P_{total<=mbt} \times P_{drip,n=0})$$

where $P_{t1>mbt, n=0}$ is the probability that no first burn time exceeds a maximum burn time value, $P_{t2>mbt, n=0}$ is the probability that no second burn time exceeds a maximum burn time value, $P_{total<=mbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined from the formula: $P_{t1>mbt, n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt, n=0} = (1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip, n=0}$ that no specimen exhibits dripping during the flame test is an attribute function, estimated by: $(1-P_{drip})^5$ where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL94 V0 rating, the maximum total burn time is 50 seconds. For a V1 rating, the maximum total burn time is 250 seconds.

Preferably, p(FTP) values will be 1 or very close to 1 for high confidence that a sample formulation would achieve a given rating in UL 94 testing (e.g. V0). However, it should be noted that, for example, a sample formulation may pass the V0 performance test and have a low pFTP(V0) rating, because the pFTP is a probability.

Table 7 presents pFTP values for the blend (S1) comprising the benzophenone-BPA copolymer and the p-cumylphenol capped ITR-PC; and the neat benzophenone-BPA copolymer (S3). p(FTP) values are provided for both before and after the flame bars are exposed to UV radiation. The results from S1 and S3 are compared with results from flame bars prepared from the blend (CS2) comprising the high-flow BPA polycarbonate and the p-cumylphenol capped ITR-PC; and the neat high-flow BPA-polycarbonate (CS4). S3 and CS4 were prepared in order to compare the flame behavior of the blends of S1 and CS2 with neat resin compositions. Potassium sulfone sulfonate was incorporated into the tested compositions as a flame poison.

TABLE 7

| Flame Resistance | | S1 (blend) (HBP-BPA/ITR-PC) | CS2 (blend) (HF-BPA/ITR-PC) | S3 (neat) (HBP-BPA) | CS4 (neat) (HF-BPA) |
|---|---|---|---|---|---|
| Before UV | p(FTP) @ 2.00 mm | 0 | 0 | 0 | 0 |
| After UV | p(FTP) @ 2.00 mm | 0.99 | 0 | 0.8 | 0 |
|  | p(FTP) @ 1.50 mm | 0.2 | 0 | 0.3 | — |
|  | p(FTP) @ 1.00 mm | 0.1 | 0 | — | — |

HBP-BPA = Benzophenone-BPA copolymer - 2.5 mol-% - 26k;

HF-BPA = High-Flow Bisphenol-A based polycarbonate resin;

HBP-BPA/ITR-PC = Benzophenone-BPA copolymer - 2.5 mol-% - 26k/p-cumylphenol capped poly(20 wt % isophthalate-terephthalate-resorcinol ester)-co-(80 wt % bisphenol-A carbonate) copolymer;

HF-BPA/ITR-PC = High-Flow Bisphenol-A based polycarbonate resin/p-cumylphenol capped poly(20 wt % isophthalate-terephthalate-resorcinol ester)-co-(80 wt % bisphenol-A carbonate) copolymer.

The data of Table 7 shows a dramatic increase of the p(FTP) values for the UV-treated compositions incorporating 4-hydroxybenzophenone endcap, whereas the corresponding controls with the high-flow polycarbonate do not show any variation in their respective probability values. Surprisingly, even in blends, the cross-linked benzophenone-BPA copolymers impart V0 performance to the test bars at 2 mm thickness.

(ii) 5VA Performance

Flammability testing was conducted on flame bars and plaques prepared from compositions labelled as Sample 5 (S5), Comparative Sample 6 (CS6), Sample 7 (S7), and Comparative Sample 8 (CS8), described in Table 8. S5 is a low-flow benzophenone-BPA copolymer composition having a melt volume flow rate (MVR) of 2.81 cm$^3$/10 minutes at 300° C., 1.2 kg, 360 seconds, and an abusive MVR of 2.89 cm$^3$/10 minutes at 300° C., 1.2 kg, 1080 seconds. CS6 is a low-flow BPA-polycarbonate composition having an MVR of 6.35 cm$^3$/10 minutes at 300° C., 1.2 kg, 360 seconds, and an abusive MVR of 6.52 cm$^3$/10 minutes at 300° C., 1.2 kg, 1080 seconds. S7 is a high-flow benzophenone-BPA copolymer composition having a melt volume flow rate (MVR) of 11.5 cm$^3$/10 minutes at 300° C., 1.2 kg, 360 seconds, and an abusive MVR of 11.7 cm$^3$/10 minutes at 300° C., 1.2 kg, 1080 seconds. CS8 is a high-flow BPA-polycarbonate composition having an MVR of 27.6 cm$^3$/10 minutes at 300° C., 1.2 kg, 360 seconds, and an abusive MVR of 27.7 cm$^3$/10 minutes at 300° C., 1.2 kg, 1080 seconds.

TABLE 8

| Ingredient | Unit | S5 | CS6 | S7 | CS8 |
|---|---|---|---|---|---|
| High-Flow Benzophenone-BPA copolymer | pbw | | | 100 | |
| Low-Flow Benzophenone-BPA copolymer | pbw | 100 | | | |
| High-Flow Bisphenol-A based polycarbonate resin | pbw | | | | 100 |
| Low-Flow Bisphenol-A based polycarbonate resin | pbw | | 100 | | |
| Potassium Perfluorobutane Sulfonate | phr | 0.08 | 0.08 | 0.08 | 0.08 |
| Irgaphos Stabilizer | phr | 0.06 | 0.06 | 0.06 | 0.06 |
| Melt Volume Flow Rate | cc/10 min | 2.81 | 6.35 | 11.5 | 27.6 |
| Abusive Melt Volume Flow Rate | cc/10 min | 2.89 | 6.52 | 11.7 | 27.7 |

Flammability testing was conducted using the standard Underwriters Laboratory UL 94 test method (7 day conditioning). 5 bars and 3 plaques were tested. Specimens are to be preconditioned in an air-circulating oven for 168 hours at 70±1° C. and then cooled in a desiccator for at least 4 hours at room temperature, prior to testing. Once removed from the desiccator, specimens are tested within 30 minutes. The data for the bars was analyzed by calculation of the average flame out time, standard deviation of the flame out time and the total number of drips. Statistical methods were used to convert the data to a probability that a specific formulation would achieve a first time pass or "p(FTP)" in the standard UL 94 testing of 5 bars. Preferably p(FTP) values will be 1 or very close to 1 for high confidence that a sample formulation would achieve a 5VA rating in UL 94 testing.

Table 9 presents the 5VA test results for the low-flow and high-flow benzophenone-BPA copolymer compositions S5 and S7 as compared with low-flow and high-flow BPA-polycarbonate compositions lacking benzophenone endcap. The data of Table 9 demonstrates that the UV-treated high-flow and low-flow compositions incorporating 4-hydroxy-benzophenone endcap (e.g., S5 and S7) can meet 5VA material requirements at thicknesses of 2.5 mm or less, 2.0 mm or less, and 1.5 mm or less, whereas corresponding controls with the high-flow and low-flow BPA-polycarbonate (e.g., CS6 and CS8) do not show any variation in their respective flame resistance after UV-treatment. The failure of UV-treated Sample 7 (S7) at 1.5 mm indicates that endcap mol % and polymer molecular weight may be balanced to achieve 5VA performance.

TABLE 9

| | Flame Resistance | S5 | CS6 | S7 | CS8 |
|---|---|---|---|---|---|
| Before UV | 5VA @ 3 mm | F | F | F | F |
| | 5VA @ 2.5 mm | F | F | F | F |
| | 5VA @ 2 mm | F | F | F | F |
| | 5VA @ 1.5 mm | F | F | F | F |
| After UV | 5VA @ 2.5 mm | P | F | P | F |
| | 5VA @ 2 mm | P | F | P | F |
| | 5VA @ 1.5 mm | P | F | F | F |

P = specimens that passed 5VA testing;
F = specimens that failed 5VA testing

The results of Tables 7 and 9 demonstrate that the cross-linked polycarbonates disclosed herein, whether neat or within a blend composition, impart flame resistance (V0 and 5VA) to articles comprising the cross-linked polycarbonates. In particular, the compositions can be used to provide 5VA compliant materials and articles.

The results also demonstrate that even benzophenone-BPA compositions incorporating UV-absorbing polymers (e.g., p-cumylphenol capped ITR-PC) can undergo sufficient cross-linking to provide compositions that exhibit V0 and 5VA performance according to UL 94.

The results further demonstrate that 5VA performance can, surprisingly, be achieved using 0.08 wt % or less of a non-brominated, non-chlorinated flame retardant. This allows preparation of compositions comprising the cross-linked polycarbonates that have high transparency and low haze values. In particular, the cross-linked compositions can be used to provide 5VA compliant materials at 2.5 mm or less, 2 mm or less, and 1.5 mm or less, the materials having high transparencies and low haze values. In comparison, conventional polycarbonate cannot achieve 5VA performance without incorporation of significant quantities of flame retardant, which may lower the transparency of the resulting polycarbonate and effect overall physical properties.

(D) Mechanical and Physical Properties

Improved flame retardance as demonstrated above for the cross-linked compositions is generally not useful if the composition also has excessive loss of mechanical properties that are needed for end use applications. As demonstrated below, the cross-linked compositions retain impact and tensile properties subsequent to UV-treatment.

Table 10 provides mechanical and physical properties of the compositions of Sample 5 (S5), Comparative Sample 6 (CS6), Sample 7 (S7), and Comparative Sample 8 (CS8), the formulations for which are described above in Table 8. The properties provided in Table 10 relate to the samples before UV-treatment. Table 10 shows that the compositions that incorporate benzophenone endcapped-resin exhibit similar mechanical properties to the ones that incorporate conventional BPA-polycarbonate resin.

TABLE 10

| Property (before UV-treatment) | Unit | S5 | CS6 | S7 | CS8 |
|---|---|---|---|---|---|
| Modulus of Elasticity | MPa | 2354 | 2332 | 2388 | 2372 |
| Tensile Strength at Break | MPa | 64 | 66 | 70.6 | 68 |
| Flexural Modulus | MPa | 2310 | 2290 | 2360 | 2360 |
| Flexural Modulus | — | | 77.4 | 53.1 | 7.36 | 16.3 |
| Flexural Modulus | % | 3.35 | 2.32 | 0.312 | 0.692 |
| NII Ductility | % | 100 | 100 | 100 | 100 |
| NII Impact Strength | J/m | 920 | 911 | 845 | 685 |
| HDT | ° C. | 135.8 | 133.8 | 131.5 | 129.6 |
| MVR | cm³/10 min | 2.81 | 6.35 | 11.5 | 27.6 |
| Abusive MVR | cm³/10 min | 2.89 | 6.52 | 11.7 | 27.7 |

NII = Notched Izod Impact;
HDT = Heat Distortion Temperature;
MVR = Melt Volume Flow Rate The dynamic oscillatory rheology curves of low-flow benzophenone-BPA copolymer resin (S5) and low-flow bisphenol-A based polycarbonate resin (CS6) were run on an ARES strain controlled rheometer using a frequency sweep method to determine the viscosity or modulus of the material as a function of frequency at a constant temperature (300° C.). Frequency sweep measurements were performed using 25 mm parallel-plate geometry at a 20% strain (linear regime) with a fixed gap of 1 mm. The frequency was varied from 0.1 to 500 rad/s.

Figure 22:
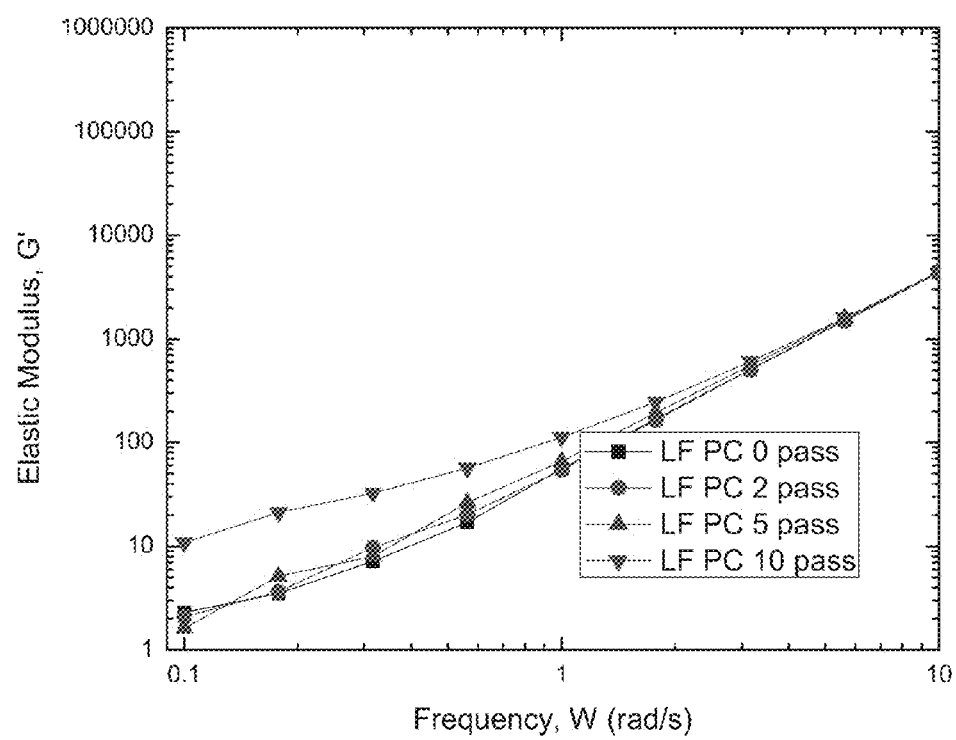
FIG. 22 depicts small amplitude oscillatory rheology [parallel-plate] of a low-flow BPA-polycarbonate resin.
Figure 23:
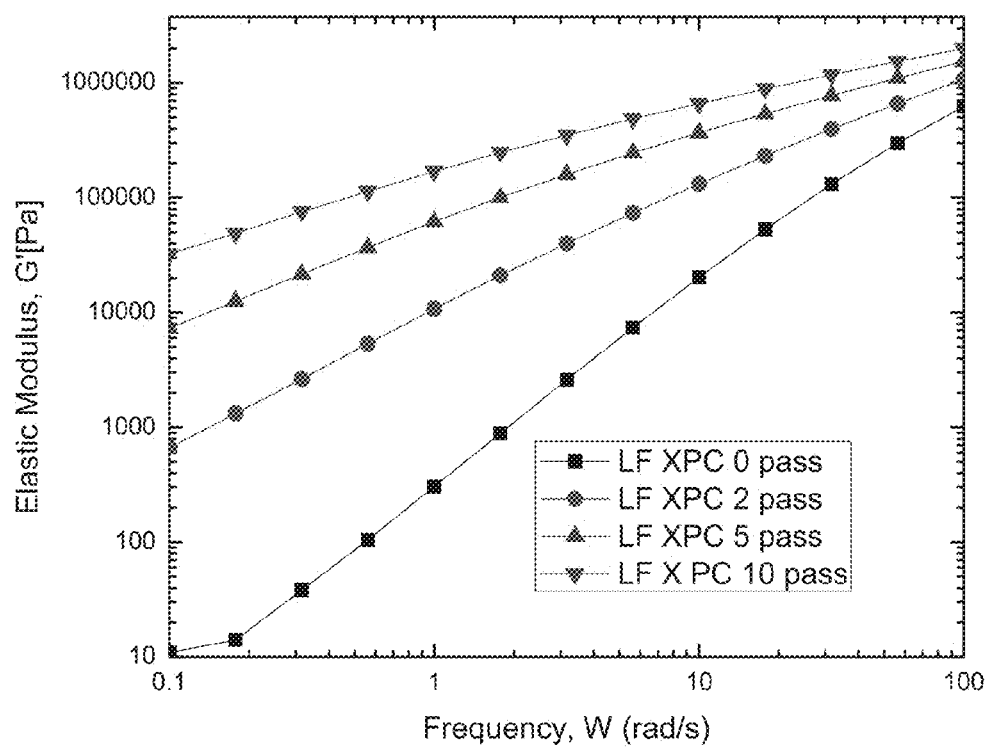
FIG. 23 depicts small amplitude oscillatory rheology [parallel-plate] of a low-flow benzophenone endcapped BPA-polycarbonate copolymer resin.

The dynamic oscillatory rheology curve of low-flow bisphenol-A based polycarbonate resin is shown in FIG. 22; the dynamic oscillatory rheology curve of cross-linkable low-flow benzophenone-BPA copolymer resin is shown in FIG. 23. The dynamic oscillatory rheology was determined on pellets of the resins as a function of passes through a UV Fusion FS300S with a LC-6B Benchtop Conveyor using a D bulb. The time of irradiation was ~90 seconds, providing energy of irradiation of ~3,000 mJ/cm$^2$. FIG. 23 shows there is a dramatic increase in the elastic modulus for the benzophenone capped material. For example, at 0.1 rad/s the elastic modulus grows from 10 Pa to 10000 Pa (three orders of magnitude) from 0 to 5 passes, whereas in the low flow BPA poly-carbonate materials (FIG. 22) the elastic modulus is just 2 Pa irrespective of the UV passes. This dramatic increase in elastic modulus as a function UV exposure for the benzophenone capped material material indicates the formation of crosslinking in the benzophenone end capped polycarbonate.

Table 11 shows multiaxial impact (MAI) data for the compositions both prior to and after UV-exposure. As shown in Table 11, the improved flame resistance of the present compositions comprising cross-linked polycarbonate is achieved without significant loss of important mechanical properties.

TABLE 11

| Test (3.2 mm disk) | Unit | Sample S7 | S7 | S7 |
|---|---|---|---|---|
| UV-dose | mJ/cm$^2$ | 0 | 1000 | 2000 |
| MAI—Energy to max load | J | 75.4 | 62.4 | 62.9 |
| MAI—Energy to failure | J | 80.5 | 69.1 | 67.5 |
| MAI—Energy, Total | J | 80.5 | 69.1 | 67.6 |
| MAI—Max load | kN | 7.14 | 6.653 | 6.209 |
| MAI—Deflection at max load | mm | 21.3 | 19.6 | 19.9 |
| MAI—Ductility | % | 100 | 100 | 100 |

Table 12 shows that tensile properties of the cross-linked polycarbonate compositions prepared by sun exposure are not effected by UV exposure. At T$_0$ (zero hours exposure) the compositions of Sample S5 had an elongation at break of 141.22% (50 mm/min elongation speed). At 168 hours, the elongation break was 126.23%. By way of comparison, 100 gr PC had an elongation at break of 119.21% at T$_0$. Thus, the tensile strength of the cross-linked compositions is retained after UV-exposure.

TABLE 12

| | Elongation at Break (%) | |
|---|---|---|
| Sun Exposure (h) | Example S5 | 100 gr PC |
| 0 | 141.22% | 119.21% |
| 24 | 121.08% | — |
| 48 | 123.04% | — |
| 168 | 126.23% | — |

(E) Chemical Resistance

Compositions comprising cross-linked polycarbonates disclosed herein were evaluated for chemical resistance. Powders of 4-hydroxybenzophenone-terminated polycarbonates (Examples 3-5), formulated with a phosphite stabilizer and a hindered phenol, were each stabilized and subsequently pelletized to provide composition samples S9-S11. The resulting pellets were molded in the form of 3.2 mm colorchips. Table 13 presents the constituents, the glass transition temperature (Tg), and the melt volume flow rate (MVR) for each sample.

TABLE 13

| | Ingredient | Unit | Sample S9 | S10 | S11 |
|---|---|---|---|---|---|
| Example 3 | Benzophenone-BPA copolymer - 1.7 mol-% - 28k | wt % | 99.89 | | |
| Example 4 | Benzophenone-BPA copolymer - 2.5 mol-% - 27k | wt % | | 99.89 | |
| Example 5 | Benzophenone-BPA copolymer - 0.5 mol-% - 28k | wt % | | | 99.89 |
| | Phosphite Stabilizer | wt % | 0.06 | 0.06 | 0.06 |
| | Hindered Phenol Stabilizer | wt % | 0.05 | 0.05 | 0.05 |
| MVR | Melt Volume Flow Rate | cc/10 min | 5.3 | 4.8 | 8.1 |
| Abusive MVR | Abusive Melt Volume Flow Rate | cc/10 min | 5.4 | 5.6 | 8.6 |
| Tg | Glass Transition Temperature | ° C. | 151.7 | 151.7 | 152.1 |

Colorchips of S9-S11 were plunged into a test fluid for a duration of 5 minutes to assess chemical resistance to the fluid. Table 14 shows the chemical resistance of each composition S9-S11 to toluene, acetone, and Windex®. Table 14 shows that higher amounts of 4-hydroxybenzophenone endcap (e.g., 2.5 mol % as in S10) led to improved chemical resistance, independently of the resin molecular weight. The non-UV treated colorchips, when treated with acetone or toluene, exhibited crystallization and shrinking on the colorchip surface.

TABLE 14

| Chemical Resistance | | Sample S9 | S10 | S11 |
|---|---|---|---|---|
| Before UV | toluene | − | − | − |
| | acetone | − | − | − |
| | Windex ® | +++ | +++ | +++ |
| After UV | toluene | + | ++ | + |
| | acetone | + | ++ | + |
| | Windex ® | +++ | +++ | +++ |

"−" = cracking/blistering observed;
"+" = lowered gloss observed;
"++" = solvent mark observed;
"+++" = no visual change observed Table 15 shows that UV-irradiated samples S1 and S3, the formulations for which are described above in Table 6, are resistant to chemical treatment after exposure to UV radiation, as compared to the respective control samples CS2 and CS4. Surprisingly, even benzophenone-BPA blends including UV-absorbing polymers (e.g., p-cumylphenol capped ITR-PC) such as that of S1 underwent sufficient cross-linking to provide compositions that exhibit extreme chemical resistance (e.g., resistance to acetone).

TABLE 15

| Chemical Resistance | | S1 (blend) (HBP-BPA/ ITR-PC) | CS2 (blend) (HF-BPA/ ITR-PC) | S3 (neat) (HBP-BPA) | CS4 (neat) (HF-BPA) |
|---|---|---|---|---|---|
| Before UV | toluene | − | − | − | − |
|  | acetone | − | − | − | − |
|  | Windex ® | +++ | +++ | +++ | +++ |
| After UV | toluene | +++ | − | +++ | − |
|  | acetone | ++ | − | ++ | − |
|  | Windex ® | +++ | +++ | +++ | +++ |

"−" = cracking/blistering observed;
"+" = lowered gloss observed;
"++" = solvent mark observed;
"+++" = no visual change observed;
HBP-BPA = Benzophenone-BPA copolymer - 2.5 mol-% - 26k;
HF-BPA = High-Flow Bisphenol-A based polycarbonate resin;
HBP-BPA/ITR-PC = Benzophenone-BPA copolymer - 2.5 mol-% - 26k/p-cumylphenol capped poly(20 wt % isophthalate-terephthalate-resorcinol ester)-co-(80 wt % bisphenol-A carbonate) copolymer;
HF-BPA/ITR-PC = High-Flow Bisphenol-A based polycarbonate resin/p-cumylphenol capped poly(20 wt % isophthalate-terephthalate-resorcinol ester)-co-(80 wt % bisphenol-A carbonate) copolymer.

The cross-linked polycarbonate composition S5 was further evaluated for chemical resistance under strain conditions. In a strain jig, four tensile bars were positioned. The tensile bars were molded at 550° F. barrel temperature, 180° F. mold temperature and 0.5 in/s injection speed. Two bars comprised the cross-linked polycarbonate composition S5, and two comprised the S5 composition prior to UV-treatment. The curvature of the jig induced a 1% stress level on the tensile bars. A portion of the bars was exposed to acetone by dripping the solvent on top of the tensile bars. As shown in Table 16, the tensile bars of the samples without UV-treatment snapped upon exposure to acetone, whereas the tensile bars comprised of the cross-linked polycarbonate did not snap.

TABLE 16

| | Test Conditions | | | Sample |
|---|---|---|---|---|
| | Strain | Temperature | Exposure Time | Solvent | S5 |
| Before UV | 1% | 23° C. | Until solvent evaporates | Acetone | Bars snapped |
| After UV | 1% | 23° C. | Until solvent evaporates | Acetone | Bars did not snap |

The chemical resistance results of Tables 14-16 demonstrate that the cross-linked polycarbonates disclosed herein, whether neat or within a blend composition, impart chemical resistance to articles comprising the cross-linked polycarbonate. The results also demonstrate that even blends with UV-absorbing polymers can achieve sufficient cross-linking to provide compositions that exhibit extreme chemical resistance.

(F) Haze

Compositions comprising cross-linked polycarbonates disclosed herein were evaluated for haze value. Percent haze (% Haze) was determined for the compositions of samples S5 and S7, the formulations for which are described above in Table 8. The percent haze for each sample was less than 2%, the haze value measured on 2.54 mm thick color chips using a Color-Eye 7000A Spectrometer.

Synthesis of Benzophenone-Containing Polycarbonate (BP-PC)

A 4-hydroxybenzophenone (4HBP) end-capped polycarbonate resin (BP-PC) was synthesized as follows.

The following were added into a 70 L CSTR equipped with an overhead condenser and a recirculation pump with a flow rate of 40 L/minute: (a) 4,4-bis-(hydroxyphenyl)-2,2-propane (BPA) (4000 grams, 17.52 moles); (b) 4-hydroxybenzophenone (4HBP, 59 grams, 0.297 moles); (c) para-cumylphenol (PCP, 45 grams, 0.212 moles); (d) triethylamine (42 mL, 0.415 moles); (e) methylene chloride (23.4 L); (f) de-ionized water (10.8 L), and (g) sodium gluconate (10 grams). The reaction was allowed to stir for 10 minutes and the pH was maintained at pH=9 by the addition of 30% NaOH solution. The mixture was charged with phosgene (2500 grams, 80 g/min, 23.3 moles). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. The Mw of the polycarbonate was measured to be 28,366 g/mol (referenced to polycarbonate standards) and polydispersity index=3.78.

Examples 1-5

Table A lists two examples of 4HBP-endcapped polycarbonates (Examples 1 and 2). Examples 3 and 4 are polycarbonate controls having PCP endcaps.

TABLE A

| Name | End Cap (Mol %) | Mw | Mw/Mn |
|---|---|---|---|
| Exp 1 | 4HBP (3.75%) | 21,500 | 3.00 |
| Exp 2 | 4HBP (2.5) | 30,500 | 3.00 |
| Exp 3 | PCP (2.5%) | 30,000 | 2.20 |
| Exp 4 | PCP (4%) | 22,500 | 2.20 |
| Exp 5 | 4HBP (1.6%) | 30,000 | 3.9 |

The 4-hydroxybenxzophenone-terminated polycarbonates (XPC) and their p-cumylphenol controls (PC) are listed in Table A. They were compounded with a heat stabilizer, a cyclic siloxane, and Rimar salt (phr) as shown in Table C on a single screw extruder. The samples were then molded into 3.2 mm color chips and ASTM Izod bars (0.125 inches×0.5 inches×2.5 inches).

TABLE C

| Name | Exp 8 | Exp 9 | Exp 10 | Exp 11 | Exp 12 |
|---|---|---|---|---|---|
| Exp 2 XPC, Mw = 31000 | 100.000 | | | | |
| Exp 1 XPC, Mw = 21000 | | 100.000 | | | |

TABLE C-continued

| Name | Exp 8 | Exp 9 | Exp 10 | Exp 11 | Exp 12 |
|---|---|---|---|---|---|
| Exp 3 PC, Mw = 30000 | | | 100.000 | | |
| Exp 4 PC, Mw = 22,500 | | | | 100.000 | |
| Exp 5 30,000 MW 1.6 Mol % 4-HBP | | | | | 100.000 |
| Cyclic Siloxane | 0.100 | 0.100 | 0.100 | 0.100 | 0 |
| Potassium Perfluorobutane Sulfonate | 0.080 | 0.080 | 0.080 | 0.080 | 0.080 |
| Phosphite stabilizer | 0.060 | 0.060 | 0.060 | 0.060 | 0.060 |

Experiments

Figure 7:
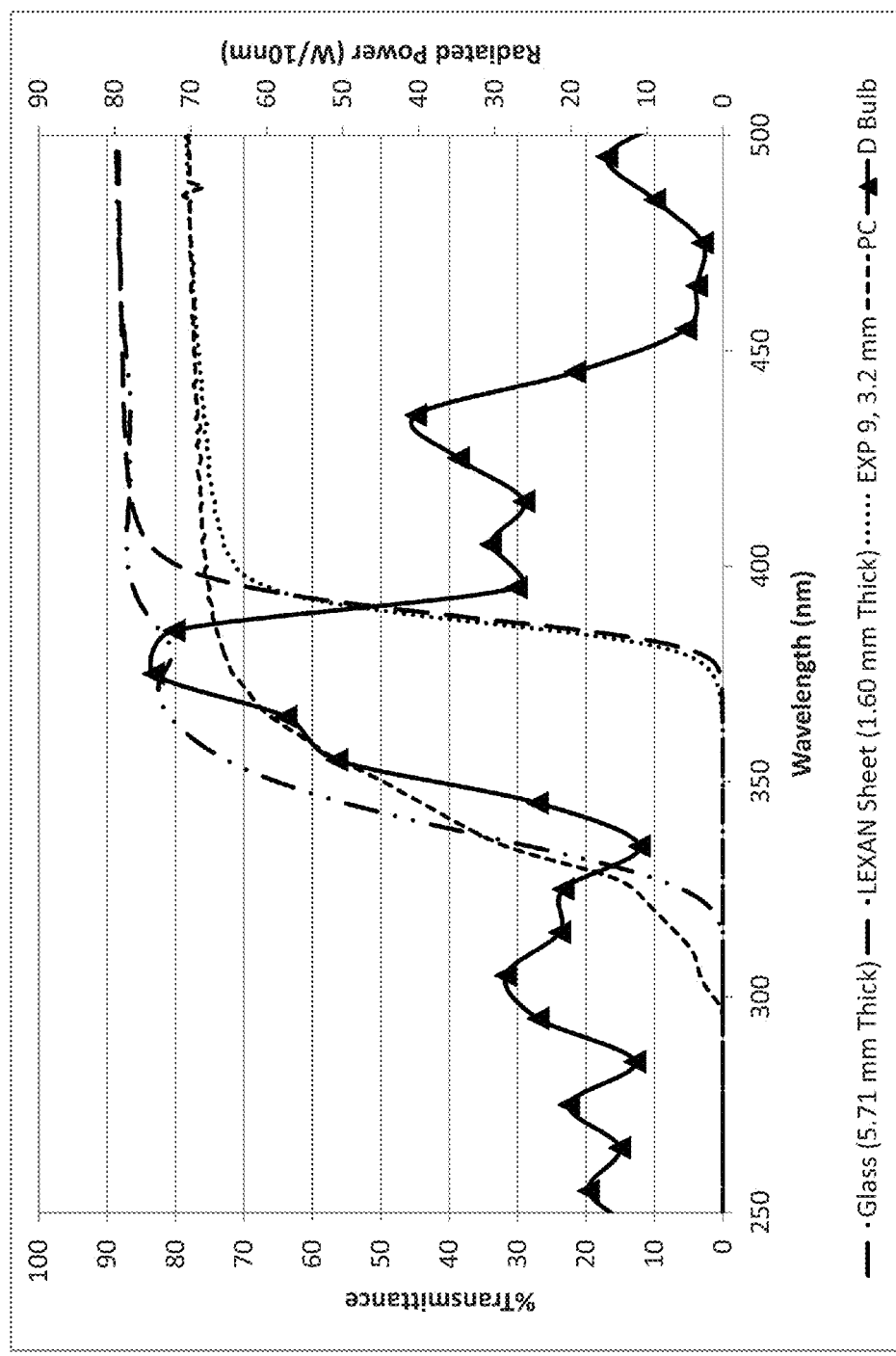
FIG. 7 is a graph showing the transmission spectra for glass, a LEXAN sheet, polycarbonate, noncrosslinked benzophenone-containing polycarbonate, and a D bulb.

FIG. 7 is a graph showing the transmission spectrum for a bisphenol-A polycarbonate (PC, X symbol) and a bisphenol-A polycarbonate endcapped with 4-hydroxybenzophenone (EXP 9, triangle). The figure shows the increased absorption of the benzophenone end groups in the region of 330 nm to 380 nm compared to the standard polycarbonate. Also shown in FIG. 7 is the spectral distribution of the D Bulb from UV Fusion (asterisk). As seen here, there is significant light being emitted by the D Bulb down to 200-210 nm, which is can be harmful to polycarbonate. The graph also shows that borosilicate window glass (5.71 mm thickness, diamond) has a cut-on wavelength of approximately 340 nm (i.e. wavelengths above 340 nm have at least 50% transmittance). A LEXAN sheet (square) has a UVA cut-on wavelength of approximately 395 mm. Blocking most of the UV light below 395 nm would block all the UV light necessary for the crosslinking reaction. Thus, this LEXAN polycarbonate sheet would be unacceptable as a long pass filter if UV energy was needed. However, it is known in the art to tailor photoinitiators to match the spectral output of the light source. In this case, varying the exposure of the photoactive additive to specific ranges of wavelengths can lead to an improved cross-linked composition that will have the appropriate level of crosslinking (which can be adjusted by the dose) and lower levels of resin decomposition by the short wavelengths.

Many 3.2 mm Izod bars were made from the compositions of Examples 8-11. The composition of EXP 12 was molded into 3.2 mm Izod bars and color chips. These plaques were then exposed to UV-radiation from a D-bulb from Fusion UV Systems, Inc. The samples were passed under the light source on a UV conveyor system, called here a UV oven, a varying number of times to provide increasing levels of cross-linking to the surface of the samples. The belt speed was set to about 3 feet/min. As the samples exited the UV oven, they were taken and put back on the belt for multiple passes without lag time until the desired number of passes/dose was obtained. A UV Power Puck™ from EIT Instruments was first run through the UV oven to measure the energy per pass or dose. The dose was measured as the energy from 320-390 nm (UVA), 280-320 nm (UVB), 250-260 nm (UVC) and 395-445 nm (UVV). The dose was calculated in J/cm$^2$.

The thickness of the crosslinked skin was measured using two different methods. First, the average gel content of each plaque was determined and the skin thickness calculated from that measurement. Second, the skin thickness was measured by optical microscopy.

To measure the amount of cross-linked skin (or gel), four exposed Izod bars were each added to approximately 80 mL of methylene chloride. The samples were then gently shaken overnight on a platform shaker. After about 24 hours, the methylene chloride insoluble skins were isolated by filtration. The samples were then washed with 100 mL of additional methylene chloride. To obtain the wt fraction of the insoluble skin, the samples were filtered using tarred filter paper. After drying the samples overnight in an oven at 60-80° C., the paper and samples were weighed. The percentage of insoluble skin was calculated as follows:

% Insolubles=100×(wt of the dry insoluble fraction)/ wt of the starting bar.

The skin thickness can be estimated by calculating from the % insoluble as follows:

Skin Thickness Calculated from Avg % Gel(um)= ((3.2 mm×% Gel)/100)×1000 microns/mm To more accurately measure the depth of the cross-linked skin layer, methylene chloride-containing samples were submitted for optical microscopy as follows.

The skin was removed from the methylene chloride using tweezers and placed onto heavy gauge aluminum foil. Approximately one-fourth to one-half inch was cut out of the middle of the sample using a clean sharp razor blade. This sample was then placed into aluminum pan with sufficient CH$_2$Cl$_2$ to cover the section.

The film would often roll up. If the section rolled up and was thicker than around 10 or 15 microns, the single rolled section was manipulated with micro-tools into a configuration of a double rolled section (resembling a scroll). This was then lifted from CH$_2$Cl$_2$ by inserting a tapered micro-tool into one roll. Then it was placed onto clean aluminum foil. With a second micro-tool in the other roll of the "scroll", the tools were slowly pulled apart, rolling the skin out flat onto foil. The foil was then folded onto the skin to hold in place (booked) while the solvent evaporated. A temperature of ~60-80° C. was applied to speed this process.

If the film was thinner (less than 10 or 15 microns), the procedure was modified by not lifting the film from CH$_2$Cl$_2$, but rather allowing most CH$_2$Cl$_2$ to evaporate while the edges of the films are held flat with micro-tools.

Once the sample was dried, the skin was cut into a narrow (~500 micron) strip with parallel sides, again utilizing a clean sharp razor blade. This strip was mounted edgewise onto a double-sided carbon or copper SEM tape. Images of the edge of the film strip were then captured via Zeiss Discovery imaging microscope and software. The appropriate magnification(s) (8.1× to 101×) was selected based on the thickness of the film. The cross section thicknesses were captured via the Zeiss Axioplan imaging microscope and software.

These results are presented in Table D (see next page).

TABLE D

| Sample Name | # of Passes Under UV | UVA (J/cm²) | UVB (J/cm²) | UVC (J/cm²) | UVV (J/cm²) | Avg. % Gel | Average Skin Thickness Calc. from Avg % Gel (μm) | Average Skin Thickness By Optical Microscopy (μm) |
|---|---|---|---|---|---|---|---|---|
| EXP 9 | 0 | 0 | 0 | 0 | 0 | 2.3 | 74 | 0 |
| EXP 9 | 2 | 11 | 3 | 0 | 5 | 2.1 | 66 | 8 |
| EXP 9 | 6 | 33 | 10 | 1 | 15 | 5.8 | 184 | 42 |
| EXP 9 | 10 | 53 | 16 | 2 | 24 | 4.7 | 152 | 76 |
| EXP 9 | 15 | 77 | 22 | 3 | 36 | 6.0 | 193 | 85 |
| EXP 9 | 20 | 106 | 31 | 4 | 50 | 6.9 | 219 | 120 |
| EXP 9 | 25 | 133 | 40 | 5 | 62 | 7.6 | 244 | 116 |
| EXP 11 | 0 | 0 | 0 | 0 | 0 | 1.5 | 48 | No skin formed |
| EXP 11 | 2 | 11 | 3 | 0 | 5 | 2.1 | 67 | |
| EXP 11 | 6 | 33 | 10 | 1 | 15 | 1.7 | 55 | |
| EXP 11 | 10 | 53 | 16 | 2 | 24 | 2.0 | 64 | |
| EXP 11 | 15 | 77 | 22 | 3 | 36 | 1.1 | 36 | |
| EXP 11 | 20 | 106 | 31 | 4 | 50 | 1.5 | 47 | |
| EXP 11 | 25 | 133 | 40 | 5 | 62 | 1.5 | 49 | |
| EXP 8 | 0 | 0 | 0 | 0 | 0 | 3.1 | 99 | |
| EXP 8 | 2 | 11 | 3 | 0 | 5 | 2.8 | 90 | |
| EXP 8 | 6 | 33 | 10 | 1 | 15 | 3.6 | 115 | |
| EXP 8 | 10 | 53 | 16 | 2 | 24 | 4.5 | 143 | |
| EXP 8 | 15 | 77 | 22 | 3 | 36 | 5.3 | 169 | |
| EXP 8 | 20 | 106 | 31 | 4 | 50 | 5.8 | 184 | |
| EXP 8 | 25 | 133 | 40 | 5 | 62 | 6.7 | 214 | |
| EXP 10 | 0 | 0 | 0 | 0 | 0 | 4.0 | 128 | No skin formed |
| EXP 10 | 2 | 11 | 3 | 0 | 5 | 1.3 | 42 | |
| EXP 10 | 6 | 33 | 10 | 1 | 15 | 3.2 | 104 | |
| EXP 10 | 10 | 53 | 16 | 2 | 24 | 3.9 | 126 | |
| EXP 10 | 15 | 77 | 22 | 3 | 36 | 2.8 | 91 | |
| EXP 10 | 20 | 106 | 31 | 4 | 50 | 2.1 | 66 | |
| EXP 10 | 25 | 133 | 40 | 5 | 62 | 2.7 | 85 | |
| EXP 12 | 0 | 0.0 | 0.0 | 0.0 | 0.0 | — | — | 0.0 |
| EXP 12 | 2 | 10.7 | 3.1 | 0.4 | 4.9 | 0.7 | 23.0 | 3.5 |
| EXP 12 | 10 | 53.1 | 15.6 | 1.9 | 24.4 | 3.5 | 113.6 | 31.0 |

Initially, it should be noted that the unexposed bars (# of passes=0) had average % gel ranging up to 4%. This was attributed to experimental error. Presumably non-cross-linked resin was not fully washed off the filter paper used to determine this value. None of these samples had an insoluble skin in the methylene chloride solution.

The samples which contained 4HBP (EXP 8 and EXP 9) had an insoluble skin that remained intact in the methylene chloride solution and could be isolated. The control samples (EXP 10 and EXP 11) did not have an intact insoluble skin remaining in the methylene chloride layer.

The samples were also measured for delta E against their corresponding unexposed sample within about 2 minutes of exiting the UV oven for the final pass. The delta E was again measured after about 24 to 48 hours. These results are reported in Table E (see next page).

TABLE E

| Sample Name | # of Passes Under UV | Avg. % Gel | Average Skin Thickness Calc from Ave % Gel (μm) | Average Skin Thickness By Optical Microscopy (μm) | Delta E after 2 min | Delta E after 48 hrs |
|---|---|---|---|---|---|---|
| EXP 9 | 0 | 2.3 | 74 | 0 | 0.0 | 0.0 |
| EXP 9 | 2 | 2.1 | 66 | 8 | 1.5 | 0.9 |
| EXP 9 | 6 | 5.8 | 184 | 42 | 4.9 | 2.5 |
| EXP 9 | 10 | 4.7 | 152 | 76 | 5.9 | 3.2 |
| EXP 9 | 15 | 6.0 | 193 | 85 | 8.4 | 4.8 |
| EXP 9 | 20 | 6.9 | 219 | 120 | 9.2 | 5.4 |
| EXP 9 | 25 | 7.6 | 244 | 116 | 9.5 | 5.9 |
| EXP 11 | 0 | 1.5 | 48 | No skin formed | 0.0 | 0.0 |
| EXP 11 | 2 | 2.1 | 67 | | 0.5 | 0.4 |
| EXP 11 | 6 | 1.7 | 55 | | 0.8 | 0.8 |
| EXP 11 | 10 | 2.0 | 64 | | 1.3 | 1.3 |
| EXP 11 | 15 | 1.1 | 36 | | 1.5 | 1.4 |
| EXP 11 | 20 | 1.5 | 47 | | 1.8 | 1.7 |
| EXP 11 | 25 | 1.5 | 49 | | 2.1 | 2.0 |
| EXP 8 | 0 | 3.1 | 99 | | 0.0 | 0.0 |
| EXP 8 | 2 | 2.8 | 90 | | 1.3 | 0.7 |
| EXP 8 | 6 | 3.6 | 115 | | 3.8 | 1.9 |
| EXP 8 | 10 | 4.5 | 143 | | 6.2 | 3.1 |
| EXP 8 | 15 | 5.3 | 169 | | 7.7 | 4.2 |
| EXP 8 | 20 | 5.8 | 184 | | 8.3 | 4.6 |
| EXP 8 | 25 | 6.7 | 214 | | 8.9 | 5.2 |
| EXP 10 | 0 | 4.0 | 128 | No skin formed | 0.0 | 0.0 |
| EXP 10 | 2 | 1.3 | 42 | | 0.5 | 0.4 |
| EXP 10 | 6 | 3.2 | 104 | | 0.9 | 0.6 |
| EXP 10 | 10 | 3.9 | 126 | | 1.1 | 0.9 |
| EXP 10 | 15 | 2.8 | 91 | | 1.4 | 1.3 |
| EXP 10 | 20 | 2.1 | 66 | | 1.7 | 1.6 |
| EXP 10 | 25 | 2.7 | 85 | | 1.9 | 1.8 |
| EXP 12 | 0 | | | 0.0 | 0.0 | 0.0 |
| EXP 12 | 2 | 0.7 | 23.0 | 3.5 | 1.8 | 1.2 |
| EXP 12 | 10 | 3.5 | 113.6 | 31.0 | 11.3 | 6.5 |

This data showed that the color build on exposure to UV light did fade, as shown by the drop in delta E from the 2 min values to the 48 hr values.

Figure 8:
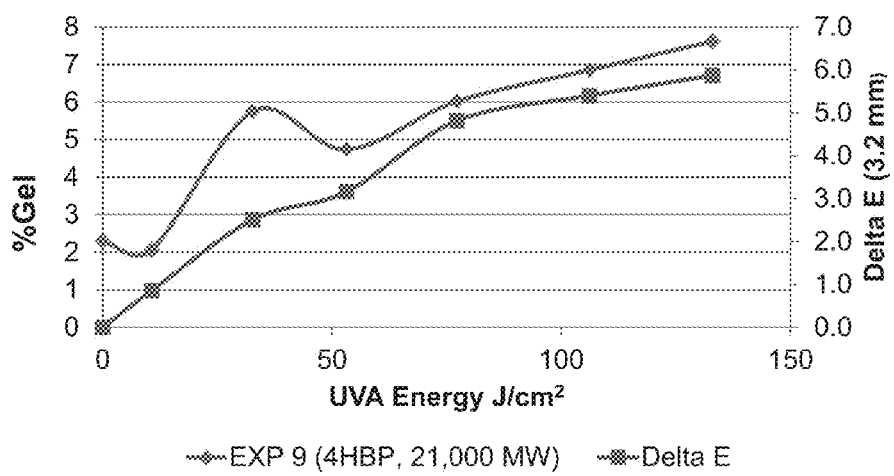
FIG. 8 is a graph showing a correlation between crosslinking and yellowing for a benzophenone-containing polycarbonate.

FIG. 8 is a graph for the results from EXP 9 (Mw≈21,000). The diamonds indicate the % gel vs. UVA energy (left axis), and the squares indicate the delta E vs. UVA energy.

Figure 9:
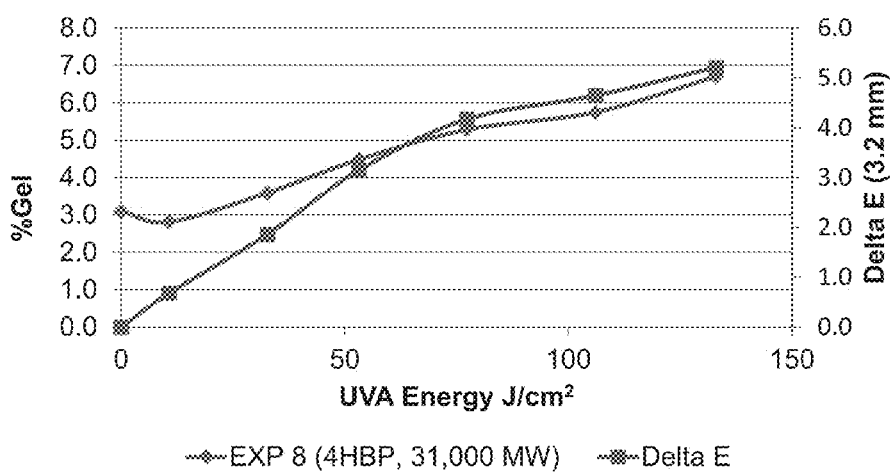
FIG. 9 is a graph showing a correlation between crosslinking and yellowing for a different benzophenone-containing polycarbonate.

FIG. 9 is a graph for the results from EXP 8 (Mw≈31,000). The diamonds indicate the % gel vs. UVA energy (left axis), and the squares indicate the delta E vs. UVA energy.

Both graphs also showed that while increasing the dosage increased the % gel (insoluble cross-linked skin), it also increased the delta E. For many applications, minimizing the color shift is critical.

Figure 10:
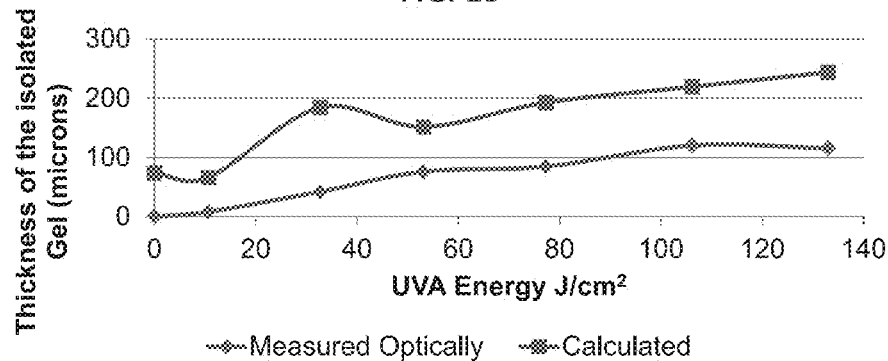
FIG. 10 is a graph comparing the results obtained from two different methods of measuring the thickness of the crosslinked skin.

Because the % Gel measurement had some error in it, the calculated skin thickness also had some error. However, a plot of the Calculated skin thickness and the Measured skin thickness versus exposure for Exp 9 showed a similar but offset trend. This plot is provided as FIG. 10. The squares were for calculated skin thickness, while the diamonds were for measured skin thickness.

Figure 11:
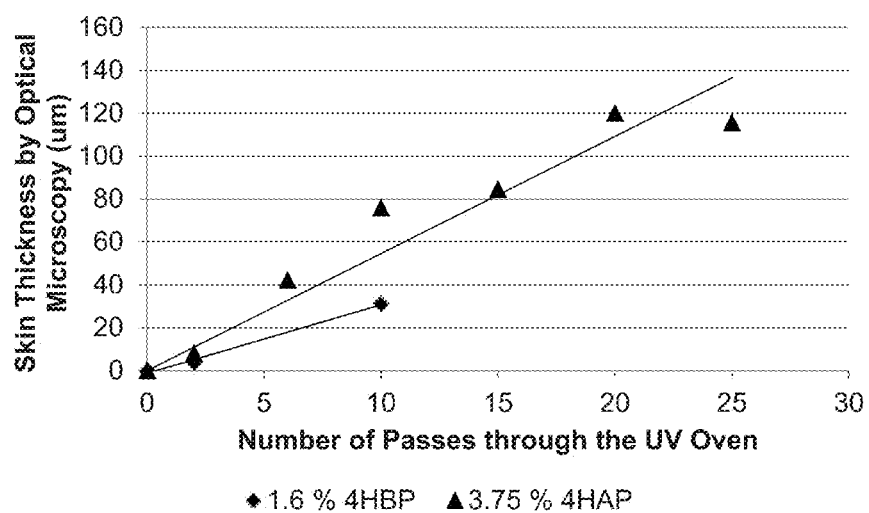
FIG. 11 is a graph showing the crosslinked skin thickness versus the UV dosage as measured by the number of passes through the UV chamber.

The rate of the formation of the skin depth correlated with the concentration of the photoactive moiety (1.6 mol % vs 3.75 mol %). This is seen in FIG. 11. Here, the diamonds are 1.6 mol % 4HBP, and the triangles are 3.75 mol % 4HBP.

To assess the effectiveness of the cross-linked skin at improving the properties of the articles, the chemical resistance of the samples to acetone was measured. The color chip samples exposed as shown in Table D were exposed to acetone. For the experiment, the samples were exposed on both sides instead of only one side. After cooling to room temperature, the samples were placed into an aluminum pan containing sufficient acetone to completely cover the chip. After 60 seconds, the samples were removed from the acetone and assessed for any dissolution of the surface, stickiness, or optical imperfections. The results are seen in Table F (see next page).

TABLE F

| Sample Name | # of Passes Under UV | Avg. % Gel | Average Skin Thickness | | Resistance to Acetone |
|---|---|---|---|---|---|
| | | | Calc from Avg % Gel (um) | By Optical Microscopy (um) | |
| EXP 9 | 0 | 2.3 | 74 | 0 | Poor, Skin turned white & cracked. |
| EXP 9 | 2 | 2.1 | 66 | 8 | Skin turned hazy and was slightly sticky |
| EXP 9 | 6 | 5.8 | 184 | 42 | Skin was not sticky and remained clear |
| EXP 9 | 10 | 4.7 | 152 | 76 | Skin was not sticky and remained clear |
| EXP 11 | 0 | 1.5 | 48 | No skin formed | Poor, Skin turned white & cracked. |
| EXP 11 | 2 | 2.1 | 67 | | Skin turned hazy and was sticky |
| EXP 11 | 6 | 1.7 | 55 | | Skin turned hazy and was sticky |
| EXP 11 | 10 | 2.0 | 64 | | Skin turned hazy and was sticky |
| EXP 8 | 0 | 3.1 | 99 | | Poor, Skin turned white & cracked. |
| EXP 8 | 2 | 2.8 | 90 | | Skin turned hazy |
| EXP 8 | 6 | 3.6 | 115 | | Skin was not sticky and remained clear |
| EXP 8 | 10 | 4.5 | 143 | | Skin was not sticky and remained clear |
| EXP 10 | 0 | 4.0 | 128 | No skin formed | Poor, Skin turned white & cracked. |
| EXP 10 | 2 | 1.3 | 42 | | Poor, Skin turned white & cracked. |
| EXP 10 | 6 | 3.2 | 104 | | Skin turned hazy and was sticky |
| EXP 10 | 10 | 3.9 | 126 | | Skin turned hazy and was sticky |
| EXP 10 | 15 | 2.8 | 91 | | Skin turned hazy and was sticky |
| EXP 12 | 0 | | | 0.0 | Poor, Skin turned white & cracked. |
| EXP 12 | 2 | 0.7 | 23.0 | 3.5 | Skin turned hazy. |
| EXP 12 | 10 | 3.5 | 113.6 | 31.0 | Skin was mostly clear with haze in come areas. |

All the samples before UV exposure had severe surface attack under this test. The surface became white and cracked. After UV exposure, those compositions that contained benzophenone formed crosslinked skins at a depth in accordance to the UV dose and benzophenone concentration. At 2 to 35 microns depth (as measured optically) the articles had improved chemical resistance over the unexposed samples without a crosslinked skin. For the best chemical resistance, a cross-linked skin depth (as measured by optical microscopy) of greater than 35 microns was preferred.

Next, a set of 3.2 mm Izod bars were made from the composition of EXP 11. These bars were then exposed to UV-radiation from a 9 mm D bulb from Fusion UV systems, Inc., with and without the borosilicate glass described in FIG. 7. The belt speed was set to 3 feet/min. A UV Power Puck™ from EIT Instruments was first run through the UV oven to measure the energy per pass or dose. The dose was measured as the energy from 320-390 nm (UVA), 280-320 nm (UVB), 250-260 nm (UVC) and 395-445 nm (UVV). The dose was calculated in $J/cm^2$.

For the samples using the filtered glass (BS WG), the surface temperature was read before and after each pass. The borosilicate glass was placed over the samples before they were passed through the UV oven. When the samples exited the oven, the glass was removed for the temperature measurement. After the temperature was read, the glass was placed back over the samples and they were allowed to sit at 23° C. under the glass. After the sample sat for 30 minutes, the glass was again removed, the surface temperature was again measured, the glass was replaced and the sample was again sent through the chamber. This process was continued for the desired number of passes.

The samples without the glass filter were run through the UV oven. As the samples exited the oven, they were immediately placed back on the belt for the next pass. This process was continued until the desired number of passes were obtained.

One set of samples used the LEXAN sheet (1.6 mm thickness, neutral color, UV stabilized polycarbonate) as a filter.

The change in the Yellowness Index (delta YI) was determined by measuring the YI on a 1.6 mm bar after 48 hours at 23° C. in the dark after the UV exposure. The results are shown in Table G.

under glass have a gel content of 5.9% (10 passes) vs 5.8% (6 passes) without the filter. More importantly, even though the samples have the same gel content, the delta YI of the sample with the glass filter is only 3 versus 7 for the sample with unfiltered light. Thus, for similar gel contents, the change in YI (Yellowness Index) can be dramatically reduced.

Next a set of samples were run through the chamber without any delay for 10 passes. One set of samples used the glass filter, and another used the LEXAN sheet. As seen in Table G, the sample with glass filter contained ~4.1% gel, whereas the sample with the LEXAN filter contained ~2.5% gel (which is similar to the gel content found on the two unexposed samples). The temperature of the samples can be controlled by various methods to control the crosslinking rate. The upper sample temperature needs to be controlled to minimizing discoloration and warping of the parts.

Figure 12:
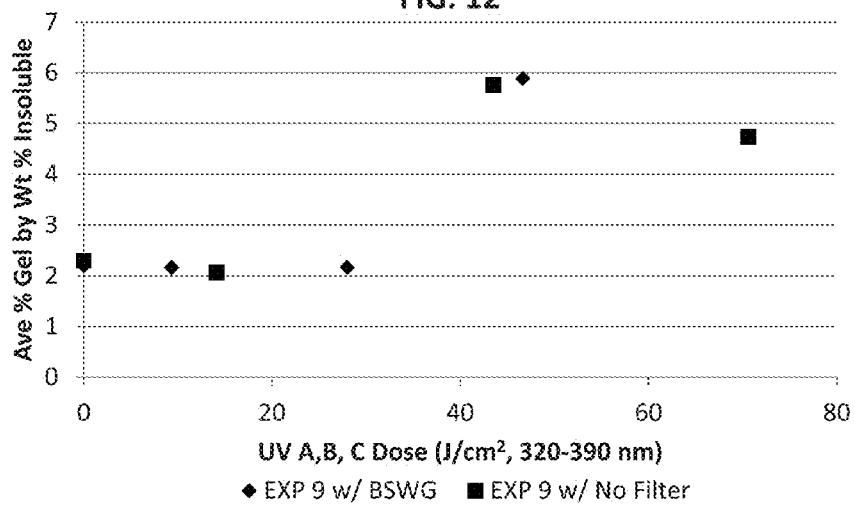
FIG. 12 is a graph showing the average gel percentage versus the UV dosages for a sample exposed using a filter versus a sample exposed without a filter.

As seen from the data in Table G, the harmful UV radiation (UVB) can be blocked and still achieve crosslinking (5.9% gel at 47 $J/cm^2$ under glass vs 5.8% gel at 44 $J/cm^2$ of UVA+UVB+UVC). This is seen in FIG. 12. The sample with the BSWG filter (diamond) was compared to the sample with no filter (square). Samples receiving the same dosage had the same gel content, even though the wavelengths providing that energy differed.

Figure 13:
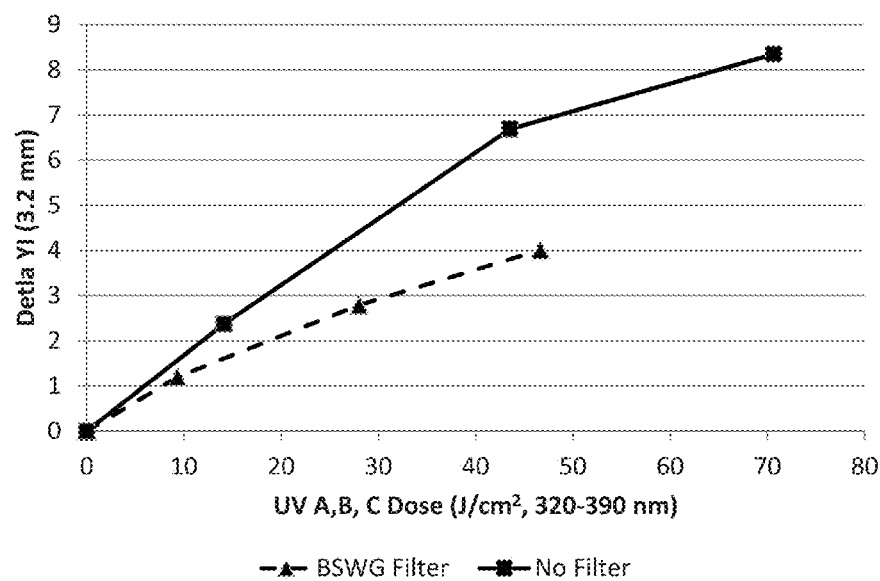
FIG. 13 is a graph showing the delta YI versus the UV dosage for a sample exposed using a filter versus a sample exposed without a filter.

In addition, the color of the samples exposed under BSWG glass have lower color shift. This is seen in FIG. 13. The sample with no filter (square) had a greater color shift compared to the samples with BSWG glass filter (triangle). The data also showed that while increasing the dose (# passes) increased the % insoluble cross-linked skin, it also increased the color (Delta YI). For many applications, minimizing the color shift is critical. The data also shows that a desirable spectrum of UV light is predominately from 330 to 380 nm. Light greater than 380 nm did not induce crosslinking.

For further verification regarding the preferred range of UV light for inducing crosslinking, 1.2 mm flame bars were prepared from polycarbonate resin. UV long pass filters from Schott Glass Advanced Optics Division were utilized with cut-on wavelengths at 280 (N-WG280), 290 (N-WG290), 305 (N-WG305), and 320 (N-WG320) nm. These UV long pass filters block the light below these wavelengths and pass the light above them.

TABLE G

| Sample | UV Filter | # of Passes Under UV | UVA ($J/cm^2$) | UVB ($J/cm^2$) | UVC ($J/cm^2$) | UVV ($J/cm^2$) | UVA + UVB + UVC | Avg % Gel | Delta YI after 48 hrs or more |
|---|---|---|---|---|---|---|---|---|---|
| EXP 9 | BS WG | 0 | 0 | 0 | 0 | 0 | 0 | 2.2 | 0 |
| EXP 9 | BS WG | 2 | 9.0 | 0.3 | 0.0 | 5.2 | 9 | 2.2 | 1 |
| EXP 9 | BS WG | 6 | 27.1 | 0.8 | 0.1 | 15.6 | 28 | 2.2 | 3 |
| EXP 9 | BS WG | 10 | 45.2 | 1.3 | 0.2 | 26.0 | 47 | 5.9 | 4 |
| EXP 9 | none | 0 | 0.0 | 0.0 | 0.0 | 0.0 | 0 | 2.3 | 0 |
| EXP 9 | none | 2 | 10.7 | 3.1 | 0.4 | 4.9 | 14 | 2.1 | 2 |
| EXP 9 | none | 6 | 32.7 | 9.7 | 1.1 | 15.1 | 44 | 5.8 | 7 |
| EXP 9 | none | 10 | 53.1 | 15.6 | 1.9 | 24.4 | 71 | 4.7 | 8 |
| EXP 9 | BS WG | 10 | 52.0 | 1.8 | 0.2 | 28.9 | 54 | 4.1 | |
| EXP 9 | PC Sheet | 10 | 1.5 | 0.5 | 0.1 | 17.7 | 2 | 2.5 | |

Figure 14:
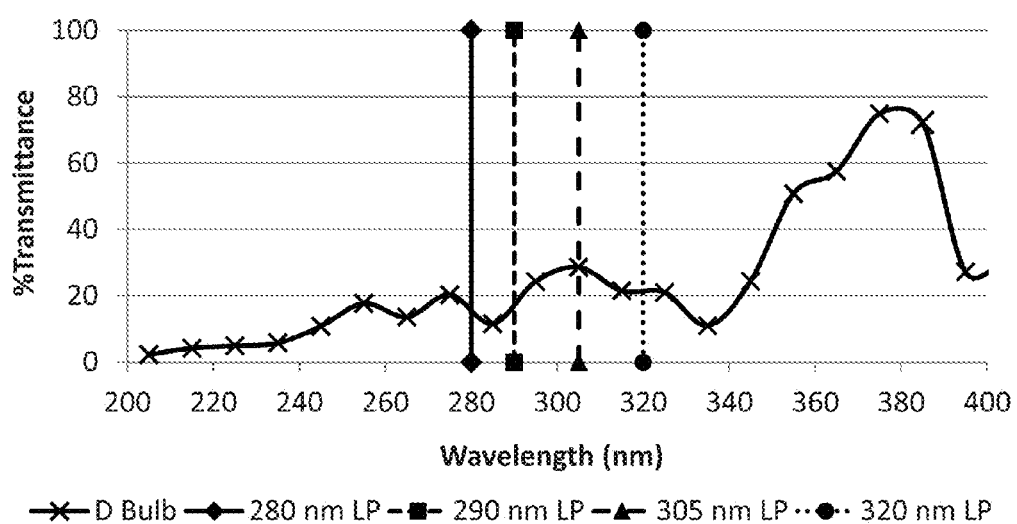
FIG. 14 is a graph showing the transmission spectrum of long pass UV-filters. The transmission spectrum is represented by plotting internal transmittance versus UV light wavelength.

Considering the BSWG samples, since the BSWG filter blocks the lower wavelengths of light, the total UV energy of light (UV A, B, C) is lower per pass than without the glass filter. But if one compares the samples at similar Total UV energy (UVA+UVB+UVC=45+/−2 $J/cm^2$), the samples These UV filters were combined with spectral output from the 9 mm D bulb from Fusion UV systems, Inc. As shown in FIG. 14, spectral output power is plotted versus wavelength of the UV-long pass filters. The data shows that there is a significant amount of light—down to approximately 200 nm—that can be blocked by the UV filters. The UV-long pass filters from 280 to 320 nm will also show if these wavelengths are necessary or detrimental to the UV cross-linking process.

The 1.2 mm flame bars were then passed though the UV chamber with D bulb and with the UV-filters covering the samples. The samples were then analyzed for (1) color shift by measuring YI at 48 hours after UV exposure and (2) for cross-linked layer thickness by optical microscopy after dissolving away the soluble portion. The results from the exposure of samples using the D bulb and long pass filters are indicated below in Tables H-1 and H-2 (next page).

TABLE H-1

| Number Passes | Long Pass Filter (nm) | UV Dosage | | | |
|---|---|---|---|---|---|
| | | UVA (J/cm²) | UVB (J/cm²) | UVC (J/cm²) | UVV (J/cm²) |
| 0 | 280 | 0 | 0 | 0 | 0 |
| 2 | 280 | 10.6 | 2.2 | 0 | 5.2 |
| 6 | 280 | 31.9 | 6.7 | 0.1 | 15.5 |
| 10 | 280 | 53.2 | 11.1 | 0.1 | 25.8 |
| 15 | 280 | 79.8 | 16.7 | 0.1 | 38.7 |
| 20 | 280 | 106.4 | 22.3 | 0.2 | 51.6 |
| 25 | 280 | 133 | 27.8 | 0.2 | 64.5 |
| 0 | 295 | 0 | 0 | 0 | 0 |
| 2 | 295 | 12.2 | 1.9 | 0 | 5.9 |
| 6 | 295 | 36.5 | 5.8 | 0.1 | 17.6 |
| 10 | 295 | 60.8 | 9.6 | 0.1 | 29.4 |
| 15 | 295 | 91.2 | 14.4 | 0.2 | 44.1 |
| 20 | 295 | 121.6 | 19.2 | 0.2 | 58.7 |
| 25 | 295 | 152 | 24 | 0.3 | 73.4 |
| 0 | 305 | 0 | 0 | 0 | 0 |
| 2 | 305 | 12 | 1 | 0 | 5.8 |
| 6 | 305 | 36.1 | 2.9 | 0.1 | 17.5 |
| 10 | 305 | 60.2 | 4.9 | 0.1 | 29.2 |
| 15 | 305 | 90.2 | 7.3 | 0.1 | 43.8 |
| 20 | 305 | 120.3 | 9.7 | 0.2 | 57.4 |
| 25 | 305 | 150.4 | 12.1 | 0.2 | 73 |
| 0 | 320 | 0 | 0 | 0 | 0 |
| 2 | 320 | 11.8 | 0.2 | 0 | 5.9 |
| 6 | 320 | 35.3 | 0.7 | 0.1 | 17.6 |
| 10 | 320 | 58.9 | 1.2 | 0.1 | 29.3 |
| 15 | 320 | 88.4 | 1.8 | 0.2 | 44 |
| 20 | 320 | 117.8 | 2.4 | 0.2 | 58.7 |
| 25 | 320 | 147.3 | 3 | 0.3 | 73.4 |
| 0 | None | 0 | 0 | 0 | 0 |
| 2 | None | 12.2 | 3.7 | 0.5 | 5.9 |
| 6 | None | 36.6 | 11.2 | 10.4 | 17.7 |
| 10 | None | 60.9 | 18.7 | 2.4 | 29.5 |
| 15 | None | 91.4 | 28 | 3.5 | 44.3 |
| 20 | None | 121.8 | 37.3 | 4.7 | 59 |
| 25 | None | 152.3 | 46.6 | 5.9 | 73.8 |

TABLE H-2

| Number Passes | Long Pass Filter (nm) | Delta E* | Delta YI | Gel Thickness (microns) |
|---|---|---|---|---|
| 0 | 280 | 0 | 0 | 0 |
| 2 | 280 | 0.7 | 1.2 | 0 |
| 6 | 280 | 1.5 | 2.5 | 25.4 |
| 10 | 280 | 2.2 | 3.8 | 51.8 |
| 15 | 280 | 3.5 | 5.9 | 55.1 |
| 20 | 280 | 4.1 | 6.9 | 91.1 |
| 25 | 280 | 4.5 | 7.5 | 80.7 |
| 0 | 295 | 0 | 0 | 0 |
| 2 | 295 | 0.7 | 1.2 | 0 |
| 6 | 295 | 1.4 | 2.4 | 16.5 |
| 10 | 295 | 2.1 | 3.6 | 31.1 |
| 15 | 295 | 3.3 | 5.7 | 58.5 |
| 20 | 295 | 3.9 | 6.7 | 95.1 |
| 25 | 295 | 4.3 | 7.4 | 101.7 |
| 0 | 305 | 0 | 0 | 0 |
| 2 | 305 | 0.7 | 1.2 | 0 |
| 6 | 305 | 1.3 | 2.3 | 10.7 |
| 10 | 305 | 2 | 3.5 | 42.6 |
| 15 | 305 | 3.4 | 5.8 | 73.5 |
| 20 | 305 | 3.9 | 6.6 | 75.8 |
| 25 | 305 | 4.3 | 7.3 | 114.3 |
| 0 | 320 | 0 | 0 | 0 |
| 2 | 320 | 0.7 | 1.2 | 0 |
| 6 | 320 | 1.2 | 2.1 | 6.2 |
| 10 | 320 | 1.8 | 3.2 | 32.8 |
| 15 | 320 | 3 | 5.2 | 42.4 |
| 20 | 320 | 3.5 | 6.1 | 94 |
| 25 | 320 | 4 | 6.9 | 88.9 |
| 0 | None | 0 | 0 | 0 |
| 2 | None | 1.3 | 2.2 | 9.2 |
| 6 | None | 4.3 | 7.2 | 32 |
| 10 | None | 5.9 | 9.9 | 55.3 |
| 15 | None | 7.6 | 12.5 | 92 |
| 20 | None | 8.1 | 13.3 | 115.7 |
| 25 | None | 8.2 | 13.5 | 120.2 |

Figure 15:
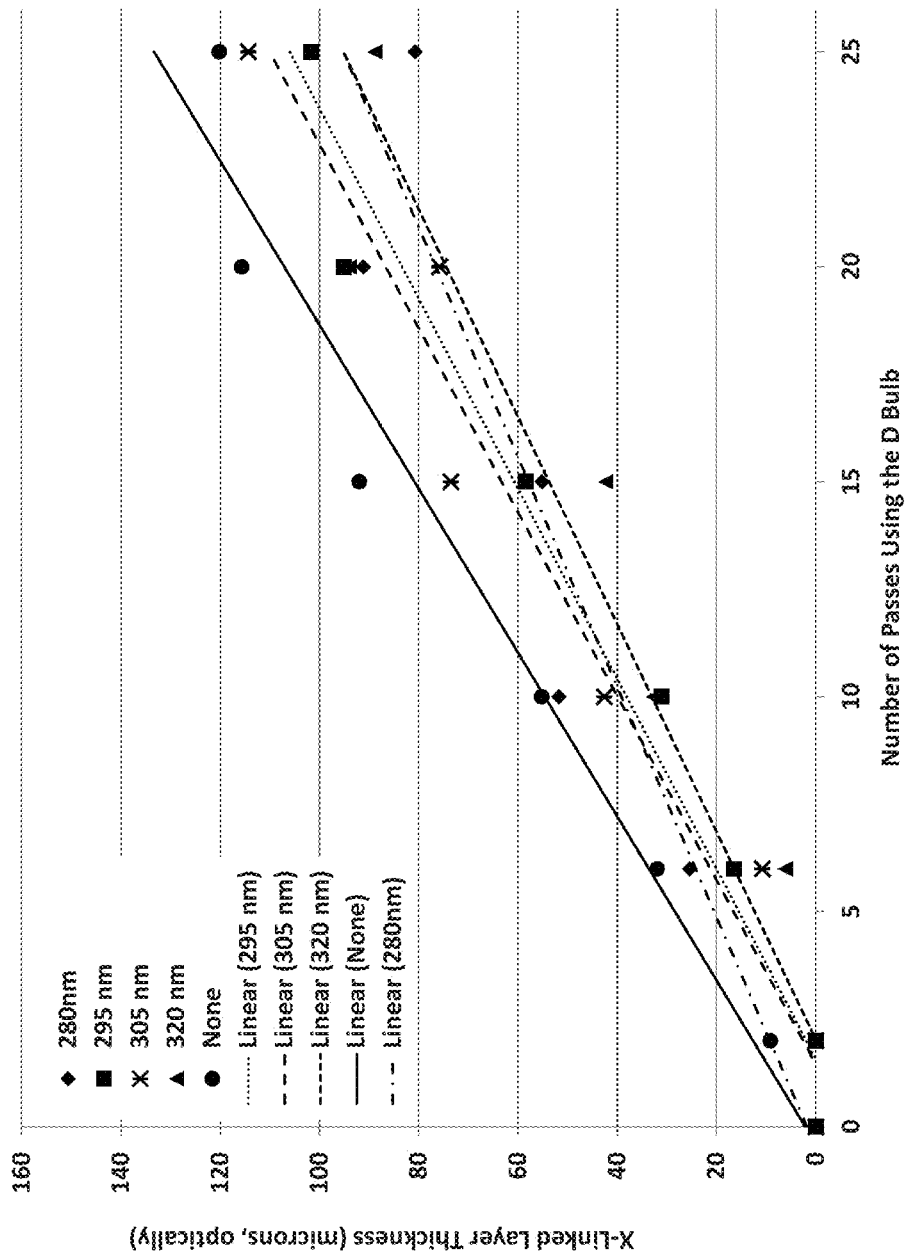
FIG. 15 is a graph showing the thickness of cross-linked polycarbonate layers versus the number of passes through a UV chamber with and without UV filters.

With reference to FIG. 15, a plot of cross linked layer thickness (microns, optically obtained) versus the number of passes using the D bulb show a slightly greater increase in cross link thickness per pass without the filters in place.

Figure 16:
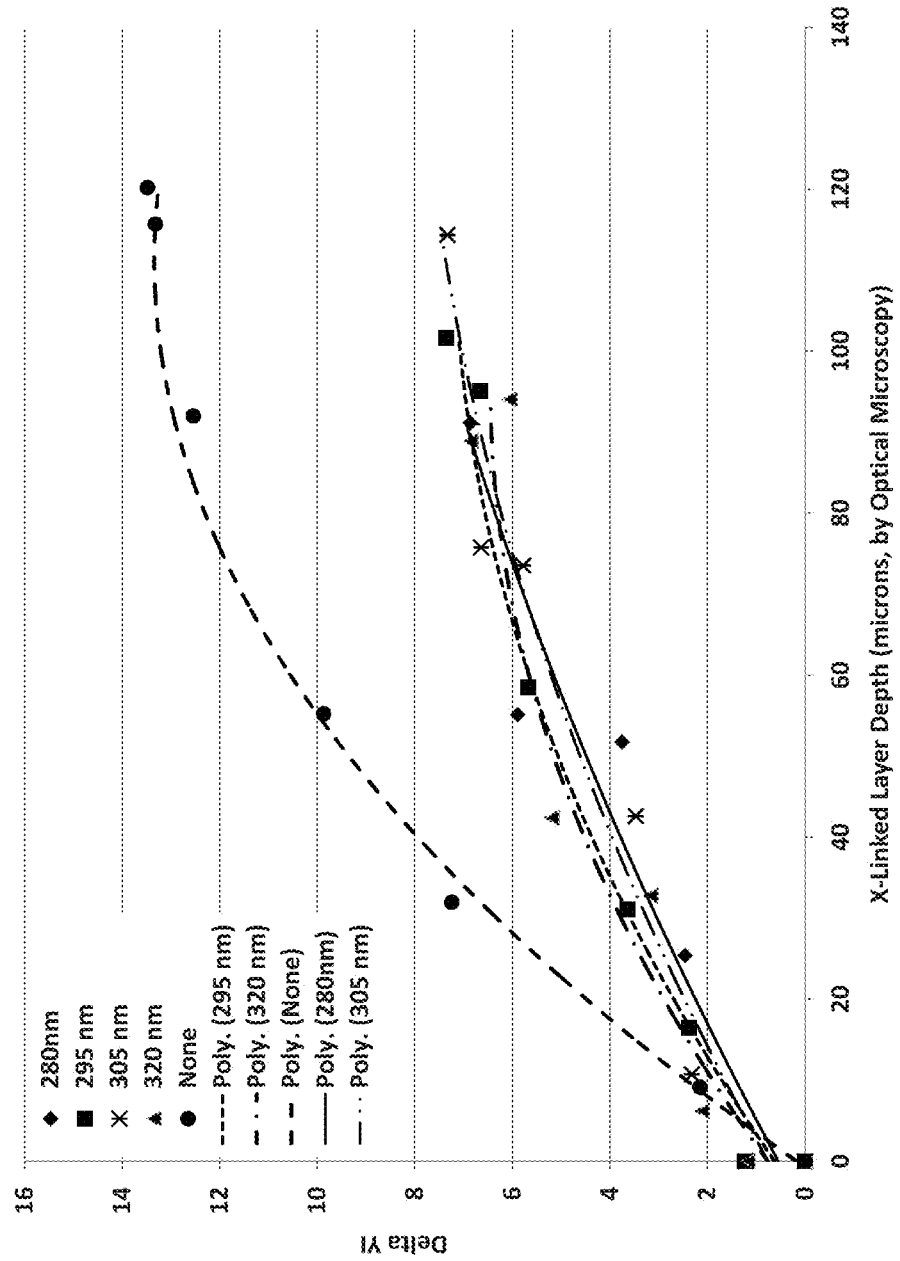
FIG. 16 is a graph showing the shift in yellowness versus the thickness of cross-linked polycarbonate layers with and without UV filters.

With reference to FIG. 16, when comparing the cross-linked layer thickness versus the YI shift, the UV-filters show a dramatic decrease in the color shift—by approximately one-half—for a given cross-linked layer thickness. Accordingly, by selecting the appropriate wavelengths of UV light, the desired amount of cross linked layer thickness can be achieved while dramatically decreasing the color shift. In an exemplary embodiment, a process for enhancing the chemical resistance of a surface molded article includes a selecting an ultraviolet range from about 280 nm to 360 nm.

Filter Tests

An XPC-1 polycarbonate formed from bisphenol-A and having 3.45 mole % 4-hydroxybenzophenone endcaps and a molecular weight of 22,000 g/mol by polycarbonate standards was cast into films of 20 micrometers (μm) to 40 μm thickness.

A Fusion UV system was used to expose the films to UV radiation by passing the films placed on a conveyor under a D-bulb to expose the film. Each pass provided approximately 6.0 J/cm² of UVA energy (320-390 nm), 1.8 J/cm² of UVB energy (280-320 nm), 0.22 J/cm² of UVC energy (250-260 nm), and 2.9 J/cm² of UVV energy (395-445 nm) as measured by an EIT PowerPuck (EIT Inc., Sterling, Va.), when no filter was present.

Five films of the XPC-1 polymer were irradiated with filtered UV light. A long pass filter was used to remove specific wavelengths of light, with a cut-on wavelength of 200 nm or 320 nm. The films were irradiated on either one surface or both surfaces for five passes, about 30 J/cm² of UVA on each surface. The films were about 0.2 mm (200 μm) thick. The yellowness index (YI) was then measured at 10, 1000, 2500, and 30 thousand minutes after exposure. This was done because it is known that the YI will increase sharply upon UV exposure, then reduce over time to a constant amount.

For reference, the performance of four different long pass filters is provided in Table 17A. These filters have a different cut-on wavelength. The cut-on wavelength specifies the location of the transition from a region of low transmission to an adjacent spectral region of high transmission, defined here as the wavelength where the internal transmission is 50%. This table indicates the percentage of incident light that remains when the filter is being used, as measured by an EIT PowerPuck, with 100% indicating the incident light without the filter.

TABLE 17A

| Cut-on wavelength (nm, T = 50%) | UVA (320-390 nm) | UVB (280-320 nm) | UVC (250-260 nm) | UW (395-445 nm) |
|---|---|---|---|---|
| 220 nm | 100% | 100% | 100% | 100% |
| 280 nm | 97% | 60% | 4% | 99% |
| 320 nm | 87% | 6% | 4% | 87% |
| 395 nm | 10% | 0% | 0% | 87% |

The results for the films of the XPC-1 polymer are shown in Table 17B. The UVA dosage is measured prior to passing through the long pass filter. Ex-01 is the control, with no exposure.

TABLE 17B

| Component | Ex-01 XPC-1 | Ex-02 XPC-1 | Ex-03 XPC-1 | Ex-04 XPC-1 | Ex-05 XPC-1 |
|---|---|---|---|---|---|
| Dose (J/cm², UVA) | 0 | 30 | 30 | 30 | 30 |
| Wavelength cut-on (nm) | N/A | 200 | 320 | 200 | 320 |
| Sides irradiated | 0 | 1 | 1 | 2 | 2 |
| Gel thickness (μm) | 0 | 40 | 13 | 160 | 160 |
| YI (0 min) | 0.77 | 12.50 | 5.80 | 13.56 | 17.70 |
| YI (1000 min) | 0.77 | 10.03 | 3.47 | 13.37 | 13.89 |
| YI (2500 min) | 0.77 | 9.30 | 3.26 | 13.26 | 12.87 |
| YI (30000 min) | 0.77 | 7.84 | 2.70 | 12.81 | 9.14 |

As can be seen here, using a cut-on wavelength of 320 nm sharply reduced the YI compared to the cut-on of 200 nm. The change in YI was less than 9.0 for exposure on both surfaces when a cut-on of 320 nm was used as well. The YI values at 2500 minutes and 30000 minutes best illustrate the benefits of the filters and the treatment of the articles during normal handling. It is noted that the YI value at 10 minutes can be distorted by many variables.

Chemical Resistance Tests

A set of chemical resistance tests was performed. The tests were performed using an XPC-2 polymer, which was formed from bisphenol-A and had 5.5 mole % 4-hydroxybenzophenone endcaps and a molecular weight of 17,000 g/mol by polycarbonate standards. 50 parts by weight of the XPC-2 polymer was blended with 50 parts by weight of HF-PC, 0.08 phr KSS, 0.06 phr phosphite stabilizer to form a composition (CR1). Parts having a thickness of 2.5 millimeters (mm) were made from the composition, and exposed to various dosages (0, 12, 36, 60 J/cm² of UVA, measured before filtering) while covered with long pass filters of different cut-on wavelengths (220, 280, 320, 395 nm). The YI was then measured after 10 minutes, 24 hours, 48 hours, and 168 hours at 23° C. YI was measured following ASTM E313-73 (D1925). The color difference dE* was then calculated. The haze was also measured before and after acetone immersion. The part was immersed for 60 seconds in acetone, then dried in air for 1 minute, soaked in deionized water for 5 minutes, dried, and placed in the dark before measurement. EX-10 is the control (no exposure). The results are shown in Tables 18A and 18B.

TABLE 18A

| | Ex-10 | Ex-11 | Ex-12 | Ex-13 | Ex-14 | Ex-15 | Ex-16 |
|---|---|---|---|---|---|---|---|
| Component | CR1 | CR1 | CR1 | CR1 | CR1 | CR1 | CR1 |
| Dose (UVA, J/cm²) | 0 | 12 | 36 | 60 | 12 | 36 | 60 |
| Cut-on wavelength (nm) | N/A | 220 | 220 | 220 | 280 | 280 | 280 |
| YI (23° C., 10 min) | 2.0 | 9.0 | 20.7 | 25.1 | 8.0 | 19.6 | 22.5 |
| YI (23° C., 24 hr) | 2.0 | 6.4 | 14.5 | 17.8 | 5.2 | 12.3 | 14.6 |
| YI (23° C., 48 hr) | 1.9 | 6.1 | 13.3 | 16.2 | 5.0 | 11.3 | 13.7 |
| YI (23° C., 168 hr) | 2.1 | 5.6 | 11.8 | 13.9 | 4.9 | 9.4 | 12.0 |
| dE* (168 hr) | — | 2.1 | 5.6 | 6.0 | 1.5 | 4.1 | 5.6 |
| Gel Thickness (microns) | 0 | 0 | 0 | 28 | 0 | 0 | 4.3 |
| Haze, Before immersion | 6.6 | 4.6 | 6.9 | 6.7 | 6.8 | 6.9 | 6.8 |
| Haze, Acetone Immersion | 80.1 | 49.9 | 45.9 | 23.8 | 37.2 | 7.3 | 7.8 |

TABLE 18B

| | Ex-17 | Ex-18 | Ex-19 | Ex-20 | Ex-21 | Ex-22 |
|---|---|---|---|---|---|---|
| Component | CR1 | CR1 | CR1 | CR1 | CR1 | CR1 |
| Dose (UVA, J/cm²) | 12 | 36 | 60 | 12 | 36 | 60 |
| Cut-on wavelength (nm) | 320 | 320 | 320 | 395 | 395 | 395 |
| YI (23° C., 10 min) | 10.6 | 21.1 | 22.9 | 2.0 | 2.1 | 2.1 |
| YI (23° C., 24 hr) | 7.6 | 12.3 | 14.7 | 1.9 | 2.0 | 2.1 |
| YI (23° C., 48 hr) | 6.1 | 12.0 | 13.6 | 1.9 | 2.0 | 2.0 |
| YI (23° C., 168 hr) | 5.7 | 9.1 | 11.5 | 2.1 | 2.2 | 2.2 |
| dE* (168 hr) | 2.1 | 3.9 | 5.3 | 0.0 | 0.1 | 0.1 |
| Gel Thickness (microns) | 0 | 0 | 0 | 0 | 0 | 0 |
| Haze, Before immersion | 6.6 | 7.7 | 7.2 | 7.4 | 7.2 | 7.0 |
| Haze, Acetone Immersion | 13.0 | 23.2 | 6.5 | 92.1 | 86.9 | 91.7 |

Comparing the examples with the same dosage, the filter with a cut-on wavelength of 395 nm was most effective in reducing the overall YI and the color difference, but was not effective at inducing crosslinking, as indicated by the high haze values. The hydroxybenzophenone unit absorbs light at about 335 nm, while the carbonate units absorb light at about 245 nm. Using the 395 nm filter, the hydroxybenzophenone absorbance wavelength was blocked, so very little crosslinking could occur. Using the 220 nm filter, both units are absorbing light, and while there is a significant gel (Ex-13), there is also significant haze, which is believed to be due to degradation from Fries rearrangement. A filter with a cut-on wavelength of 280 nm or 320 nm provided the best balance of color (i.e. low YI or dE*) and high acetone resistance (i.e. low haze).

Next, a flame performance test was performed with the XPC-1 polymer (polycarbonate formed from bisphenol-A, 3.45 mole % 4-hydroxybenzophenone endcaps, a molecular weight of 22,000 g/mol). 913-1 was the control. Measurements were taken before and after UV exposure. The samples received a total of 30 J/cm$^2$ on each side using a Fusion UV system. The results are shown in Table 19.

TABLE 19

| Components | 913-1 | 913-2 |
|---|---|---|
| XPC-1 (3.45 mol %) (pbw) |  | 50 |
| LF-PC (pbw) | 100 | 50 |
| Rimar Salt (phr) | 0.1 | 0.1 |
| Phosphite stabilizer (phr) | 0.06 | 0.06 |
| MFR (1.2 kg/300 C., 360 s) | 6.67 | 9.28 |
| MFR (1.2 kg/300 C., 1080 s) | 7.17 | 9.26 |
| Gel Thickness (micron) | 0 | 9.85 |
| Delta YI | 3.4 | 15.4 |
| Flame Performance (non-UV exposure) | | |
| p(FTP) for V0 @ 1.5 mm (48 hr) | 0 | 0 |
| flaming drips | 2/3 | 3/3 |
| p(FTP) for V0 @ 1.2 mm (48 hr) | 0 | 0 |
| flaming drips | 2/3 | 2/3 |
| p(FTP) for V0 @ 1.0 mm (48 hr) | 0 | 0 |
| flaming drips | 3/3 | 3/3 |
| 5VA @ 1.5 mm (48 hr) | Fail | Fail |
| Flame Performance (after UV exposure) | | |
| p(FTP) for V0 @ 1.5 mm (48 hr) | 0 | 0.983 |
| flaming drips | 6/10 | 0/18 |
| p(FTP) for V0 @ 1.2 mm (48 hr) | 0 | 0.2 |
| flaming drips | 8/10 | 1/18 |
| p(FTP) for V0 @ 1.0 mm (48 hr) | 0.74 | 0.57 |
| flaming drips | 1/18 | 1/18 |
| 5VA @ 1.5 mm | Fail | Pass |

TABLE 19-continued

| Components | 913-1 | 913-2 |
|---|---|---|
| Chemical Resistance (Elongation @ Break) | | |
| As molded bar | 134.2 | 138.0 |
| Acetone @ 0.5% strain | | |
| No UV | 10.5 | 8.9 |
| Exposed to UV | 5.9 | 78.9 |
| Acetone @ 1% strain | | |
| No UV | 0.0 | 0.0 |
| Exposed to UV | 0.0 | 68.0 |

As seen here, prior to UV exposure, the blend containing XPC (913-2) did not attain a V0 or 5VA rating. However, after UV exposure, the XPC blend passes the 5VA and V0 rating at 1.5 mm thickness. The chemical resistance is also higher after UV exposure, and higher compared to the non-XPC control.

Lame Scale Study

A large scale study was performed using 13 different batches. The batches used one of three cross-linkable polycarbonate resins. XPC-A was a bisphenol-A polymer with 3.79 wt % 4-hydroxybenzophenone (HBP) endcaps and a target weight average molecular weight (Mw) of 17,000. When measured with a UV detector, XPC-A had an Mw of 16,692 and a PDI of 3.3. When measured with an RI detector, XPC-A had an Mw of 23,123 and a PDI of 2.4. XPC-B was a bisphenol-A polymer with 3.05 wt % HBP endcaps and a target Mw of 22,000. When measured with a UV detector, XPC-B had an Mw of 20,600 and a PDI of 3.4. When measured with an RI detector, XPC-B had an Mw of 26,443 and a PDI of 2.4. XPC-C was a bisphenol-A polymer with 2.58 wt % HBP endcaps and a target Mw of 26,000. When measured with a UV detector, XPC-C had an Mw of 24,455 and a PDI of 3.7. When measured with an RI detector, XPC-C had an Mw of 32,432 and a PDI of 2.7.

Some of the batches included LF-PC, which is a bisphenol-A homopolymer prepared by the interfacial process having an Mw of about 30,000 Daltons. The batches also included Rimar salt (flame retardant) and a phosphite stabilizer (Irgaphos 168). The formulation of the 13 batches is shown in Table 20A and Table 20B.

TABLE 20A

| Name | B-1 | B-2 | B-3 | B-4 | B-5 | B-6 | B-7 | B-8 | B-9 |
|---|---|---|---|---|---|---|---|---|---|
| XPC-A (wt %) | 99.84 | 87.36 | 74.88 | 49.92 | | | | | |
| XPC-B (wt %) | | | | | 99.84 | 87.36 | 74.88 | 62.40 | 49.92 |
| LF-PC (wt %) | | 12.48 | 24.96 | 49.92 | | 12.48 | 24.96 | 37.44 | 49.92 |
| Rimar Salt (wt %) | 0.10 | 0.10 | 0.10 | 0.10 | 0.10 | 0.10 | 0.10 | 0.10 | 0.10 |
| Phosphite (wt %) | 0.06 | 0.06 | 0.06 | 0.06 | 0.06 | 0.06 | 0.06 | 0.06 | 0.06 |

TABLE 20B

| Name | B-10 | B-11 | B-12 | B-13 |
|---|---|---|---|---|
| XPC-C (wt %) | 99.84 | 74.88 | 62.40 | 49.92 |
| LF-PC (wt %) |  | 24.96 | 37.44 | 49.92 |
| Rimar Salt (wt %) | 0.10 | 0.10 | 0.10 | 0.10 |
| Phosphite (wt %) | 0.06 | 0.06 | 0.06 | 0.06 |

The 13 batches were used to make 50 samples which were then exposed to various doses of UV light. The samples were exposed to either filtered light or unfiltered light. The unfiltered light was provided by a Fusion UV system, which used a D-bulb electrodeless bulb. The filtered light was provided by a Loctite Zeta 7411-S system, which used a 400 W D-bulb metal halide arc lamp and behaved like a filter with a 280-nm cut-on wavelength. The samples were exposed on both sides beneath the UV lights for the equivalent UVA dosage of 12, 36, or 60 J/cm$^2$ per side. The UV energy for each system is provided below in Table 21A and Table 21B, and was measured using an EIT PowerPuck. In the results section, the UV source is listed as either U for unfiltered light, or F for filtered light, and the UVA dosage is listed.

TABLE 21A

Loctite (filtered light).

| Loctite Dose Filtered | UVA J/cm$^2$ | UVB J/cm$^2$ | UVC J/cm$^2$ | UVV J/cm$^2$ |
|---|---|---|---|---|
| 2 passes | 12.0 | 2.4 | 0 | 7.3 |
| 6 passes | 36.0 | 7.2 | 0 | 21.9 |
| 10 passes | 60.2 | 12.1 | 0 | 36.6 |

TABLE 21B

Fusion (unfiltered light)

| Fusion UV Unfiltered | UVA J/cm$^2$ | UVB J/cm$^2$ | UVC J/cm$^2$ | UVV J/cm$^2$ |
|---|---|---|---|---|
| 2 passes | 12.0 | 3.7 | 0.45 | 5.8 |
| 6 passes | 35.9 | 11.0 | 1.34 | 17.5 |
| 10 passes | 59.9 | 18.3 | 2.24 | 29.2 |

The flame performance of the 50 samples was tested using the methods described above near Tables 5 and 6. The pFTP values for these samples were based on 18 bars. The bars were conditioned for either 2 days or 7 days, then tested. The pFTP was calculated separately for the 2-day samples and the 7-day samples. The pFTP for V0 performance and V1 performance was calculated. It should be noted that the pFTP(V1) for any given sample is expected to be higher than the pFTP(V0) for the sample, because the V1 test is less stringent than the V0 test. The fraction of drips is also reported.

Chemical resistance was measured by the elongation at break of tensile bars having 3.2 mm thickness. For chemically exposed samples, the tensile bars were put under 1% strain at 23° C. and exposed to acetone. They were then removed from the strain jigs and the tensile elongation at break was measured following the ASTM D638 Type I method at 50 mm/min. The tensile elongation at break was measured under four different conditions: before UV exposure and before exposure to acetone ("No UV, No Chem"); before UV exposure and after exposure to acetone ("No UV, Ace"); after UV exposure and before exposure to acetone ("UV, No Chem"); and after UV exposure and after exposure to acetone ("UV, Ace"). Units were in percentage. The percentage of retention of tensile elongation (% retention) was the "UV, Ace" divided by the "UV, No Chem". Acetone was applied to six bars, while the "No Chem" control data was obtained with only 3 bars.

The degree of crosslinking was quantified by dissolving the non-cross-linked fraction of the plaque in methylene chloride and isolating the insoluble gel layer. The thickness of the insoluble gel layer was measured using optical microscopy, and is reported in microns.

The molecular weight of the samples was measured before and after UV exposure using a UV detector. The percentage change in the molecular weight was calculated as the change divided by the molecular weight before UV exposure.

The Yellowness Index (YI) was measured on 3.2 mm tensile bars before UV exposure and at least 48 hours after UV exposure using an X-Rite Color i7 benchtop spectrophotometer in the transmission mode using CIELAB color equation, an observer angle of 2 degrees, and illuminant C as the light source. YI was measured following ASTM E313-73 (D1925). The light transmission (% T) was measured concurrently with the YI on the same bar.

The MFR for each sample was calculated using the ASTM D1238 method, 1.2 kg load, 300° C. temperature, 360 second dwell.

The glass transition temperature (Tg) was measured after UV exposure. The temperature of the bars after UV exposure was also taken using a Cole Palmer IR Thermometer (model 08406-16), and is reported in degrees Fahrenheit (° F.). The bars for flame testing and tensile testing were separately measured, and are listed in separate columns.

The results of the 50 samples are reported in Tables 22A-22H.

TABLE 22A

| Sample # | Batch | Dose # passes | Dose J/cm$^2$ | UV source | p(FTP) @ V0 2 day | p(FTP) @ V0 7 day | p(FTP) @ V1 2 day | p(FTP) @ V1 7 day | fraction of drips 2 day | fraction of drips 7 day |
|---|---|---|---|---|---|---|---|---|---|---|
| 1 | B-10 | 2 | 12 | F | 0.1606 | 0.1094 | 0.2373 | 0.9898 | 0.22 | 0.00 |
| 2 | B-4 | 2 | 12 | F | 0.0002 | 0.0001 | 0.0007 | 0.0001 | 0.56 | 0.60 |
| 3 | B-5 | 2 | 12 | U | 0.0495 | 0.4777 | 0.7199 | 1.0000 | 0.06 | 0.00 |
| 4 | B-13 | 2 | 12 | F | 0.0552 | 0.0994 | 0.0776 | 0.1426 | 0.33 | 0.28 |
| 5 | B-7 | 10 | 60 | U | 0.2199 | 0.8826 | 0.9944 | 1.0000 | 0.00 | 0.00 |
| 6 | B-10 | 10 | 60 | F | 0.0089 | 0.6019 | 0.3666 | 0.9999 | 0.17 | 0.00 |
| 7 | B-11 | 2 | 12 | U | 0.0017 | 0.0021 | 0.3334 | 0.6822 | 0.17 | 0.06 |
| 8 | B-4 | 10 | 60 | U | 0.0009 | 0.0001 | 0.0366 | 0.1409 | 0.39 | 0.28 |
| 9 | B-11 | 6 | 36 | U | 0.0029 | 0.0633 | 0.2317 | 1.0000 | 0.22 | 0.00 |
| 10 | B-9 | 6 | 36 | U | 0.0014 | 0.0019 | 0.2679 | 0.7170 | 0.17 | 0.06 |
| 11 | B-10 | 6 | 36 | U | 0.0002 | 0.0002 | 0.0040 | 0.9999 | 0.50 | 0.00 |

TABLE 22A-continued

| Sample # | Batch | Dose # passes | Dose J/cm² | UV source | p(FTP) @ V0 2 day | p(FTP) @ V0 7 day | p(FTP) @ V1 2 day | p(FTP) @ V1 7 day | fraction of drips 2 day | fraction of drips 7 day |
|---|---|---|---|---|---|---|---|---|---|---|
| 12 | B-13 | 6 | 36 | F | 0.0400 | 0.0053 | 0.3628 | 0.7460 | 0.17 | 0.00 |
| 13 | B-5 | 10 | 60 | U | 0 | 0.0003 | 0 | 0.9889 | 0.55 | 0.00 |
| 14 | B-3 | 2 | 12 | F | 0 | 0 | 0 | 0 | 1.00 | 1.00 |
| 15 | B-5 | 6 | 36 | F | 0 | 0 | 0 | 0.7444 | 0.90 | 0.06 |
| 16 | B-10 | 2 | 12 | F | 0.0030 | 0 | 0.2370 | 0.0040 | 0.22 | 0.50 |
| 17 | B-10 | 2 | 12 | U | 0.0048 | 0.0001 | 0.7403 | 0.7228 | 0.05 | 0.06 |
| 18 | B-11 | 10 | 60 | F | 0.0019 | 0.0046 | 0.2373 | 0.9510 | 0.22 | 0.00 |
| 19 | B-3 | 10 | 60 | F | 0.1040 | 0.1356 | 0.3625 | 0.9967 | 0.17 | 0.00 |
| 20 | B-11 | 10 | 60 | U | 0.4147 | 0.7624 | 0.9999 | 1.0000 | 0.00 | 0.00 |
| 21 | B-3 | 6 | 36 | F | 0.4363 | 0.0324 | 0.7435 | 0.9572 | 0.06 | 0.00 |
| 22 | B-4 | 2 | 12 | U | 0.6923 | 0.0001 | 0.7451 | 0.0001 | 0.06 | 0.60 |
| 23 | B-6 | 10 | 60 | F | 0.4526 | 0.0694 | 0.7367 | 0.9694 | 0.06 | 0.00 |
| 24 | B-8 | 2 | 12 | U | 0.0061 | 0.0089 | 0.0364 | 0.2346 | 0.39 | 0.22 |
| 25 | B-4 | 10 | 60 | U | 0.2224 | 0.0421 | 0.5317 | 0.9872 | 0.11 | 0.00 |

TABLE 22B

| Sample # | Batch | Dose # passes | Dose J/cm² | UV source | p(FTP) @ V0 2 day | p(FTP) @ V0 7 day | p(FTP) @ V1 2 day | p(FTP) @ V1 7 day | fraction of drips 2 day | fraction of drips 7 day |
|---|---|---|---|---|---|---|---|---|---|---|
| 26 | B-7 | 6 | 36 | U | 0.1683 | 0.382 | 0.5337 | 0.9999 | 0.11 | 0.00 |
| 27 | B-12 | 6 | 36 | F | 0.1529 | 0.3092 | 0.3666 | 0.9943 | 0.17 | 0.00 |
| 28 | B-9 | 2 | 12 | F | 0.0079 | 0 | 0.0144 | 0.0001 | 0.44 | 0.60 |
| 29 | B-9 | 10 | 60 | F | 0.5996 | 0.6319 | 0.9975 | 0.9998 | 0.00 | 0.00 |
| 30 | B-10 | 2 | 12 | F | 0.5211 | 0.0057 | 0.7450 | 0.4921 | 0.06 | 0.11 |
| 31 | B-11 | 2 | 12 | F | 0.2636 | 0.0601 | 0.5348 | 0.1426 | 0.11 | 0.28 |
| 32 | B-10 | 10 | 60 | U | 0.3347 | 0.8172 | 0.7446 | 1.0000 | 0.06 | 0.00 |
| 33 | B-2 | 6 | 36 | U | 0.3207 | 0.0606 | 0.7247 | 0.9810 | 0.06 | 0.00 |
| 34 | B-4 | 6 | 36 | F | 0.1718 | 0.097 | 0.3654 | 0.7439 | 0.17 | 0.06 |
| 35 | B-1 | 10 | 60 | F | 0.0343 | 0.0135 | 0.1106 | 0.9983 | 0.30 | 0.00 |
| 36 | B-7 | 2 | 12 | F | 0 | 0.0028 | 0 | 0.0144 | 0.70 | 0.44 |
| 37 | B-8 | 6 | 36 | F | 0.3153 | 0.0776 | 0.9987 | 0.9902 | 0.00 | 0.00 |
| 38 | B-3 | 2 | 12 | U | 0.0974 | 0 | 0.2360 | 0 | 0.22 | 1.00 |
| 39 | B-1 | 10 | 60 | U | 0.0974 | 0 | 0.3428 | 0.2366 | 0.17 | 0.22 |
| 40 | B-13 | 6 | 36 | U | 0.0900 | 0.0017 | 0.9953 | 0.9919 | 0.00 | 0.00 |
| 41 | B-4 | 10 | 60 | F | 0 | 0.0141 | 0 | 0.5112 | 0.60 | 0.11 |
| 42 | B-13 | 2 | 12 | U | 0.0001 | 0 | 0.0034 | 0.0039 | 0.50 | 0.50 |
| 43 | B-1 | 2 | 12 | F | 0 | 0 | 0 | 0 | 1.00 | 1.00 |
| 44 | B-4 | 2 | 12 | U | 0 | 0 | 0 | 0 | 1.00 | 0.80 |
| 45 | B-13 | 10 | 60 | F | 0.1151 | 0.0229 | 0.7335 | 0.9819 | 0.06 | 0.00 |
| 46 | B-1 | 10 | 60 | F | 0 | 0 | 0 | 0.0035 | 0.70 | 0.50 |
| 47 | B-13 | 2 | 12 | U | 0.3119 | 0 | 0.7237 | 0.0141 | 0.06 | 0.44 |
| 48 | B-1 | 2 | 12 | U | 0.0012 | 0.0004 | 0.0041 | 0.0346 | 0.50 | 0.39 |
| 49 | B-3 | 10 | 60 | U | 0.0032 | 0.0003 | 0.0142 | 0.9943 | 0.44 | 0.00 |
| 50 | B-13 | 10 | 60 | U | 0.0799 | 0.4694 | 0.7398 | 0.9979 | 0.06 | 0.00 |

TABLE 22C

| Sample | Chemical resistance (6 bars @ 1% strain) Elongation at Break | | | | | Gel layer thickness (microns) |
|---|---|---|---|---|---|---|
| | No UV, No Chem | No UV, Ace | UV, No Chem | UV, Ace | % ret (UV, Ace) | |
| 1 | 128.73 | 0 | 124.88 | 93.75 | 75.07 | 0.0 |
| 2 | 108.23 | 0 | 101.25 | 6.72 | 6.63 | 0.0 |
| 3 | 137.98 | 0 | 116.75 | 27.38 | 23.45 | 9.0 |
| 4 | 136.67 | 2.98 | 123.83 | 47.52 | 38.37 | 0.0 |
| 5 | 136.99 | 0 | 110.25 | 98.57 | 89.41 | 30.9 |
| 6 | 128.73 | 0 | 115.38 | 86.80 | 75.23 | 22.9 |
| 7 | 133.18 | 0 | 131.55 | 95.18 | 72.35 | 3.1 |
| 8 | 93.24 | 0 | 76.85 | 79.92 | 103.99 | 14.7 |
| 9 | 133.18 | 0 | 118.45 | 107.72 | 90.94 | 21.3 |
| 10 | 130.88 | 0 | 125.3 | 95.47 | 76.19 | 7.7 |
| 11 | 128.73 | 0 | 113.35 | 88.43 | 78.02 | 29.2 |
| 12 | 136.67 | 2.98 | 127.83 | 76.28 | 59.67 | 0.0 |
| 13 | 137.98 | 0 | 106 | 103.13 | 97.29 | 32.9 |
| 14 | 129.81 | 0 | 127 | 3.13 | 2.47 | 0.0 |
| 15 | 137.98 | 0 | 117.3 | 108.18 | 92.23 | 11.1 |
| 16 | 128.73 | 0 | 124.88 | 76.23 | 61.05 | 0.0 |
| 17 | 128.73 | 0 | 117.68 | 82.90 | 70.45 | 8.8 |
| 18 | 133.18 | 0 | 121.48 | 108.38 | 89.22 | 10.2 |
| 19 | 129.81 | 0 | 112.23 | 103.27 | 92.02 | 13.4 |
| 20 | 133.18 | 0 | 107.73 | 95.65 | 88.79 | 34.4 |
| 21 | 129.81 | 0 | 100.1 | 45.43 | 45.38 | 7.9 |
| 22 | 93.24 | 0 | 81.03 | 8.13 | 10.04 | 2.3 |
| 23 | 125.58 | 0 | 108.9 | 108.48 | 99.61 | 18.8 |
| 24 | 136.23 | 0 | 133.35 | 27.32 | 20.48 | 2.3 |
| 25 | 108.23 | 0 | 105.25 | 69.35 | 65.89 | 20.0 |

TABLE 22D

| Sample | Chemical resistance (6 bars @ 1% strain) Elongation at Break | | | | | Gel layer thickness (microns) |
|---|---|---|---|---|---|---|
| | No UV, No Chem | No UV, Ace | UV, No Chem | UV, Ace | % ret (UV, Ace) | |
| 26 | 136.99 | 0 | 110.48 | 108.82 | 98.50 | 19.5 |
| 27 | 129.23 | 0 | 121.98 | 67.77 | 55.56 | 0.0 |
| 28 | 130.88 | 0 | 135.1 | 6.75 | 5.00 | 0.0 |
| 29 | 130.88 | 0 | 116.58 | 69.25 | 59.40 | 0.0 |
| 30 | 128.73 | 0 | 127.35 | 54.02 | 42.42 | 0.0 |
| 31 | 133.18 | 0 | 129.13 | 42.80 | 33.14 | 0.0 |
| 32 | 128.73 | 0 | 109.23 | 102.18 | 93.55 | 51.8 |
| 33 | 134.78 | 0 | 110.35 | 96.02 | 87.01 | 21.0 |
| 34 | 93.24 | 0 | 96.35 | 16.72 | 17.35 | 0.0 |
| 35 | 116.33 | 0 | 113.78 | 106.75 | 93.82 | 18.8 |
| 36 | 136.99 | 0 | 120.23 | 12.87 | 10.70 | 0.0 |
| 37 | 136.23 | 0 | 122.7 | 83.15 | 67.77 | 5.7 |
| 38 | 129.81 | 0 | 120.73 | 4.75 | 3.93 | 5.5 |
| 39 | 116.33 | 0 | 102.65 | 72.43 | 70.56 | 29.5 |
| 40 | 136.67 | 2.98 | 125.1 | 107.92 | 86.27 | 8.5 |
| 41 | 108.23 | 0 | 109.43 | 48.08 | 43.94 | 5.7 |
| 42 | 136.67 | 2.98 | 127.2 | 109.03 | 85.72 | 0.0 |
| 43 | 116.33 | 0 | 118.58 | 0.00 | 0.00 | 0.0 |
| 44 | 108.23 | 0 | 102.43 | 5.29 | 5.16 | 0.0 |
| 45 | 136.67 | 2.98 | 120.23 | 103.83 | 86.36 | 0.0 |
| 46 | 116.33 | 0 | 102.48 | 84.37 | 82.33 | 21.4 |
| 47 | 136.67 | 2.98 | 126.43 | 82.95 | 65.61 | 0.0 |
| 48 | 116.33 | 0 | 104.6 | 6.27 | 5.99 | 5.9 |
| 49 | 129.81 | 0 | 110.63 | 98.00 | 88.58 | 25.0 |
| 50 | 136.67 | 2.98 | 120.83 | 107.20 | 88.72 | 5.1 |

TABLE 22E

| Sample | Molecular Weight | | | % Change Mw | YI | | |
|---|---|---|---|---|---|---|---|
| | Before UV | After UV | Delta | | Before UV | After UV | Delta |
| 1 | 24455 | 27640 | 3185 | 13% | 3.34 | 5.7 | 2.4 |
| 2 | 21134 | 22481 | 1347 | 6% | 2.17 | 5.42 | 3.3 |
| 3 | 20600 | 25253 | 4653 | 23% | 2.83 | 7.92 | 5.1 |
| 4 | 25454 | 31531 | 6077 | 24% | 2.27 | 5.54 | 3.3 |
| 5 | 21716 | 31552 | 9836 | 45% | 2.26 | 23.64 | 21.4 |
| 6 | 24455 | 32396 | 7941 | 32% | 3.34 | 12.1 | 8.8 |
| 7 | 24920 | 30657 | 5737 | 23% | 2.3 | 7.63 | 5.3 |
| 8 | 21134 | 29369 | 8235 | 39% | 2.17 | 22.44 | 20.3 |
| 9 | 24920 | 34404 | 9484 | 38% | 2.3 | 22 | 19.7 |
| 10 | 22725 | 32682 | 9957 | 44% | 2.3 | 20.31 | 18.0 |
| 11 | 24455 | 32369 | 7914 | 32% | 3.34 | 26.25 | 22.9 |
| 12 | 25454 | 33282 | 7828 | 31% | 2.27 | 10.15 | 7.9 |
| 13 | 20600 | 28627 | 8027 | 39% | 2.83 | 27.78 | 25.0 |
| 14 | 18982 | 21019 | 2037 | 11% | 2.11 | 6.09 | 4.0 |
| 15 | 20600 | 26287 | 5687 | 28% | 2.83 | 10.87 | 8.0 |
| 16 | 24455 | 27917 | 3462 | 14% | 3.34 | 6.78 | 3.4 |
| 17 | 24455 | 30038 | 5583 | 23% | 3.34 | 8.96 | 5.6 |
| 18 | 24920 | 33477 | 8557 | 34% | 2.3 | 11.22 | 8.9 |
| 19 | 18982 | 23510 | 4528 | 24% | 2.11 | 9.42 | 7.3 |
| 20 | 24920 | 36659 | 11739 | 47% | 2.3 | 25.7 | 23.4 |
| 21 | 18982 | 23455 | 4473 | 24% | 2.11 | 9.01 | 6.9 |
| 22 | 21134 | 24797 | 3663 | 17% | 2.17 | 7.97 | 5.8 |
| 23 | 21829 | 27440 | 5611 | 26% | 2.38 | 9.88 | 7.5 |
| 24 | 22460 | 27306 | 4846 | 22% | 2.04 | 7.3 | 5.3 |
| 25 | 21134 | 29505 | 8371 | 40% | 2.17 | 22.44 | 20.3 |

TABLE 22F

| Sample | Molecular Weight | | | % Change Mw | YI | | |
|---|---|---|---|---|---|---|---|
| | Before UV | After UV | Delta | | Before UV | After UV | Delta |
| 26 | 21716 | 29435 | 7719 | 36% | 2.26 | 20.95 | 18.7 |
| 27 | 24213 | 34088 | 9875 | 41% | 2.31 | 8.48 | 6.2 |
| 28 | 22725 | 26028 | 3303 | 15% | 2.3 | 5.43 | 3.1 |
| 29 | 22725 | 32122 | 9397 | 41% | 2.3 | 11.68 | 9.4 |
| 30 | 24455 | 27879 | 3424 | 14% | 3.34 | 6.28 | 2.9 |
| 31 | 24920 | 28359 | 3439 | 14% | 2.3 | 5.4 | 3.1 |
| 32 | 24455 | 33815 | 9360 | 38% | 3.34 | 30.06 | 26.7 |
| 33 | 17925 | 23247 | 5322 | 30% | 1.98 | 24.23 | 22.3 |
| 34 | 21134 | 26620 | 5486 | 26% | 2.17 | 9.75 | 7.6 |
| 35 | 16692 | 21618 | 4926 | 30% | 2.8 | 14.66 | 11.9 |
| 36 | 21716 | 24843 | 3127 | 14% | 2.26 | 5.33 | 3.1 |
| 37 | 22460 | 30207 | 7747 | 34% | 2.04 | 9.81 | 7.8 |
| 38 | 18982 | 22384 | 3402 | 18% | 2.11 | 8.32 | 6.2 |
| 39 | 16692 | 22750 | 6058 | 36% | 2.8 | 34.42 | 31.6 |
| 40 | 25454 | 36135 | 10681 | 42% | 2.27 | 18.51 | 16.2 |
| 41 | 21134 | 28420 | 7286 | 34% | 2.17 | 12.9 | 10.7 |
| 42 | 25454 | 29740 | 4286 | 17% | 2.27 | 7.92 | 5.7 |
| 43 | 16692 | 19291 | 2599 | 16% | 2.8 | 6.38 | 3.6 |
| 44 | 21134 | 24302 | 3168 | 15% | 2.17 | 8.25 | 6.1 |
| 45 | 25454 | 36279 | 10825 | 43% | 2.27 | 10.95 | 8.7 |
| 46 | 16692 | 21576 | 4884 | 29% | 2.8 | 14.2 | 11.4 |
| 47 | 25454 | 30551 | 5097 | 20% | 2.27 | 7.96 | 5.7 |
| 48 | 16692 | 19817 | 3125 | 19% | 2.8 | 10.39 | 7.6 |
| 49 | 18982 | 25149 | 6167 | 32% | 2.11 | 25.68 | 23.6 |
| 50 | 25454 | 36762 | 11308 | 44% | 2.27 | 18.32 | 16.1 |

TABLE 22G

| Sample | % T | | | XPC wt % | MFR g/10 min | Tg ° C. | Temperature ° F. | |
|---|---|---|---|---|---|---|---|---|
| | Before UV | After UV | Delta | | | | Flame | Tensile |
| 1 | 88.296 | 86.828 | −1.5 | 2.58 | 5.18 | 157 | 166 | 168 |
| 2 | 88.901 | 87.085 | −1.8 | 1.99 | 11.7 | 155 | 172 | 177 |
| 3 | 88.349 | 85.826 | −2.5 | 3.05 | 9.14 | 154 | 181 | 183 |
| 4 | 88.779 | 87.258 | −1.5 | 1.26 | 5.99 | 157 | 168 | 167 |
| 5 | 88.485 | 79.886 | −8.6 | 2.34 | 8.32 | 160 | 204 | 208 |
| 6 | 88.296 | 84.304 | −4.0 | 2.58 | 5.18 | 161 | 190 | 200 |
| 7 | 89.095 | 86.308 | −2.8 | 1.92 | 5.04 | 156 | 180 | 183 |
| 8 | 88.901 | 79.264 | −9.6 | 1.99 | 11.7 | 158 | 203 | 205 |
| 9 | 89.095 | 80.411 | −8.7 | 1.92 | 5.04 | 158 | 195 | 195 |
| 10 | 88.776 | 80.983 | −7.8 | 1.55 | 7.46 | 157 | 193 | 197 |
| 11 | 88.296 | 77.975 | −10.3 | 2.58 | 5.18 | 159 | 194 | 191 |
| 12 | 88.779 | 85.469 | −3.3 | 1.26 | 5.99 | 157 | 188 | 182 |
| 13 | 88.349 | 77.5 | −10.8 | 3.05 | 9.14 | 161 | 206 | 205 |
| 14 | 89.255 | 86.945 | −2.3 | 2.83 | 14.5 | 154 | 184 | 175 |
| 15 | 88.349 | 84.481 | −3.9 | 3.05 | 9.14 | 158 | 183 | 187 |

TABLE 22G-continued

| | % T | | | | | | | Temperature ° F. | |
| Sample | Before UV | After UV | Delta | XPC wt % | MFR g/10 min | Tg ° C. | Flame | Tensile |
|---|---|---|---|---|---|---|---|---|
| 16 | 88.296 | 86.436 | −1.9 | 2.58 | 5.18 | 157 | 171 | 184 |
| 17 | 88.296 | 85.519 | −2.8 | 2.58 | 5.18 | 157 | 182 | 184 |
| 18 | 89.095 | 84.947 | −4.1 | 1.92 | 5.04 | 158 | 193 | 199 |
| 19 | 89.255 | 85.715 | −3.5 | 2.83 | 14.5 | 158 | 185 | 194 |
| 20 | 89.095 | 79.14 | −10.0 | 1.92 | 5.04 | 159 | 200 | 203 |
| 21 | 89.255 | 86.036 | −3.2 | 2.83 | 14.5 | 156 | 193 | 185 |
| 22 | 88.901 | 86.199 | −2.7 | 1.99 | 11.7 | 155 | 178 | 184 |
| 23 | 88.826 | 85.491 | −3.3 | 2.69 | 8.95 | 159 | 191 | 183 |
| 24 | 88.787 | 86.437 | −2.4 | 1.92 | 8.3 | 156 | 182 | 176 |
| 25 | 88.901 | 80.338 | −8.6 | 1.99 | 11.7 | 158 | 201 | 205 |

TABLE 22H

| | % T | | | | | | | Temperature ° F. | |
| Sample | Before UV | After UV | Delta | XPC wt % | MFR g/10 min | Tg ° C. | Flame | Tensile |
|---|---|---|---|---|---|---|---|---|
| 26 | 88.485 | 80.336 | −8.1 | 2.34 | 8.32 | 158 | 198 | 198 |
| 27 | 89.215 | 86.388 | −2.8 | 1.6 | 5.68 | 157 | 192 | 182 |
| 28 | 88.776 | 87.176 | −1.6 | 1.55 | 7.46 | 155 | 190 | 177 |
| 29 | 88.776 | 84.811 | −4.0 | 1.55 | 7.46 | 157 | 196 | 205 |
| 30 | 88.296 | 86.863 | −1.4 | 2.58 | 5.18 | 156 | 184 | 184 |
| 31 | 89.095 | 87.338 | −1.8 | 1.92 | 5.04 | 156 | 178 | 178 |
| 32 | 88.296 | 76.164 | −12.1 | 2.58 | 5.18 | 161 | 201 | 205 |
| 33 | 89.025 | 79.099 | −9.9 | 3.33 | 18.5 | 159 | 197 | 200 |
| 34 | 88.901 | 85.327 | −3.6 | 1.99 | 11.7 | 156 | 185 | 194 |
| 35 | 88.378 | 82.83 | −5.5 | 3.79 | 19.9 | 159 | 194 | 201 |
| 36 | 88.485 | 87.029 | −1.5 | 2.34 | 8.32 | 154 | 174 | 192 |
| 37 | 88.787 | 85.054 | −3.7 | 1.92 | 8.3 | 157 | 190 | 190 |
| 38 | 89.255 | 85.909 | −3.3 | 2.83 | 14.5 | 154 | 190 | 186 |
| 39 | 88.378 | 75.455 | −12.9 | 3.79 | 19.9 | 163 | 205 | 209 |
| 40 | 88.779 | 81.852 | −6.9 | 1.26 | 5.99 | 158 | 198 | 199 |
| 41 | 88.901 | 84.049 | −4.9 | 1.99 | 11.7 | 154 | 190 | 192 |
| 42 | 88.779 | 86.12 | −2.7 | 1.26 | 5.99 | 156 | 184 | 186 |
| 43 | 88.378 | 86.569 | −1.8 | 3.79 | 19.9 | 150 | 179 | 181 |
| 44 | 88.901 | 86.06 | −2.8 | 1.99 | 11.7 | 154 | 170 | 178 |
| 45 | 88.779 | 85.061 | −3.7 | 1.26 | 5.99 | 154 | 182 | 185 |
| 46 | 88.378 | 83.193 | −5.2 | 3.79 | 19.9 | 155 | 182 | 188 |
| 47 | 88.779 | 86.296 | −2.5 | 1.26 | 5.99 | 156 | 170 | 180 |
| 48 | 88.378 | 84.994 | −3.4 | 3.79 | 19.9 | 153 | 173 | 185 |
| 49 | 89.255 | 78.57 | −10.7 | 2.83 | 14.5 | 160 | 205 | 199 |
| 50 | 88.779 | 81.826 | −7.0 | 1.26 | 5.99 | 158 | 208 | 201 |

Looking at Tables 22A-22B, one surprising finding was that the 7-day pFTP for many samples was higher than the 2-day pFTP. This behavior was exactly the opposite of the expected behavior. Looking at Tables 22E-22F, the YI was much lower when filtered light was used instead of unfiltered light, particularly at the high dosages.

Many of the batches were compositions that had a cross-linkable polycarbonate resin having endcaps derived from 4-hydroxybenzophenone and a weight average molecular weight (Mw) from 15,000 to 30,000 and a PDI from 3.0 to 4.0 as measured by GPC using a UV detector and polycarbonate standards; contained at least 45 wt % of the polycarbonate cross-linkable polycarbonate resin; had a 4-hydroxybenzophenone content between 1.2 wt % and 4 wt %; had a melt flow rate (MFR) of 7 to 20 g/10 min; and had a % T of 85% or greater at 3.2 mm thickness prior to UV exposure.

Some of the batch compositions had a cross-linkable polycarbonate resin having endcaps derived from 4-hydroxybenzophenone and a weight average molecular weight (Mw) from 15,000 to 30,000 and a PDI from 3.0 to 4.0 as measured by GPC using a UV detector and polycarbonate standards; contained at least 45 wt % of the polycarbonate cross-linkable polycarbonate resin; had a 4-hydroxybenzophenone content between 1.2 wt % and 4 wt %; had a melt flow rate (MFR) of 7 to 20 g/10 min; had a % T of 85% or greater at 3.2 mm thickness prior to UV exposure; had a % T of 75% or greater at 3.2 mm thickness after UV exposure; and had a gel layer of at least 8 microns thickness after UV exposure. In addition to these properties, a few compositions also had a pFTP(V1) of at least 0.95 at 1.2 mm thickness after aging for 7 days at 70° C.; a delta YI value of 12 or less at 3.2 mm thickness measured at least 48 hours after UV exposure; a pFTP(V0) of at least 0.6 at 1.2 mm thickness; a % retention of 85% or greater at 3.2 mm thickness in a tensile elongation at break test using the ASTM D638 Type I method at 50 mm/min after exposure to acetone under 1% strain at 23° C.; and/or a % retention of 90% or greater at 3.2 mm thickness in a tensile elongation at break test using the ASTM D638 Type I method at 50 mm/min after exposure to acetone under 1% strain at 23° C.

Other batch compositions had a cross-linkable polycarbonate resin having endcaps derived from 4-hydroxybenzophenone and a weight average molecular weight (Mw) from 15,000 to 30,000 and a PDI from 3.0 to 4.0 as measured by GPC using a UV detector and polycarbonate standards; contained at least 45 wt % of the polycarbonate cross-linkable polycarbonate resin; had a 4-hydroxybenzophenone content between 1.2 wt % and 4 wt %; had a melt flow rate (MFR) of 7 to 20 g/10 min; had a % T of 85% or greater at 3.2 mm thickness prior to UV exposure; had a % T of 75% or greater at 3.2 mm thickness after UV exposure; and after UV exposure had an increase in Mw of at least 30% as measured by GPC using a UV detector and polycarbonate standards. In addition to these properties, a few compositions also had a pFTP(V1) of at least 0.95 at 1.2 mm thickness after aging for 7 days at 70° C.; a delta YI value of 12 or less at 3.2 mm thickness measured at least 48 hours after UV exposure; a pFTP(V0) of at least 0.6 at 1.2 mm thickness; a % retention of 85% or greater at 3.2 mm thickness in a tensile elongation at break test using the ASTM D638 Type I method at 50 mm/min after exposure to acetone under 1% strain at 23° C.; and/or a % retention of 90% or greater at 3.2 mm thickness in a tensile elongation at break test using the ASTM D638 Type I method at 50 mm/min after exposure to acetone under 1% strain at 23° C.

Some of the batch compositions had a cross-linkable polycarbonate resin having endcaps derived from 4-hydroxybenzophenone and a weight average molecular weight (Mw) from 15,000 to 30,000 and a PDI from 3.0 to 4.0 as measured by GPC using a UV detector and polycarbonate standards; contained at least 45 wt % of the polycarbonate cross-linkable polycarbonate resin; had a 4-hydroxybenzophenone content between 1.2 wt % and 4 wt %; had a melt flow rate (MFR) of 7 to 20 g/10 min; had a % T of 85% or greater at 3.2 mm thickness prior to UV exposure; had a % T of 75% or greater at 3.2 mm thickness after UV exposure; either (i) a gel layer of at least 8 microns thickness after UV exposure or (ii) an increase in Mw of at least 30% as measured by GPC using a UV detector and polycarbonate standards; and a % retention of 85% or greater at 3.2 mm thickness in a tensile elongation at break test using the ASTM D638 Type I method at 50 mm/min after exposure to acetone under 1% strain at 23° C. In addition to these properties, a few compositions also had a pFTP(V1) of at least 0.95 at 1.2 mm thickness after aging for 7 days at 70° C.; a delta YI value of 12 or less at 3.2 mm thickness measured at least 48 hours after UV exposure; and/or a pFTP(V0) of at least 0.6 at 1.2 mm thickness.

Some of the batch compositions had a cross-linkable polycarbonate resin having endcaps derived from 4-hydroxybenzophenone and a weight average molecular weight (Mw) from 15,000 to 30,000 and a PDI from 3.0 to 4.0 as measured by GPC using a UV detector and polycarbonate standards; contained at least 45 wt % of the polycarbonate cross-linkable polycarbonate resin; had a 4-hydroxybenzophenone content between 1.2 wt % and 4 wt %; had a melt flow rate (MFR) of 7 to 20 g/10 min; had a % T of 85% or greater at 3.2 mm thickness prior to UV exposure; had a % T of 75% or greater at 3.2 mm thickness after UV exposure; either (i) a gel layer of at least 8 microns thickness after UV exposure or (ii) an increase in Mw of at least 30% as measured by GPC using a UV detector and polycarbonate standards; and a % retention of 90% or greater at 3.2 mm thickness in a tensile elongation at break test using the ASTM D638 Type I method at 50 mm/min after exposure to acetone under 1% strain at 23° C. In addition to these properties, a few compositions also had a pFTP(V1) of at least 0.95 at 1.2 mm thickness after aging for 7 days at 70° C.; a delta YI value of 12 or less at 3.2 mm thickness measured at least 48 hours after UV exposure; and/or a pFTP(V0) of at least 0.6 at 1.2 mm thickness.

Additional batch compositions had a cross-linkable polycarbonate resin having endcaps derived from 4-hydroxybenzophenone, a weight average molecular weight (Mw) from 15,000 to 30,000 and a PDI from 3.0 to 4.0 as measured by GPC using a UV detector and polycarbonate standards, and a 4-hydroxybenzophenone content from 3.0 to 4.5 wt % in the cross-linkable resin; an overall 4-hydroxybenzophenone content in the composition of between 1.2 wt % and 4 wt %; and a melt flow rate (MFR) of 7 to 20 g/10 min measured at 300° C./1.2 kg/360 sec dwell; and could form articles that after UV exposure had a gel layer of at least 5 microns thickness and had a pFTP(V1) of at least 0.95 at 1.2 mm thickness after aging for 7 days at 70° C.

Still other batch compositions had a cross-linkable polycarbonate resin having endcaps derived from 4-hydroxybenzophenone, a weight average molecular weight (Mw) from 15,000 to 30,000 and a PDI from 3.0 to 4.0 as measured by GPC using a UV detector and polycarbonate standards, and a 4-hydroxybenzophenone content from 3.0 to 4.5 wt % in the polycarbonate resin; a melt flow rate (MFR) of 7 g/10 min or higher, measured at 300° C./1.2 kg/360 sec dwell; and could be used to form injection molded articles having a YI of 15 or less at 3.2 mm thickness and having a % retention of 85% or greater at 3.2 mm thickness in a tensile elongation at break test using the ASTM D638 Type I method at 50 mm/min after exposure to acetone under 1.0% strain at 23° C. In addition to these properties, some of the articles formed from the compositions also had a pFTP(V1) of at least 0.70 at 1.2 mm thickness after aging for 7 days at 70° C.; and/or a YI of 8 or less; or the composition had a melt flow rate (MFR) of 7 to 15 g/10 min. Many of the compositions included a flame retardant, and the injection molded article had a pFTP(V1) of at least 0.70, or at least 0.90, at 1.2 mm thickness after aging for 7 days at 70° C., or had a pFTP(V0) of at least 0.60 at 1.2 mm thickness after aging for 7 days at 70° C.

Additional batch compositions included a cross-linkable polycarbonate resin comprising from 2 to 4 wt % of endcaps derived from 4-hydroxybenzophenone, and having a weight average molecular weight from 15,000 to 30,000 as measured by GPC using a UV detector and polycarbonate standards; had a 4-hydroxybenzophenone content from 1.3 wt % to 3.8 wt % in the composition; had a melt flow rate (MFR) of 7 to 20 g/10 min measured at 300° C./1.2 kg/360 sec dwell; and could be used for form articles/parts that had a % T of 85% or greater at 3.2 mm thickness prior to UV exposure; and after exposure to at least 35 J/cm$^2$ of UVA radiation has a delta YI of 8 or less at 3.2 mm thickness measured at least 48 hours after exposure, a % T of 75% or greater, a % retention of 85% or greater at 3.2 mm thickness in a tensile elongation at break test using the ASTM D638 Type I method at 50 mm/min after exposure to acetone under 1.0% strain at 23° C., and a pFTP(V1) of at least 0.90 at 1.2 mm thickness after aging for 7 days at 70° C. In addition to these properties, the composition could have a melt flow rate (MFR) of 7 to 10 g/10 min, or of 10 to 15 g/10 min, or of 15 to 20 g/10 min, or of 7 to 15 g/10 min.

Predictive Equations

In order to help design polycarbonates that would consistently (A) pass the UL 94 V1 test after 7 days of aging at 70° C. and (B) provide high percentage of retention of tensile elongation following exposure to acetone while (C) minimizing the color shift due to UV exposure, a predictive tool was needed. Based on the 50 samples in the large scale study described above in Tables 22A-H, a polynomial equation that provided a model fit to each desired response (i.e. p(FTP), tensile elongation retention, and delta YI) was obtained (Design-Expert® version 7.0.3 from Stat-Ease, Inc.). The parameters in the equations included (1) the melt flow rate of the polycarbonate blend, MF, in g/10 min; (2) the UV dosage, D, in J/cm$^2$ for UVA radiation; (3) the weight average molecular weight, MW, in Daltons, of the blend; and (4) the hydroxybenzophenone level, HBP, in weight percent, of the blend. Some responses were affected by (5) the usage of a filtered versus non-filtered UV source, resulting in two separate equations based on this parameter. The five resulting equations are shown below. In these equations, "Ln" refers to the natural log (base e), and "sqrt" indicates the square root.

$$Sqrt(p(FTP) + 0.01) = \qquad \text{Eqn 1}$$
$$-0.37308 + (0.05345 \times D) + (0.22797 \times HBP) -$$
$$(2.06081 \times 10^{-6} \times MW) - (0.092440 \times MF) +$$
$$(2.81460 \times 10^{-6} \times MW \times MF) - (0.000583 \times D^2)$$

UV Source Unfiltered (D-Bulb):

$$Ln(Delta\ YI) = 1.01074 + (0.08387 \times D) - \qquad \text{Eqn 2}$$
$$(0.041908 \times MF) - (0.00077 \times D^2) + (2.41546 \times 10^{-3} \times MF^2)$$

$$Sqrt(\text{Elongation Retention} + 1.04) = -29.23264 + \qquad \text{Eqn 3}$$
$$(0.62157 \times D) + (1.57655 \times HBP) + (1.27584 \times 10^{-3} \times MW) -$$
$$(1.63711 \times 10^{-5} \times D \times MW) - (0.002382 \times D^2)$$

UV Source Filtered $$Ln(Delta\ YI) = 0.44154 + (0.07712 \times D) - \qquad \text{Eqn 4}$$
$$(0.041908 \times MF) - (0.00077 \times D^2) + (2.41546 \times 10^{-3} \times MF^2)$$

$$Sqrt(\text{Elongation Retention} + 1.04) = -30.25285 + \qquad \text{Eqn 5}$$
$$(0.62157 \times D) + (1.57655 \times HBP) + (1.27584 \times 10^{-3} \times MW) -$$
$$(1.63711 \times 10^{-5} \times D \times MW) - (0.002382 \times D^2)$$

The characteristics for each model equation are shown in Table 23:

TABLE 23

|  | p(FTP) | Elongation Retention | Delta YI |
| --- | --- | --- | --- |
| Adjusted R-Squared | 0.64 | 0.84 | 0.97 |
| Predicted R-Squared | 0.56 | 0.81 | 0.96 |
| Adequate Precision | 12.77 | 24.61 | 48.54 |

The predicted R-Squared value shows reasonable agreement with the Adjusted R-Squared value for each equation. Adequate Precision measures the signal to noise ratio. A ratio greater than 4 is generally desirable. Here, the ratios range from 12.77 to 48.54, which indicates an adequate signal and thus these equations can be used to navigate the design space.

All three equations show relatively good predictive ability. The Delta YI equation is particularly powerful in the design space producing calculated values typically within 10% of the measured response. A proposed design space could then be identified by combining the response equations.

Figure 24:
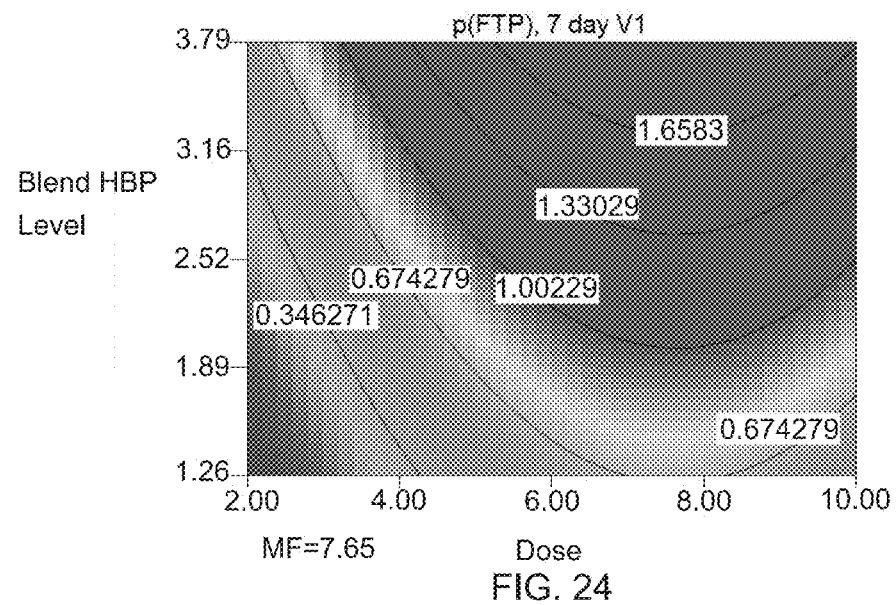
FIG. 24 is a chart showing the predicted p(FTP) for samples aged 7 days and tested for V1 when applying the model equation for flame performance and holding the MFR constant at a low value.

FIG. 24 is a chart showing the model equation for the pFTP(V1) rating (Eqn 1), where the MFR has been held constant at 7.65. The x-axis is the UV dose, and the y-axis is the HBP level. The resulting curves show the predicted pFTP(V1) rating for various combinations of UV dose and HBP level. The pFTP cannot be greater than 1, so the dark space in the upper-right area of the chart shows combinations that should not be tried. Generally, the light area in the curves between 0.674279 and 1.00229 is the desired design space.

Figure 25:
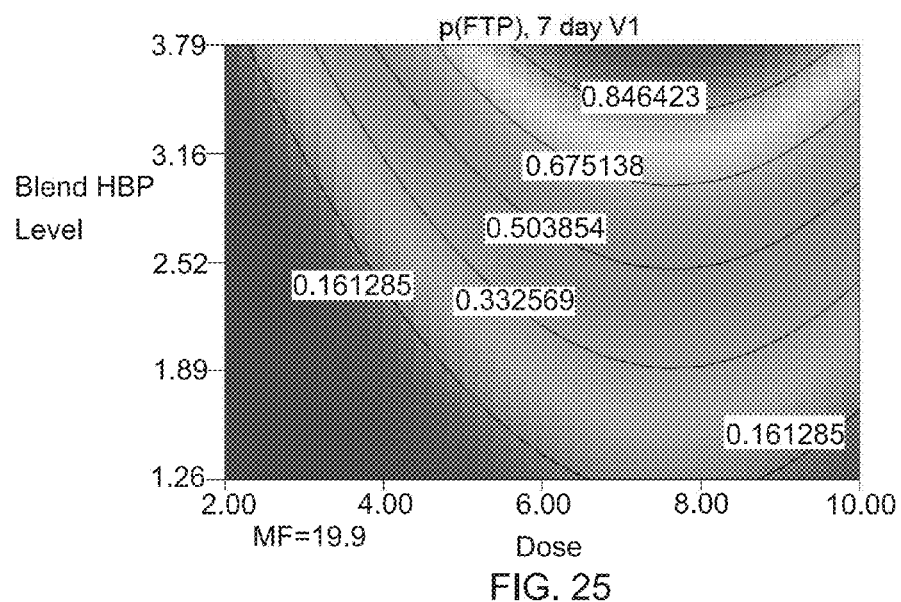
FIG. 25 is a second chart showing the predicted p(FTP) when applying the model equation for flame performance and holding the MFR constant at a higher value.

FIG. 25 is another chart showing the model equation for the pFTP(V1) rating (Eqn 1), where the MFR has been held constant at 19.9. The axes are the same as FIG. 24, but the design space here is different. Generally speaking, higher UV doses and higher HBP levels are needed to obtain the same pFTP(V1) rating.

Figure 26:
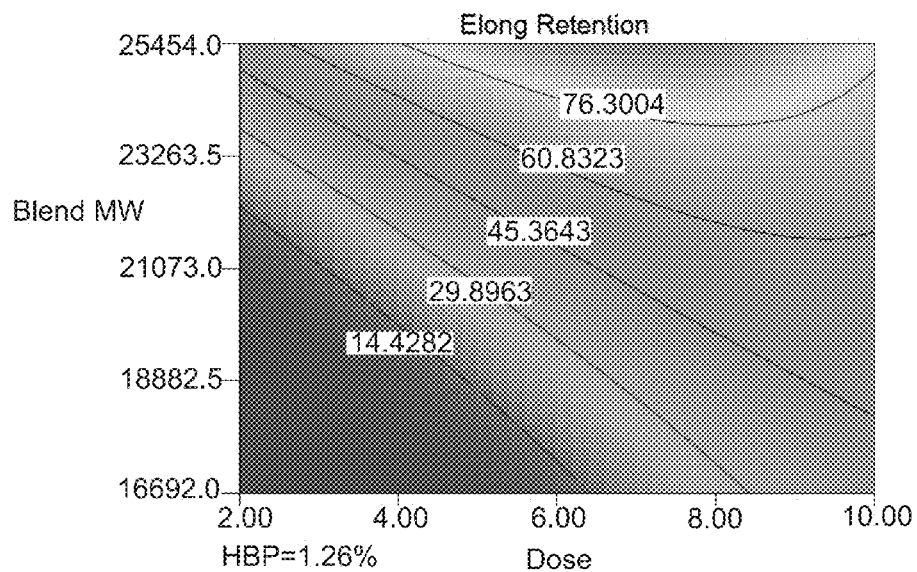
FIG. 26 is a chart showing the predicted retention of elongation at break following acetone testing when applying the model equation for the retention of tensile elongation using a filtered bulb with the HBP content held constant.

FIG. 26 is a chart showing the model equation for the retention of tensile elongation using a filtered bulb (Eqn 3), where the HBP level is held constant at 1.26 wt %. The x-axis is the UV dose, and the y-axis is the MW. The curves show the predicted percentage of retention of tensile elongation. The desired area here is in the upper right of the chart.

Figure 27:
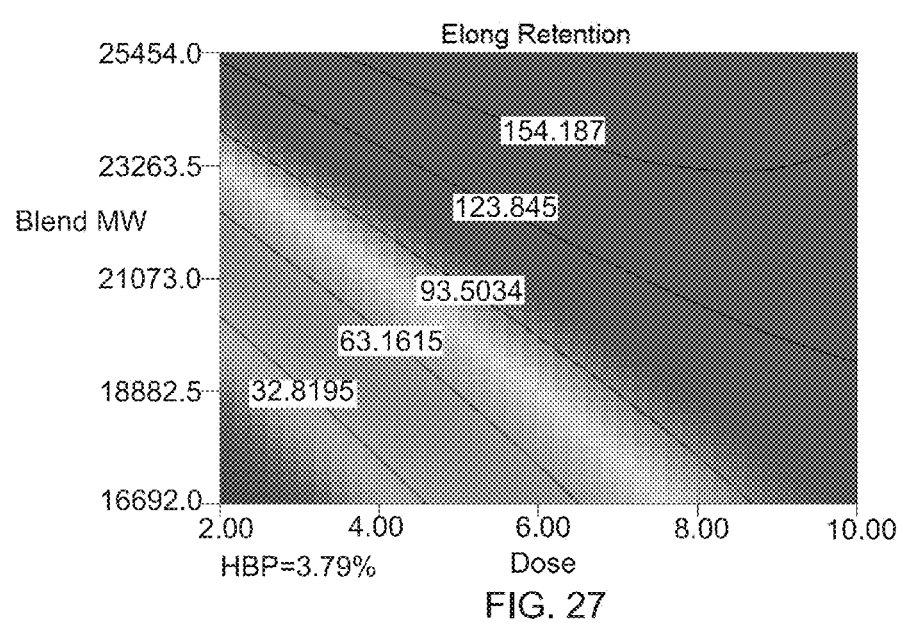
FIG. 27 is another chart showing the model equation for the retention of tensile elongation using a filtered bulb with the HBP content held constant at a higher value.

FIG. 27 is another chart showing the model equation for the retention of tensile elongation using a filtered bulb (Eqn 3), where the HBP level is held constant at 3.79 wt %. The axes are the same as FIG. 26, but the area where the desired elongation retention is met is much larger compared to that of FIG. 26.

Figure 28:
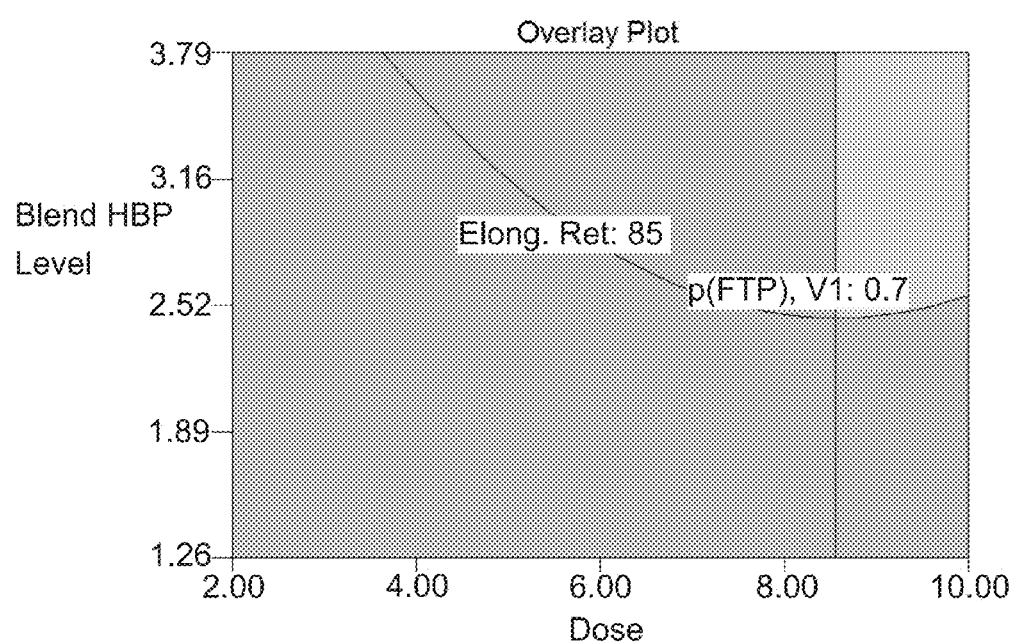
FIG. 28 is a chart that illustrates the combination of three model equations to find a design space.

FIG. 28 is a chart that illustrates the combination of the three model equations to find a design space. The MF is set at 7 and the MW is set at 23,000, and the model equations using a filtered UV light source are used. Thus, Eqns 1, 4, and 5 are used. The x-axis is the UV dose, and the y-axis is the HBP level. The equations can then be used to determine the design space where the % retention of elongation will be greater than 85%, the delta YI will be less than 8, and the pFTP(V1) rating will be greater than 0.7. The area to the left of the vertical line (approximately dose=6.5) denotes the space where the delta YI of less than 8 can be obtained. The area above the curved line denotes the space where the % retention of elongation is greater than 85%. Their intersection (i.e. the lighter area in the center) provides the design space (combination of HBP level and UV dose) needed to obtain these three desired properties. It should also be noted that in FIGS. 24-28, the UV dosage on the x-axis is listed as the number of passes under the UV lamp, which equates to 12-60 J/cm$^2$ UVA; the values on the x-axis are not the dosage itself.

Eqn 1 is an equation for the probability of a first time pass on the UL94 V1 test for an article made of a given polycarbonate blend/composition at 1.2 mm after UV exposure and 7 days of aging at 70° C. Eqn 2 and Eqn 3 apply when the UV exposure is performed with an unfiltered D-bulb, which provides at least 12 J/cm$^2$ of UVA radiation and at least 0.45 J/cm$^2$ of UVC radiation. Eqn 4 and Eqn 5 apply when the UV exposure is performed with a filtered D-bulb, which provides at least 12 J/cm$^2$ of UVA radiation and no detectable J/cm$^2$ of UVC radiation. The output of the UV light source is measured using an EIT PowerPuck.

These five equations can be combined in any manner to design polymeric compositions, UV dosages, and UV sources to obtain any combination of desired properties.

Eqn 1 can be used alone to obtain articles that have a high pFTP(V1). It should be noted that this equation does not depend on the UV light source (unfiltered or filtered). In specific embodiments, the targeted pFTP(V1) is 0.7 or greater.

Eqn 2 can be used alone to obtain articles that have a low delta YI when exposed to an unfiltered D-bulb. In specific embodiments, the targeted delta YI is 15 or less, or 10 or less, or 8 or less, or 5 or less.

Eqn 3 can be used alone to obtain articles that have a high percentage of retention of tensile elongation when exposed to an unfiltered D-bulb. In specific embodiments, the targeted percentage is 85% or greater, or 90% or greater.

Eqn 4 can be used alone to obtain articles that have a low delta YI when exposed to a filtered D-bulb. In specific embodiments, In specific embodiments, the targeted delta YI is 15 or less, or 10 or less, or 8 or less, or 5 or less.

Eqn 5 can be used alone to obtain articles that have a high percentage of retention of tensile elongation when exposed to a filtered D-bulb. In specific embodiments, the targeted percentage of retention of tensile elongation is 85% or greater, or 90% or greater.

Eqn 1 and Eqn 2 can be combined to obtain articles that have a high pFTP(V1) and a low delta YI when exposed to an unfiltered D-bulb. In specific embodiments, the targeted pFTP(V1) is 0.7 or greater; and the targeted delta YI is 15 or less, or 10 or less, or 8 or less, or 5 or less. Any of these four combinations is specifically contemplated.

Eqn 1 and Eqn 3 can be combined to obtain articles that have a high pFTP(V1) and a high percentage of retention of tensile elongation when exposed to an unfiltered D-bulb. In specific embodiments, the targeted pFTP(V1) is 0.7 or greater; and the targeted percentage of retention of tensile elongation is 85% or greater, or 90% or greater. Either of these two combinations is specifically contemplated.

Eqn 1 and Eqn 4 can be combined to obtain articles that have a high pFTP(V1) and a low delta YI when exposed to a filtered D-bulb. In specific embodiments, the targeted pFTP(V1) is 0.7 or greater; and the targeted delta YI is 15 or less, or 10 or less, or 8 or less, or 5 or less. Any of these four combinations is specifically contemplated.

Eqn 1 and Eqn 5 can be combined to obtain articles that have a high pFTP(V1) and a high percentage of retention of tensile elongation when exposed to a filtered D-bulb. In specific embodiments, the targeted pFTP(V1) is 0.7 or greater; and the targeted percentage of retention of tensile elongation is 85% or greater, or 90% or greater. Either of these two combinations is specifically contemplated.

Eqn 2 and Eqn 3 can be combined to obtain articles that have a low delta YI and a high percentage of retention of tensile elongation when exposed to an unfiltered D-bulb. In specific embodiments, the targeted delta YI is 15 or less, or 10 or less, or 8 or less, or 5 or less; and the targeted percentage of retention of tensile elongation is 85% or greater, or 90% or greater. Any of these eight combinations is specifically contemplated.

Eqn 4 and Eqn 5 can be combined to obtain articles that have a low delta YI and a high percentage of retention of tensile elongation when exposed to a filtered D-bulb. In specific embodiments, the targeted delta YI is 15 or less, or 10 or less, or 8 or less, or 5 or less; and the targeted percentage of retention of tensile elongation is 85% or greater, or 90% or greater. Any of these eight combinations is specifically contemplated.

Eqn 1, Eqn 2, and Eqn 3 can be combined to obtain articles that have a high pFTP(V1), a low delta YI, and a high percentage of retention of tensile elongation when exposed to an unfiltered D-bulb. In specific embodiments, the targeted pFTP(V1) is 0.7 or greater; the targeted delta YI is 15 or less, or 10 or less, or 8 or less, or 5 or less; and the targeted percentage of retention of tensile elongation is 85% or greater, or 90% or greater. Any of these eight combinations is specifically contemplated.

Eqn 1, Eqn 4, and Eqn 5 can be combined to obtain articles that have a high pFTP(V1), a low delta YI and a high percentage of retention of tensile elongation when exposed to a filtered D-bulb. In specific embodiments, the targeted pFTP(V1) is 0.7 or greater; the targeted delta YI is 15 or less, or 10 or less, or 8 or less, or 5 or less; and the targeted percentage of retention of tensile elongation is 85% or greater, or 90% or greater. Any of these eight combinations is specifically contemplated.

The five equations use the melt flow rate of the polycarbonate blend (MF), the UV dosage (D), the weight average molecular weight of the blend (MW), and the hydroxybenzophenone level of the blend (HBP). In particular embodiments, MF can be from 7 to 20 g/10 min, as measured at 300° C./1.2 kg/360 sec dwell. In some more specific embodiments, MF can be 7 to 10, 10 to 15, or 15 to 20 g/10 min. In particular embodiments, D can be at least 12 J/cm$^2$ of UVA radiation. In particular embodiments, MW can be 15,000 to 30,000 Daltons. It is noted that this is the MW of the blend, not of the cross-linkable polycarbonate resin alone. In particular embodiments, HBP can be from 1.2 wt % to 4 wt % of the blend. Again, this is the 4-hydroxybenzophenone content of the blend, not of the cross-linkable polycarbonate resin by itself. Various combinations of these properties can be indicated by various combinations of the five equations. Typically, one or two of these properties is held constant, and using the equations defines suitable ranges for the other two or three properties.

Formed Articles

A molded mouse cover was made from an XPC-D resin which was a bisphenol-A polymer with 4-hydroxybenzophenone endcaps present in an amount of 2.5 mole %, with no p-cumylphenol endcap, and having an Mw of 22,000. The XPC-D resin was blended with 0.06 phr phosphite stabilizer. The composition had an MVR (300° C./1.2 kg, 360 sec dwell) of 8.5 cc/10 min. The composition was injection molded to obtain the molded mouse cover.

The molded mouse cover was then passed 6 times through the Loctite system, with the top facing the UV lamp. A t-bar was also exposed as a control for comparison.

After UV exposure, the gel thickness of the mouse cover was 18.64 microns at the front, 24.10 microns at the middle, and 16.55 microns at the back, with an average thickness of 19.76 microns for the entire part. For comparison, the gel thickness for the t-bar was 29.91 microns. The presence of a gel layer indicated that crosslinking had occurred. The YI of the mouse cover before UV exposure was 0.18, and 48 hours after UV exposure was 3.84.

Fibers were also made using the composition containing XPC-D and phosphite stabilizer. A Fiberlab L1000 device (from Fiberio) was used. 10 wt % of the composition was dissolved in methylene chloride to form a solution, which was placed in a liquid reservoir. This liquid reservoir was spun on a vertical axis, pushing the liquid state material to the outer wall where orifices were present. The centrifugal and hydrostatic forces initiate a liquid jet, and external shear forces promote cooling and solvent evaporation, creating the fiber.

Two sets of fibers were made. At 12,000 rpm and an orifice diameter of 159 microns, fibers were made having an average fiber diameter of 12.4 microns. At 12,000 rpm and an orifice diameter of 210 microns, fibers were made having an average fiber diameter of 14.5 microns. Some fibers were then exposed to UV light in the Loctite system (approximately 36 J/cm$^2$ of UVA).

Exposed and un-exposed fibers were then placed in methylene chloride. Un-exposed fibers dissolved, while undissolved material remained for the exposed fibers, indicating a gel had been formed and crosslinking had occurred.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An article molded from a polycarbonate composition, wherein the polycarbonate composition comprises:
   a cross-linkable polycarbonate resin comprising from 2 to 4 wt % of endcaps derived from a monohydroxybenzophenone, and having a weight average molecular weight from 15,000 to 30,000 as measured by GPC using a UV detector and polycarbonate standards;
   optionally one or more additional polycarbonate base resins different from the cross-linkable polycarbonate resin;
   optionally a flame retardant; and
   optionally a colorant, a UV stabilizer, a thermal stabilizer, or a mold release agent;
   wherein the polycarbonate composition has a monohydroxybenzophenone derived endcap content from 1.3 wt % to 3.8 wt %, and a melt flow rate (MFR) of 7 to 20 g/10 min measured at 300° C./1.2 kg/360 sec dwell, and wherein a molded part formed from the polycarbonate composition has a % T of 85% or greater at 3.2 mm thickness; and
   wherein a part molded from the polycarbonate composition and exposed to at least 35 J/cm$^2$ of UVA radiation has a change in yellowness index (delta Y) of 8 or less at 3.2 mm thickness measured at least 48 hours after exposure, a light transmission (% T) of 75% or greater, a % retention of 85% or greater at 3.2 mm thickness in a tensile elongation at break test using the ASTM D638 Type I method at 50 mm/min after exposure to acetone under 1.0% strain at 23° C., and a pFTP(V1) of at least 0.90 at 1.2 mm thickness after aging for 7 days at 70° C.; and
   wherein the cross-linkable polycarbonate resin has the structure of Formula (I):

Formula (I)

wherein $R^1$ and $R^2$ are independently halogen, $C_{1-6}$ alkyl, $C_{3-8}$ cycloalkyl, aryl, or arylalkyl;
x is an integer from 0 to 4; y is an integer from 0 to 5; n' is an integer from 29 to 65; and
the repeating unit W is derived from:
(i) a monomer having the structure:

HO-A$_1$-Y$_1$-A$_2$-OH wherein each of A$_1$ and A$_2$ comprise a monocyclic divalent arylene group, and Y$_1$ is a bridging group having one or more atoms; or
(ii) a monomer having the structure:

each $R^k$ is independently halogen, a $C_{1-10}$ hydrocarbon group, or a halogen substituted $C_{1-10}$ hydrocarbon group; and n is 0 to 4.

2. The article of claim 1, wherein the polycarbonate composition has a melt flow rate (MFR) of 7 to 10 g/10 min.

3. The article of claim 1, wherein the polycarbonate composition has a melt flow rate (MFR) of 10 to 15 g/10 min.

4. The article of claim 1, wherein the polycarbonate composition has a melt flow rate (MFR) of 15 to 20 g/10 min.

5. The article of claim 1, wherein the cross-linkable polycarbonate resin has the structure of Formula (II):

Formula (II)

wherein n' ranges from 29 to 65.

6. The article of claim 1, wherein the cross-linkable polycarbonate resin has a polydispersity index (PDI) of between 3.0 and 7.3 as measured by GPC using a UV detector and polycarbonate standards.

7. The article of claim 6, wherein the ratio of the polydispersity index (PDI) measured using a UV detector to the PDI measured using an RI detector is 1.8 or less, when using a GPC method and polycarbonate molecular weight standards.

8. The article of claim 1, wherein the article is a film, a sheet, a layer of a multilayer film, or a layer of a multilayer sheet.

9. The article of claim 1, wherein the article is at least one of an automotive bumper, an automotive exterior component, an automobile mirror housing, an automobile grille, an automobile pillar, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a construction or agricultural equipment grille, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, a hand held electronic device enclosure or part, a wearable electronic device, a hand held tool enclosure or part, a smart phone enclosure or part, a mouse cover, and a turbine blade.

10. The article of claim 1, wherein the article is at least one of a computer housing, a computer housing or business machine housing or part, a housing or part for monitors, a computer router, a copier, a desk top printer, a large office/industrial printer, a handheld electronic device housing, a housing for a hand-held device, a component for a light fixture, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device, an electrical box or enclosure, and an electrical connector.

11. The article of claim 1, wherein the article is formed by injection molding, overmolding, co-injection molding, extrusion, multilayer extrusion, rotational molding, blow molding, or thermoforming.

* * * * *